(12) United States Patent
Satir et al.

(10) Patent No.: US 8,046,319 B2
(45) Date of Patent: Oct. 25, 2011

(54) METHODS SUITABLE FOR OPTIMIZING LINEHAUL OPERATIONS

(75) Inventors: Salim Satir, Fredericton (CA); James S. Christie, Fredericton (CA)

(73) Assignee: University of New Brunswick, Fredericton, NB (CA)

( * ) Notice: Subject to any disclaimer, the term of this patent is extended or adjusted under 35 U.S.C. 154(b) by 764 days.

(21) Appl. No.: 11/822,199

(22) Filed: Jul. 3, 2007

(65) Prior Publication Data
US 2008/0140597 A1 Jun. 12, 2008

(51) Int. Cl.
G06F 17/00 (2006.01)
G06N 5/02 (2006.01)

(52) U.S. Cl. .......................................... 706/46

(58) Field of Classification Search ............... 705/12, 705/7.24
See application file for complete search history.

(56) References Cited

U.S. PATENT DOCUMENTS

| 2002/0026342 | A1* | 2/2002 | Lane et al. ......................... 705/8 |
| 2004/0172174 | A1* | 9/2004 | Julich et al. ...................... 701/19 |
| 2004/0199415 | A1* | 10/2004 | Ho ..................................... 705/8 |
| 2005/0209913 | A1* | 9/2005 | Wied et al. ....................... 705/12 |

OTHER PUBLICATIONS

'Truck delivery scheduling system with a mobile communication feature': Sawamoto, 2002, International journal of information technology, vol. 8, No. 1, pp. 26-39.*
'Matrix reductions using the Hungarian Method for the generation of school timetables': Lions, 1966, Communications of the ACM, vol. 9, No. 5, pp. 349-354.*
Satir, S. 2003. Applied Vehicle Routing and Scheduling Optimization for Pickup and Delivery Operations at a Trucking Terminal. Master's Thesis, University of New Brunswick.
Smilowitz, K. R., Atamturk, A., and Daganzo, C. F. 2003. Defered item and vehicle routing within integrated networks. Transportation Research Part E, 39: 305-323.
Subramanian, R., Scheff, R.P., Quillinan, J. D., Wiper, D. S., and Marsten, R. E. 1994. Coldstart: Fleet Assignment at Delta Airlines, Interfaces, 24(1): 104-120.
Tan, K.C., Lee, L.H., Zhu, Q.L., and Ou, K. 2000. Heuristic Methods for Vehicle Routing Problem with Time Windows. Artifical Intelligence in Engineering, 15: 281-295.
Taniguchi, E., Thompson, R.G., Yamada, T., and Van Duin, R. 2001. City Logistics: Network Modelling and Intelligent Transport Systems, Pergamon; 5 pages.
TransCAD. 2004. 4.7 User's Guide Supplement, Caliper Corporation.
Transcad. 2006. Available at http://www.caliper.com/TransCAD/ApplicationModules.htm#Routing [cited Apr. 4, 2006].

(Continued)

Primary Examiner — Michael B. Holmes
Assistant Examiner — Peter Coughlan
(74) Attorney, Agent, or Firm — Eugene F. Derényi; Fogler, Rubinoff LLP

(57) ABSTRACT

The methods disclosed comprise the linehaul optimization algorithm which is a hybrid algorithm incorporating the basic structure of the Hungarian Assignment algorithm or equivalent and an improvement heuristic. However, in this particular case there is not a direct application of the existing, well-known Hungarian Assignment algorithm or equivalent in conjunction with a heuristic. The structure of the assignment model being used here is based on the Hungarian Assignment algorithm or equivalent but has been revised and enhanced to identify systematically (by using grouping) a number of equivalent optimal solutions (that give the same optimal, minimum cost for a particular iteration). A heuristic is then used to identify the 'best' optimal solution, of the many identified, that would contribute the most incremental cost reduction in future iterations of the heuristic.

22 Claims, 75 Drawing Sheets

OTHER PUBLICATIONS

Transportation in Canada 2004. 2004. Annual Report Transport Canada. [Online]. Available at http://www.tc.gc.ca/ pol/en/report/anre2004/toc_e.htm [Cited Apr. 2, 2006].

Yang, J., Jaillet, P., and Mahmassani, H. 2004. Real-time multivehicle truckload pickup and delivery problems. Transportation Science, 38: 135-148.

Arunapuram, S., Mathur,K., and Solow, D., 2003. Vehicle routing and scheduling with full truckloads. Transportation Science, 37: 170-182.

Atallah, M. (Ed.), (1999). Algorithms and Theory of Computation Handbook. CRC Press, Boca Raton, pp. 7-21, 16 pp.

Barnhart, C., Cohn, A.M., Johnson,E.L., Klabjan, D., Nemhauser, G.L, and Vance, P.N. 2002. Airline crew scheduling. Handbook of Transportation Science (2nd Edition). Randolph W. Hall (editor). Kluwer Academic Publishers, Norwell, MA.

Barnhart, C., Hane, C., Johnson, E., and Sigismondi, G. 1995. A column generation and partitioning approach for multi-commodity flow problems. Telecommunication Systems, 3: 239-258.

Barnhart, C., Hane, C.A., and Vance, P.H. 2000. Using branch-and-price-and-cut to solve origin-destination integer multicommodity flow problems. Operations Research, 48(2): 318-326.

Barnhart, C., Kniker,T., and Lohatepanont, M. 2002. Itinerary-based airline fleet assignment. Transportation Science, 36(2): 199-217.

Barnhart, C., Rexing, B., Kniker, T., Jarrah, A., and Krishnamurthy, N. 2000. Airline fleet assignment with time windows. Transportation Science, 34(1): 1-20.

Brandao, J., and Mercer, A. 1997. A tabu search algorithm for the multi-trip vehicle routing and scheduling problem, European Journal of Operational Research..100: 180-191.

Canada's 50 Best Managed Companies. 2005 Winners. [Online]. Available from http://www.canadas50best.com/en/Winners/WinnersBest/2005+winners.htm [Cited Apr. 2, 2006].

Christiansen, M., Fagerholt, K., and Ronen, D. Ship Routing and Scheduling—Status and Perspectives. Transportation Science, 36: 1-18.

Christie, J.S., and Satir, S. 2004. Transport Logistics: Potential Traffic Related Spin-off Benefits, Canadian ITE Annual Conference, Moncton, New Brunswick.

Clarke, G., and Wright, J.W. 1964. Scheduling of Vehicles from a Central Depot to a Number of Delivery Points. Operations Research, 12: 568-581.

Cook, W., Cunningham, W.H., Pulleyblank, W.R. and Schrijver, A. 1998. Combinatorial Optimization, John Wiley & Sons, pp. 241-272, 32 pp.

Corberan, A., Meja G., and Sanchis, J.M. 2005 New Results on the Mixed General Routing Problem. Operations Research, 53: 363-376.

Cordeau, J.F., and Laporte, G. 2002 Tabu search heuristics for the vehicle routing problem. GERAD Technical report G-2002-15, University of Montreal, Canada.

Crainic, T.G, and Laporte, G. 1997. Planning models for freight transportation. European Journal of Operational Research, 97(409): 38.

Desaulniers, G., Lavigne, J., and Soumis, F. 1998. Multi-depot vehicle scheduling problems with time windows and waiting costs. European Journal of Operation Research, 111: 479-494.

Desrosiers, J., Dumas, Y., Solomon, M.M., and Soumis, F. 1995. Time Constrained Routing and Scheduling. Ball,M., Magnanti,T., Monma, C., and Nemhauser, G. (editors).

Eiselt, H. A., Gendreau, M., and Laporte, G. 1995. Arc routing problems, part II: The rural postman problem. Operations Research, 43: 399-414.

Fernández, A.J., and Hill, P.M. Jul. 2000. A comparative study of eight constraint programming languages over the boolean and finite domains. Constraints, 5(3): 275-301.

Fisher, M.L. 1995. Vehicle routing. Ball,M., Magnanti,T., Monma, C., and Nemhauser, G. eds. Handbook in Operations Research and Management Science: Network Routing. Holland, Amsterdam, the Netherlands, pp. 1-33.

Gendreau, M., G. Laporte, J. Potvin. 1997. Vehicle routing: Modern heuristics. E. Aarts, J. Lenstra, eds. Local Search in Combinatorial Optimization, Ch. 9. John Wiley & Sons Ltd., New York, pp. 311-336.

Godfrey, G., and Powell, W. B. 2002, An adaptive, dynamic programming algorithm for stochastic resource allocation problems II: Multi-period travel times. Transportation Science, 36(1): 40-54.

Hall, R. 2004. Vehicle routing: On the road to recovery. ORMS Today.

Christiansen, M. 1999. Decomposition of a combined inventory and time constrained ship routing problem. Transportation Science. 33 (1): 3-16.

Homer, P. 2000. The Sabre storey: The making of OR magic at AMR. ORMS Today.

ILOG Transport PowerOPs. 2006. ILOG PowerOps. [Online]. Available at: http://www.ilog.com/products/transportpowerops/features.cfm [Cited Apr. 4, 2006].

ILOG. 2003. "ILOG Scheduler 6.0 Getting Started", User Manual.

ILGO. 2003. "ILOG Solver 6.0 User's Manual", User Manual.

Lawler, E.L., Lenstra, J.K., Rinnooy Kan, A.H.G., and Shmoys, D.B. 1992. The Travelling Salesman Problem, Wiley.

Liu, J., C. Li, and Chan, C. 2003. Mixed truck delivery systems with both hub-and-spoke and direct shipment. Transportation Research Part E, 39: 325-339.

Merriam-Webster Online Dictionary. Mar. 2006. [Online] Available at http://www.m-w.com/dictionary/optimization. [Cited Apr. 2, 2006].

Powell, W. B., Shapiro, J. A., and Simaô, H. P. 2002, An adaptive dynamic programming algorithm for the heterogeneous resource allocation problem. Transportation Science, 36(2): 231-249.

Powell, W., and Topaloglu, H. 2005. Fleet management. S. Wallance, W. Ziemba (editors), Applications of Stochastic Programming. MPS-SIAM Series on Optimization, Philadelphia.

Powell, W.B. 1996. A stochastic formulation of the dynamic assignment problem, with an application to truckload motor carriers. Transportation Science, 30(3): 195-219.

Powell, W.B. 2003. Dynamic Models of Transportation Operations, In Supply Chain Management, Handbooks in Operations Research and Management Science, S. Graves and T.A.G. Tok (editors), North-Holland, Amsterdam.

Powell, W.B., and Carvalho, T. A. 1998. Dynamic control of logistics queueing networks for large-scale fleet management. Transportation Science, 32(2): 90-109.

Powell, W.B., Towns, M.T., and Marar, A. 2000. On the value of globally optimal solutions for dynamic routing and scheduling problems. Transportation Science, 34(1): 50-66.

Ryan, D., Butchers, R., Day, P., Goldie, A., Miller, S., Meyer, J., Scott, A., and Wallace, C. 2001. Optimizing Crew Scheduling at Air New Zealand. Interfaces, 31(1): 30-56.

* cited by examiner

| Terminal Number (for the computer program) | 3-letter Terminal Code | Terminal | Time Difference |
|---|---|---|---|
| 0 | SYD | SYDNEY, NS | 0 |
| 1 | TRU | TRURO, NS | 0 |
| 2 | NGL | NEW GLASGOW, NS | 0 |
| 3 | DAR | DARTMOUTH, NS | 0 |
| 4 | KVL | KENTVILLE, NS | 0 |
| 5 | PEI | PRINCE EDWARD ISLAND, PE | 0 |
| 6 | MTN | MONCTON, NB | 0 |
| 7 | STJ | SAINT JOHN, NB | 0 |
| 8 | MIR | MIRAMICHI, NB | 0 |
| 9 | FTN | FREDERICTON, NB | 0 |
| 10 | BTH | BATHURST, NB | 0 |
| 11 | HAR | HARTLAND, NB | 0 |
| 12 | ESN | EDMUNDSTON, NB | 0 |
| 13 | TCH | CHICOUTIMI, PQ | -1 |
| 14 | QUE | QUEBEC CITY, PQ | -1 |
| 15 | DRM | DRUMMONDVILLE, PQ | -1 |
| 16 | MTL | MONTREAL, PQ | -1 |
| 17 | OTT | OTTAWA, ON | -1 |
| 18 | KIN | KINGSTON, ON | -1 |
| 19 | TOR | TORONTO, ON | -1 |
| 20 | WSK | WOODSTOCK, ON | -1 |
| 21 | MEA | MEAFORD, ON | -1 |
| 22 | WIN | WINDSOR, ON | -1 |
| 23 | WPG | WINNIPEG, MB | -2 |
| 24 | PTG | PORTAGE LAPRAIRIE, MB | -2 |
| 25 | REG | REGINA, SK | -2 |
| 26 | SAS | SASKATOON, SK | -2 |
| 27 | EDM | EDMONTON, AB | -3 |
| 28 | CLG | CALGARY, AB | -3 |
| 29 | KEL | KELOWNA, BC | -4 |
| 30 | RIC | RICHMOND, BC | -4 |
| 31 | VAN | VANCOUVER, BC | -4 |
| 32 | VIC | VICTORIA, BC | -4 |
| 33 | FVL | MCCAIN FLORENCEVILLE, NB | 0 |
| 34 | MGF | MCCAIN GRAND FALLS, NB | 0 |
| 35 | SAT | ST. ANTHONY, NFLD | 0.5 |
| 36 | CBK | CORNER BROOK, NFLD | 0.5 |
| 37 | NFL | ST. JOHNS, NFLD | 0.5 |
| 38 | CVL | CLARENVILLE, NFLD | 0.5 |
| 39 | GFL | GRAND FALLS, NFLD | 0.5 |
| 40 | MYT | MARYSTOWN, NFLD | 0.5 |
| 41 | XXX | future terminal | 0 |
| 42 | XXX | future terminal | 0 |
| 43 | XXX | future terminal | 0 |

FIG. 4a

| | | | |
|---|---|---|---|
| 44 | XXX | future terminal | 0 |
| 45 | XXX | future terminal | 0 |
| 46 | XXX | future terminal | 0 |
| 47 | XXX | future terminal | 0 |
| 48 | XXX | future terminal | 0 |
| 49 | XXX | future terminal | 0 |
| 50 | XXX | future terminal | 1 |

US

| | | | |
|---|---|---|---|
| 51 | AK | ALASKA | -5 |
| 52 | AL | ALABAMA | -2 |
| 53 | AR | ARKANSAS | -2 |
| 54 | AZ | ARIZONA | -3 |
| 55 | CA | CALIFORNIA | -4 |
| 56 | CO | COLORADO | -3 |
| 57 | CT | CONNETICUT | -1 |
| 58 | DC | DISTRICT COLUMBIA | -1 |
| 59 | DE | DELAWARE | -1 |
| 60 | FL | FLORIDA | -1 |
| 61 | GA | GEORGIA | -1 |
| 62 | IA | IOWA | -2 |
| 63 | ID | IDAHO | -3 |
| 64 | ILL | ILLINOIS | -2 |
| 65 | IN | INDIANA | -1 |
| 66 | KS | KANSAS | -2 |
| 67 | KY | KENTUCKY | -1 |
| 68 | LA | LOUISIANA | -2 |
| 69 | MA | MASSACHUSETTS | -1 |
| 70 | MD | MARYLAND | -1 |
| 71 | ME | MAINE | -1 |
| 72 | MI | MICHIGAN | -1 |
| 73 | MN | MINNESOTA | -2 |
| 74 | MO | MISSOURI | -2 |
| 75 | MS | MISSISSIPPI | -2 |
| 76 | MT | MONTANA | -3 |
| 77 | NC | NORTH CAROLINA | -1 |
| 78 | ND | NORTH DAKOTA | -2 |
| 79 | NE | NEBRASKA | -2 |
| 80 | NH | NEW HAMPSHIRE | -1 |
| 81 | NJ | NEW JERSEY | -1 |
| 82 | NM | NEW MEXICO | -3 |
| 83 | NV | NEVADA | -4 |
| 84 | NY | NEW YORK | -1 |
| 85 | OHI | OHIO | -1 |
| 86 | OK | OKLAHOMA | -2 |
| 87 | OR | OREGON | -4 |
| 88 | PA | PENNSYLVANIA | -1 |
| 89 | RI | RHODE ISLAND | -1 |
| 90 | SC | SOUTH CAROLINA | -1 |
| 91 | SD | SOUTH DAKOTA | -2 |

FIG. 4b

| | | | |
|---|---|---|---|
| 92 | TN | TENNESSEE | -2 |
| 93 | TX | TEXAS | -2 |
| 94 | UT | UTAH | -3 |
| 95 | VA | VIRGINIA | -1 |
| 96 | VT | VERMONT | -1 |
| 97 | WA | WASHINGTON | -4 |
| 98 | WI | WISCONSIN | -2 |
| 99 | WV | WEST VIRGINIA | -1 |
| 100 | WY | WYOMING | -3 |

Switch Points

| | | | |
|---|---|---|---|
| 101 | BEL | BELLEVILLE, ON | -1 |
| 102 | CAR | CARDINAL, ON | -1 |
| 103 | SCWPQ | ST. CYRILLE, PQ | -1 |
| 104 | HEA | HEARST, ON (Longlac) | -1 |
| 105 | KON | KINGSTON, ON | -1 |
| 106 | RDL | RIVIERE DU LOUP, PQ | -1 |
| 107 | SJP | ST JEAN PORT JOLI, PQ | -1 |
| 108 | VIRDMB | VIRDEN, MB | -2 |
| 109 | NSD | NORTH SYDNEY, NS | 0 |
| 110 | STP | ST-APOLLINAIRE, PQ | -1 |
| 111 | OYENAB | OYEN, AB | -3 |
| 112 | WITSK | WHITEWOOD, SK | -2 |
| 113 | NBSK | NORTH BATTLEFORD, SK | -2 |
| 114 | MCSK | MAPLE CREEK, SK | -2 |
| 115 | GOLBC | GOLDEN, BC | -4 |
| 116 | SDLHPQ | SAINT LOUIS DU HA HA, PQ | -1 |

FIG. 4c

|       | Column No. (Jobs) |    |    |    |    |    |    |
|-------|----|----|----|----|----|----|----|
|       | 0  | 1  | 2  | 3  | 4  | 5  | 6  |
| 0     | 20 | 11 | 27 | 0  | 15 | 35 | 0  |
| 1     | 0  | 0  | 0  | 23 | 0  | 0  | 43 |
| 2     | 0  | 51 | 0  | 12 | 42 | 46 | 32 |
| 3     | 1  | 41 | 3  | 0  | 84 | 67 | 0  |
| 4     | 8  | 0  | 55 | 65 | 0  | 0  | 55 |
| 5     | 0  | 26 | 0  | 85 | 42 | 85 | 18 |
| 6     | 77 | 0  | 89 | 44 | 0  | 0  | 45 |

Row No. (Tractors)

FIG. 8a

|       | Column No. (Jobs) |    |    |    |    |    |    |
|-------|----|----|----|----|----|----|----|
|       | 0  | 1  | 2  | 3  | 4  | 5  | 6  |
| 0     | 20 | 11 | 27 | 0  | 15 | 35 | 0  |
| 1     | 0  | 0  | 0  | 23 | 0  | 0  | 43 |
| 2     | 0  | 51 | 0  | 12 | 42 | 46 | 32 |
| 3     | 1  | 41 | 3  | 0  | 84 | 67 | 0  |
| 4     | 8  | 0  | 55 | 65 | 0  | 0  | 55 |
| 5     | 0  | 26 | 0  | 85 | 42 | 85 | 18 |
| 6     | 77 | 0  | 89 | 44 | 0  | 0  | 45 |

Row No. (Tractors)

| Group Number = 0 ||
|---|---|
| dim_comb_c[0] = 2 | dim_comb_r[0] = 2 |
| comb_range_c[0][0] = 3 | comb_range_r[0][0] = 0 |
| comb_range_c[0][1] = 6 | comb_range_r[0][1] = 3 |

FIG. 8b

| | | Column No. (Jobs) | | | | | | |
|---|---|---|---|---|---|---|---|---|
| | | 0 | 1 | 2 | 3 | 4 | 5 | 6 |
| Row No. (Tractors) | 0 | 30 | 11 | 27 | 0 | 13 | 5 | 11 |
| | 1 | 0 | 0 | 0 | 71 | 0 | 0 | 0 |
| | 2 | 0 | 51 | 0 | 0 | 42 | 46 | 0 |
| | 3 | 1 | 4 | 7 | 0 | 41 | 6 | 2 |
| | 4 | 8 | 0 | 55 | 0 | 0 | 0 | 5 |
| | 5 | 0 | 26 | 0 | 0 | 42 | 85 | 0 |
| | 6 | 77 | 0 | 89 | 0 | 0 | 0 | 7 |

| Group Number = 1 | |
|---|---|
| dim_comb_c[0] = 2 | dim_comb_r[0] = 2 |
| comb_range_c[0][0] = 0 | comb_range_r[0][0] = 2 |
| comb_range_c[0][1] = 2 | comb_range_r[0][1] = 5 |

FIG. 8c

| | | Column No. (Jobs) | | | | | | |
|---|---|---|---|---|---|---|---|---|
| | | 0 | 1 | 2 | 3 | 4 | 5 | 6 |
| Row No. (Tractors) | 0 | 30 | 11 | 27 | 0 | 13 | 5 | 11 |
| | 1 | 0 | 0 | 0 | 71 | 0 | 0 | 0 |
| | 2 | 0 | 51 | 0 | 0 | 42 | 46 | 0 |
| | 3 | 1 | 4 | 7 | 0 | 41 | 6 | 2 |
| | 4 | 8 | 0 | 55 | 0 | 0 | 0 | 5 |
| | 5 | 0 | 26 | 0 | 0 | 42 | 85 | 0 |
| | 6 | 77 | 0 | 89 | 0 | 0 | 0 | 7 |

| Group Number = 2 | |
|---|---|
| dim_comb_c[0] = 3 | dim_comb_r[0] = 3 |
| comb_range_c[0][0] = 1 | comb_range_r[0][0] = 1 |
| comb_range_c[0][1] = 4 | comb_range_r[0][1] = 4 |
| comb_range_c[0][2] = 5 | comb_range_r[0][2] = 6 |

| HBF | Change % | LHBF | GCRF | WTRF | Operating Cost |
|---|---|---|---|---|---|
| 0.38 | -50% | 0.50 | 0.40 | 0.60 | $1,837,847 |
| 0.46 | -40% | 0.50 | 0.40 | 0.60 | $1,825,412 |
| 0.53 | -30% | 0.50 | 0.40 | 0.60 | $1,825,412 |
| 0.61 | -20% | 0.50 | 0.40 | 0.60 | $1,832,886 |
| 0.68 | -10% | 0.50 | 0.40 | 0.60 | $1,821,713 |
| 0.76 | 0% | 0.50 | 0.40 | 0.60 | $1,821,713 |
| 0.84 | 10% | 0.50 | 0.40 | 0.60 | $1,821,713 |
| 0.91 | 20% | 0.50 | 0.40 | 0.60 | $1,821,713 |
| 0.99 | 30% | 0.50 | 0.40 | 0.60 | $1,830,623 |
| 1.06 | 40% | 0.50 | 0.40 | 0.60 | $1,830,623 |
| 1.14 | 50% | 0.50 | 0.40 | 0.60 | $1,836,810 |

| LHBF | Change % | HBF | GCRF | WTRF | Operating Cost |
|---|---|---|---|---|---|
| 0.25 | -50% | 0.76 | 0.40 | 0.60 | $1,836,818 |
| 0.30 | -40% | 0.76 | 0.40 | 0.60 | $1,835,094 |
| 0.35 | -30% | 0.76 | 0.40 | 0.60 | $1,825,286 |
| 0.40 | -20% | 0.76 | 0.40 | 0.60 | $1,823,537 |
| 0.45 | -10% | 0.76 | 0.40 | 0.60 | $1,823,537 |
| 0.50 | 0% | 0.76 | 0.40 | 0.60 | $1,821,713 |
| 0.55 | 10% | 0.76 | 0.40 | 0.60 | $1,821,713 |
| 0.60 | 20% | 0.76 | 0.40 | 0.60 | $1,822,677 |
| 0.65 | 30% | 0.76 | 0.40 | 0.60 | $1,822,677 |
| 0.70 | 40% | 0.76 | 0.40 | 0.60 | $1,833,079 |
| 0.75 | 50% | 0.76 | 0.40 | 0.60 | $1,831,240 |

| GCRF | Change % | HBF | LHBF | WTRF | Operating Cost |
|---|---|---|---|---|---|
| 0.20 | -50% | 0.76 | 0.50 | 0.60 | $1,839,876 |
| 0.24 | -40% | 0.76 | 0.50 | 0.60 | $1,834,871 |
| 0.28 | -30% | 0.76 | 0.50 | 0.60 | $1,834,957 |
| 0.32 | -20% | 0.76 | 0.50 | 0.60 | $1,824,329 |
| 0.36 | -10% | 0.76 | 0.50 | 0.60 | $1,824,329 |
| 0.40 | 0% | 0.76 | 0.50 | 0.60 | $1,821,713 |
| 0.44 | 10% | 0.76 | 0.50 | 0.60 | $1,822,313 |
| 0.48 | 20% | 0.76 | 0.50 | 0.60 | $1,823,897 |
| 0.52 | 30% | 0.76 | 0.50 | 0.60 | $1,828,249 |
| 0.56 | 40% | 0.76 | 0.50 | 0.60 | $1,833,458 |
| 0.60 | 50% | 0.76 | 0.50 | 0.60 | $1,835,546 |

| WTRF | Change % | HBF | LHBF | GCRF | Operating Cost |
|---|---|---|---|---|---|
| 0.30 | -50% | 0.76 | 0.50 | 0.40 | $1,833,086 |
| 0.36 | -40% | 0.76 | 0.50 | 0.40 | $1,831,066 |
| 0.42 | -30% | 0.76 | 0.50 | 0.40 | $1,831,066 |
| 0.48 | -20% | 0.76 | 0.50 | 0.40 | $1,827,923 |
| 0.54 | -10% | 0.76 | 0.50 | 0.40 | $1,826,529 |
| 0.60 | 0% | 0.76 | 0.50 | 0.40 | $1,821,713 |
| 0.66 | 10% | 0.76 | 0.50 | 0.40 | $1,821,713 |
| 0.72 | 20% | 0.76 | 0.50 | 0.40 | $1,829,781 |
| 0.78 | 30% | 0.76 | 0.50 | 0.40 | $1,827,705 |
| 0.84 | 40% | 0.76 | 0.50 | 0.40 | $1,829,185 |
| 0.90 | 50% | 0.76 | 0.50 | 0.40 | $1,831,365 |

| Change % | HBF | LHBF | GCRF | WTRF | Operating Cost |
|---|---|---|---|---|---|
| -50% | 0.38 | 0.25 | 0.20 | 0.30 | $1,864,403 |
| -40% | 0.46 | 0.30 | 0.24 | 0.36 | $1,862,338 |
| -30% | 0.53 | 0.35 | 0.28 | 0.42 | $1,858,221 |
| -20% | 0.61 | 0.40 | 0.32 | 0.48 | $1,844,372 |
| -10% | 0.68 | 0.45 | 0.36 | 0.54 | $1,833,772 |
| 0% | 0.76 | 0.50 | 0.40 | 0.60 | $1,821,713 |
| 10% | 0.84 | 0.55 | 0.44 | 0.66 | $1,830,112 |
| 20% | 0.91 | 0.60 | 0.48 | 0.72 | $1,847,206 |
| 30% | 0.99 | 0.65 | 0.52 | 0.78 | $1,844,217 |
| 40% | 1.06 | 0.70 | 0.56 | 0.84 | $1,849,849 |
| 50% | 1.14 | 0.75 | 0.60 | 0.90 | $1,853,185 |

Load Loop (4)

Broker Costing (6)

Resetting Variables (7)

Optimize Load (8)

Broker Pre-Assignments (15)

Company Assignments (16)

End Modification (20)

Hungarian Algorithm Structure (1)

Hungarian Algorithm Step 3 (5)

Hungarian Algorithm Step 4 (6)

Hungarian Algorithm Step 6 (8)

Hungarian Algorithm Find_a_zero (9)

Hungarian Algorithm find_star_in_row (10)

Hungarian Algorithm find_star_in_col (11)

Hungarian Algorithm find_prime_in_row (11)

Hungarian Algorithm convert_path (12)

Find optimal assignment combinations

Find optimal assignment combinations

Find optimal assignment combinations

Find optimal assignment combinations

Find optimal assignment combinations

Final optimal assignments

Final optimal assignments

Find_work_time

METHODS SUITABLE FOR OPTIMIZING LINEHAUL OPERATIONS

REFERENCE TO RELATED APPLICATIONS

This application claims priority from Canadian Patent Application Number 2,551,467 filed on July 4, 2006.

MICROFICHE APPENDIX

Not applicable.

TECHNICAL FIELD

This application relates to linehaul operations in general, and to a system and method suitable for optimizing linehaul operations, in particular.

BACKGROUND OF THE INVENTION

The efficiency of transportation operations is one of the factors having a significant effect on the country's economic growth. A linehaul operation, one of the biggest contributors to the total operating cost of a trucking company, involves moving full loads of less than unit load or full unit load shipments using owner-operator and/or company units.

A review of the prior art revealed that for an optimization procedure to be successful, the following steps have to be executed in sequential order:

(1) Problem definition,
(2) Model development of the problem, and
(3) Solution algorithm development for the model.

The problem must be defined in the most appropriate manner such that it meets the practical requirements of the real-world problem. This ensures that, when the model is developed, it is a more accurate mathematical representation of the problem. The algorithm developed to meet the requirements of the model can be an existing algorithm, a modified existing algorithm, or a new algorithm developed specifically to solve the model. Since algorithms are usually not developed to solve a specific problem, they require significant modification to address specific operational requirements. If the problem to be solved is a unique problem and cannot be addressed by any of the existing algorithms, it is necessary to develop a new algorithm to meet its requirements.

Some of the existing modeling and solution approaches from recent research that are relevant to linehaul operations are discussed in the following sections of this chapter. There are also some commercially available software packages intended to assist in modeling transportation operation problems, and/or finding a solution to the modeled problem. The advantages and disadvantages of these packages are also discussed in the Commercial Modeling Packages section of this chapter. Although considerable research has been completed in the transport operations area, the scale, nature, and complexity of the current linehaul problem addressed in the present invention is significantly different from ones that have been studied so far and reported in prior art.

The linehaul planning problem and the Vehicle Routing Problem (VRP) in general are non-deterministic polynomial time hard (NP-hard) combinatorial optimization problems for which no efficient algorithms are known that provide a global optimum solution. The solution approaches to NP-hard combinatorial problems can be grouped into two categories, namely exact solution approaches and heuristic solution approaches. The exact solution approach looks into almost every possibility to find the optimum solution and is useful for problems of relatively small size. Heuristic algorithms do not indicate how good the result is in relation to the global optimum, but they are the most practical choice for solving large problems because of the efficiency gains and improvements that they can potentially make.

The Traveling Salesman Problem (TSP) is one of the best known problems in combinatorial optimization (Cook et al., 1998). TSP is a sub-problem of the VRP (Lawler et al., 1992). VRP can have a larger set of solution possibilities, depending on the nature of the problem. The TSP can be described as having N destinations, and the cost, $C_{ij}$ to travel from destination i to j. A salesman (vehicle) starts from the depot to visit each destination once and return back to the depot. The problem is to find the optimal route and the destination visiting order that would yield the minimum total travel cost. If the entire set of solutions were enumerated, the number of calculations would be N! (Taniguchi et al., 2001). Table 2 shows the rapid growth of computational time for solving TSP when N, the number of destinations (customers), increases. In this example, a 10 gigahertz (GHz) processor with basic computation time of $10^{-10}$ seconds was used. In an enumeration method, one step may take several computations, but to be conservative, it was treated as if it would take the same time as for one computation. As the following table shows, when N increases from 10 to 50 destinations, computation time to find an exact solution increases from 0.00036 seconds to $9.64*10^{37}$ billion years:

| Sample Size | Computation Time |
| --- | --- |
| 10 | 0.00036 seconds |
| 20 | 7.7 years |
| 30 | 841111 billion years |
| 40 | $2.59 * 10^{21}$ billion years |
| 50 | $9.64 * 10^{37}$ billion years |

Clarke and Wright (1964) developed the earliest heuristic algorithm (that is the Clarke-Wright heuristic algorithm) to solve the VRP. Significant research done to solve the VRP has helped in the development of many heuristic algorithms, which are now commonly used, such as Tabu Search (TS), Simulated Annealing (SA), Genetic Algorithms (GA), and Repeated Descent (RD). Gendreau et al. (1997) applied several heuristics to the VRP and their findings were that the GA, SA, and TS techniques performed significantly well in VRP compared to other algorithms. Wright and Marett (1996) compared the performance of RD, SA, and TS on the TSP and TS outperformed both SA and RD.

Taniguchi et al. (1998) compared the performance of the GA, SA, and TS when applied to the VRP, and concluded that the TS reached the best known solution with the shortest computation time. Reviews on ten of the most common TS heuristics for the VRP with their main features of neighbourhood structures, short term memory, long term memory, and intensification can be found in one of the most recent surveys conducted by Cordeau and Laporte (2002).

The classical VRP is to determine the routes and service order of customers with known demands from a central depot. Although classical VRP models and algorithms cannot be applied to solve linehaul scheduling problems, due to some similarities in the nature of their operations, a survey of the literature pertaining to classical VRP is also included in this chapter. This was done for the purpose of ascertaining what scholars have done to handle similar situations in this subject. It also revealed an understanding of current active research modeling approaches and solution algorithms.

A comprehensive literature survey on the classical VRP and some of its variations was made by Fisher (1995), where he categorized VRP methods into three generations. The first generation consisted of simple heuristics developed in the 60's and 70's, which were mainly based on local search or sweep methods. The second generation included mathematical programming based heuristics (near-optimization algorithms), which differ from normal heuristics in that they include the generalized assignment problems and set partitioning to approximate the VRP. The third and the last generation is the one currently being studied intensively and includes exact optimization algorithms and artificial intelligence methods such as TS, GA, and SA. Christie and Satir (2004) reviewed several existing case studies and found that a 10% to 30% reduction in operational costs is possible through VRP optimization for P & D operations. Satir (2003) analyzed the P & D operations (at a terminal) of a major trucking company in Atlantic Canada, and compared the potential efficiency gains of implementing an optimization system. The results of the case study showed that operational costs could be reduced by as much as 50%.

The classical VRP is not applicable (without additional constraints and considerable modification) to real-world transportation operation problems. One of the problems closest in nature to the classical VRP is that of parcel P & D. In most P & D operations vehicles have various fixed capacities and can serve customers (with varying demands) only within this capacity. This type of problem is referred to as the Capacitated VRP (CVRP) in literature. In most real-world transportation problems, customers have certain time windows within which they have to be served by a fleet of vehicles of varying capacities. This type of CVRP with time windows (TW) is known as VRPTW. The VRPTW has many practical applications such as in LTL P & D from a central depot or multiple depots. Tan et al. (2000) investigated various third generation heuristic methods such as TS, SA, and GA to solve the VRPTW.

Although the classical VRP and some of its variations have been studied extensively in literature, VRP with FTL (VRPFTL) has received relatively less attention in literature. The closest VRP variations to VRPFTL are the multi-depot vehicle scheduling problem with time windows (MDVSPTW) and the multi-trip vehicle routing and scheduling problem (MTVRSP), which have been studied comparatively more. The main difference between VRPFTL and MDVSPTW is that while VRPFTL has one FTL demand per trip (one customer), MDVSPTW can have one or more customer demands to fill the truck per trip. Brandao (1997) points out that the MTVRSP has additional constraints to the VRPTW such as a vehicle can make more than one trip, vehicle's capacity is considered in terms of both volume and weight, the access to some customers is restricted to some vehicles, and driver's schedule must comply with the driving regulations. Desaulniers et al. (1998) published a paper on MDVSPTW and waiting costs, which bears some similarities to the problem addressed in this present invention. A literature survey was also made by Desrosiers et al. (1995) for multi-depot VRP related problems. A recent VRPFTL paper published by Arunapuram et al. (2003) introduced new techniques that were intended to solve such problems with exact solutions, which use a branch-and-bound algorithm to solve an integer-programming formulation of the VRP.

Yang et al. (2004) published a paper which considered various costs associated with empty miles, delayed completion times, and job rejection when using real time information to improve productivity. Liu et al. (2003) developed a heuristic algorithm to determine a mixed truck delivery system that allows both hub-and-spoke and direct shipment delivery modes. Smilowitz et al. (2003) studied the possible integration of longhaul operations for package delivery services, which has similar context to some of the components of the problem addressed in the present invention.

Trucking operations consist of P & D and linehaul operations. The classical VRP is applicable primarily to P & D operations. Although a considerable amount of research on the classical VRP exists in literature, relatively less research has been done on vehicle scheduling and planning for linehaul operations. Planning and scheduling of transportation operations has potential applications in the rail, maritime, trucking, and airline modes of transportation. Some of the real-world problems, models proposed, applications, and implementation benefits pertaining to planning and scheduling in literature are discussed in this section.

Linehaul planning is more challenging than the typical VRP in that the fleet of vehicles has to satisfy each terminal's varying demands from every other terminal, whereas in the classical VRP, it has to satisfy customer demands only from a central terminal. One of the most similar problems to linehaul planning is that of airline planning and scheduling. Significant research has been undertaken in this area, and OR has had a significant impact on the airline industry. Clarke and Smith (2004) point out that American Airlines had an estimated cost savings of approximately $18 million USD per year (relative to previously used enumeration methods) by implementing an optimization-based crew pairing system in 1989. Cook (2000) claims that American Airlines testified that over $500 million was generated annually in incremental profits due to their optimized schedule planning system. In a similar manner, when the Delta Airlines first implemented their fleet assignment module in 1992, the planning group reported an approximate cost savings of more than $100,000 USD per day (Subramaniam, 1994). These cost savings increased as planners gained more experience and confidence with the module, and reached an estimated $200,000 USD per day in late 1993. Ryan et al (2001) reported not only an increase in savings of more than $15,655,000 NZ per year in crew scheduling costs at Air New Zealand, but also an increase in crew member satisfaction.

Many of the problems found in maritime, railway, and airline transportation operations are based on multi-commodity flow problems. A multi-commodity flow problem is defined in the Algorithms and Theory of Computation Handbook as "a maximum-flow problem (finding the maximum flow between any two vertices of a directed graph) involving multiple commodities, in which each commodity has an associated demand and source-sink pairs".

Barnhart et al. (1995) published a partitioning solution procedure to address large-scale multi-commodity flow problems with many commodities. Barnhart et al. (2000) presented a model and iterative solution approach to solve the problem of determining the type of aircraft to assign to each flight and the exact departure time of each flight, given the set of flights with their time windows for a large U.S airline. It should be noted that the process of fleet assignment in airline operations is very similar to tractor assignments in trucking operations, subject to different operational and regulatory constraints.

Barnhart, Hane, and Vance (2000) proposed a branching rule to find a heuristic solution and compared branch-and-price and branch-and-price-and-cut methods to find optimal solutions for highly capacitated problems, specific to telecommunication applications. Barnhart et al. (2002) proposed a new formulation and solution approach that captures network effects and involves the profit maximizing assignment of aircraft types to flight legs.

The general framework for aircraft and crew schedule and planning is given in (Barnhart, 2004). Although decomposing the problem into four subproblems and optimizing them individually would yield a less efficient solution than an overall optimization approach, it is necessary to decompose problems of large size such as linehaul problems in a similar manner to obtain a practical solution in a feasible time.

Toth (2004) stresses the need to undertake planning activities in an efficient way for railway transportation operations and the importance of using computer-aided tools to improve the planning ability of railway systems. He points out some of the problems arising in railway optimization to be line planning, platforming, shunting, locomotive assignment and scheduling, crew scheduling, and train timetabling. In particular, the train timetabling problem, which deals with train scheduling and dispatching, is of similar nature to linehaul planning. Caprara et al. (2002) proposed a graph theoretic formulation to model and solve the train timetabling problem using a directed multigraph in which nodes correspond to departures or arrivals at a certain station at a given instant.

It is also beneficial to understanding the recent research in maritime transportation, since ship routing and scheduling problems are related to linehaul planning problems. Christiansen et al. (2004) reviewed the current status of ship routing and scheduling based on literature published in the last decade. They presented perspectives regarding future developments and use of optimization-based decision-support systems for ship routing and scheduling. They also examined tactical and operational fleet planning operations and consider problems that comprise various ship routing and scheduling aspects. Hooghiemstra et al. (1999) proposed a model for a real ship planning problem, which is a combined inventory management problem and a routing problem with time windows. They also discuss model adjustments to the proposed model to decompose the problem into ship routine and inventory management subproblems. Flatberg et al. (2000) combined an iterative improvement heuristic with an exact solution approach to minimize transportation costs (while ensuring satisfactory inventory levels) within acceptable time limits. The model was for a real-world problem of transporting a single commodity between producing and consuming factories within the same company using a fleet of vessels.

Powel (1996) proposed a stochastic formulation of the dynamic assignment problem with an application to truckload motor carriers where demands arise randomly and continuously throughout the day. Powel et al. (2002) did a case study on implementing operational planning (real-time load matching) model for a trucking carrier. Powel et al. (2000) found that the value of global optimization is lost when users ignore the solution suggested by the model. Crainic and Laporte (1997) discussed some of the main issues in freight transportation operations planning and presented appropriate Operations Research models and methods, as well as computer-based planning tools. They examined the strategic, tactical, and operational decision-making levels and also reviewed significant methodological and instrumental developments in these areas.

The earliest models in freight transportation were deterministic models that captured the time staging of physical activities as against the time staging of information (Powell, 2003). Powell and Carvalho (1998) proposed the use of linear functional approximations to measure the future impact of current decisions in freight transportation planning. Godfrey and Powell (2002) found that non-linear functional approximations produced a better and more stable solution than linear approximations.

Powell et al. (2004) explained a transportation system in terms of the management of the static resources (such as terminals) and passive resources (such as people and equipment) that constrain the system. They also introduced a basic resource model for modeling resources and their attributes. Powell, Shapiro, and Simaõ (2002) formulated a large-scale driver scheduling problem as a multistage dynamic resource allocation problem for an LTL trucking application. The large scale of the problem rendered the use of commercial solvers infeasible. They demonstrated that their techniques provided high quality solutions within reasonable time limits. Powell and Topaloglu (2005) discuss the fleet management problem, which involves managing fleets of equipment to meet the customer requests that arrive randomly over time, often requiring service within a small time window.

Transportation operation problems can be grouped into point-to-point (node) routing and arc routing problems. While in node routing problems the service activity occurs at all (or at some subset of) the nodes, in arc routing problems a single vehicle or a fleet of vehicles must service all (or some subset of) the arcs (and/or edges) of a transportation network (Corberan et al. 2005). The majority of operations fall under the category of point-to-point routing, such as VRP and linehaul operations. Arc routing applications include garbage collection, snow removal, sweeping, gritting, mail delivery, meter reading, school bus routing etc. (Eiselt et al. 1995). Although there are many commercially available packages for arc routing, these packages cannot be used on the current problem, because it is a point-to-point routing problem.

TransCAD is the only software package that fully integrates GIS with demand modeling and logistics functionality (TransCAD 2006). It can be used to solve a variety of logistics problems such as vehicle routing/dispatching, arc routing, and network flow and distribution analysis. Satir (2003) did a case study for real-world P&D operations, using TransCAD to model and solve the problem. The results showed that TransCAD is a very effective scheduling tool for the VRP. However linehaul planning and scheduling problems cannot be solved by using this package.

The ILOG optimization packages are the most popular and considered the de facto optimization standard in OR. The main software components of these optimization packages are: ILOG CPLEX, ILOG Solver, ILOG Dispatcher, and ILOG Scheduler. ILOG (2003) discusses the various components in detail in their respective manuals. A brief description of each of these components from these manuals is summarized in this section.

ILOG CPLEX consists of C, C++, Java, and C# libraries that solve Linear Programming (LP) problems and its extensions such as network flow problems, quadratic programming (QP) problems, quadratically constrained problems, and Mixed Integer Programming (MIP) problems. In MIP problems, any or all of the LP or QP variables are further restricted to take integer values in the optimal solution.

ILOG Solver is a C++ library that allows the user to model optimization problems independently of the algorithms used to solve the problem. The two main techniques for solving the optimization problems are search strategies (Tabu Search or guided local search) and constraint propagation. A comparative study of eight constraint programming languages done by Fernandez and Hill (2003) showed the ILOG Solver to be the fastest, most efficient, and robust.

ILOG Dispatcher is a C++ library that offers features especially designed to solve problems in vehicle routing and maintenance-technician dispatching, This library is made up of classes that represent various aspects of routing plans, their vehicles, visits, and constraints. The Dispatcher finds various applications such as modeling a vehicle routing problem, solving a vehicle routing problem, modeling P & D operations, and routing multiple tours per vehicle. A solution to a routing problem involves the three stages of describing the problem, modeling the problem, and lastly solving the problem by using local search The Dispatcher can also be used to solve a VRP such as an assignment problem, or a P & D problem.

ILOG Scheduler is a C++ library intended to primarily help in solving scheduling and resource allocation problems. It works in conjunction with ILOG Solver and provides specialized modeling and algorithmic enhancements for scheduling problems. ILOG Scheduler makes it feasible to also take temporal and capacity constraints into consideration. The two types of temporal constraints that can be added are precedence constraints and time-bound constraints. While precedence constraints are used when the user needs to specify when an activity must start or end with respect to the start or end time of another activity, time-bound constraints are used to specify when an activity must start or end with respect to a given time.

ILOG CPLEX is not a practical choice for the problem at hand, because the problem requires a MIP formulation, which is extremely processor-intensive and time consuming for a problem of this size. ILOG Dispatcher could not be used for this problem either, because the Dispatcher is specifically designed for P & D type operations.

Using the ILOG Scheduler in conjunction with the ILOG Solver would have been the most appropriate choice to model and solve the problem. However, the problem at hand is not a pure scheduling problem, and has regulatory constraints and operational preferences in addition to the regular operational constraints. The pre-designed modeling environment would make the task of taking these additional regulatory constraints and operational preferences into account very cumbersome.

The latest product from ILOG, which is probably the most appropriate optimization package for linehaul planning is called Transport PowerOps, and was released as recently as April 2005. This package helps planners determine the lowest cost solutions for assigning vehicles, loading shipments and sequencing routes (ILOG PowerOps, 2006). The most important features of PowerOps are that it can handle hours of service regulations, driver rest rules, and multiple time windows. However, a shortcoming of this package is that the current problem requires different fleets to be subjected to different service regulations and for team and single driver vehicles to be handled differently. Some of the other disadvantages of using a package such as PowerOps (besides the company's potential dependency on an external package) are that the model and the operational requirements will have to be updated (building a new model) constantly to accommodate any changes or enhancements made to newer versions of the package, and this would make it difficult to integrate it with the existing IS. Operational preferences which cannot be taken into account by this package at present can be embedded using heuristics. However, this would require significant amount of work in addition to modeling the problem, which by itself is a tedious task. Although this package lacks some features and is not an off-the-shelf package (thus requiring specialized knowledge and expertise to make use of it), it is still a valuable asset to model and optimize linehaul operations.

There is a lack of software specifically designed for linehaul planning and scheduling.

SUMMARY

Planning for large scale linehaul operations is one of the most challenging transportation operations problems due to the complexity (number of decision variables involved) and nature of the operations. The dynamic nature of linehaul operations makes it stressful for planners to make operational decisions and manual planning is a cumbersome and error-prone task.

The present invention addresses the problem of linehaul planning by developing a decision support method that is aimed primarily at assisting planners in making the daily operational decisions, and also to help management in making tactical and strategic decisions. One of the main advantages of this integrated method is that it is independent of any commercially available optimization packages and is customized specifically for linehaul operations. In most of the research done on optimization, dependence on other optimization software or programs is a hindering factor, as customization is a very cumbersome process.

One objective of this invention was to develop a customized solution procedure for real-world transportation problems. In order to ensure that the solution developed could be used in practical situations, a company case study was pursued. This case study made it possible to obtain the relevant data and inside information on linehaul operations and planning, which made it feasible to quantify the potential operational efficiency gains.

Although embodiments of the decision support method relate specifically to a company's linehaul operations, the framework disclosed is such that it would be obvious for a person of skill in the appropriate art to easily adapt and modify what is disclosed herein to suit any linehaul operation.

The efficiency gains are quantified in terms of reduction in linehaul operating costs from the existing operating costs. The linehaul operating costs have four major contributors and are obtained by combining the full mile cost, empty mile cost, broker mile cost, and wait cost. One of the non-quantifiable efficiency gains is higher customer satisfaction, which results from providing them with better service. The other non-quantifiable benefits include higher planner satisfaction because most of the operational decisions are made by the optimization system and higher owner-operator satisfaction, which is achieved by giving them jobs that best suit their work expectations.

Some teachings made by the present disclosure are, inter alia, as follows:
(1) A software model to duplicate the existing linehaul operations;
(2) A comprehensive Integrated Optimization System for linehaul planning;
(3) Revised the Hungarian Assignment algorithm or equivalent and developed an iterative heuristic procedure, using the concepts of relative time and relative time step, for the application of the assignment problem to solve transportation planning and scheduling in linehaul operations;
(4) Development of a method to determine all possible optimum solution combinations;
(5) Development of the "best optimum" concept; and
(6) Development of an automated modification procedure to optimize the values of the coefficients used in the Optimization Model.

There are no commercially available software packages that can duplicate complex linehaul operations. There was a real need among transportation companies to ease the burden of cumbersome manual planning by using a computer program that would assist in making the linehaul operational decisions. Since the trade-offs are made automatically by the program, it eliminates human errors, which leads to significant efficiency savings.

The Integrated Optimization System developed in accordance with one embodiment of this invention contains all the required modules in one single computer program. It is typical to be dependent on different software package(s) to address complex transportation optimization problems. The uniqueness of this optimization system is that it is independent of any other software packages and offers a very comprehensive solution to linehaul operational issues.

In order to automate the process of making the trade-off between hiring broker tractors and owner-operator tractors, it was necessary to add dummy jobs as well as broker tractors to the matrix used in the Hungarian Assignment algorithm or equivalent. In a typical Hungarian Assignment or equivalent procedure, dummy cells are added either to the rows or columns, but not to both.

The size of the matrix used in the Hungarian Assignment algorithm or equivalent is also reduced in every iteration to make the iterative procedure as efficient as possible. The jobs that are eliminated in the current iteration are jobs for which the broker tractor cost is lower than the owner-operator tractor cost and those jobs that have been completed.

The development of the iterative procedure is a major contribution and has introduced many unique concepts such as that of relative time, time step, and also an algorithm to apply the iterative procedure efficiently for the current problem.

There is no known algorithm in literature to determine all the possible optimum solutions for the Hungarian assignment or equivalent problem. The potential efficiency gains encouraged the development of an algorithm to determine and group all possible optimum solution combinations, where every optimum solution combination gives the equivalent lowest total operating cost.

In typical assignment problems, there is no need to find all the possible optimum solutions as any optimum will suffice. However, it was necessary to introduce the best optimum concept because of the complexity of the solution procedure developed and used in this invention. Although any optimum solution would be sufficient for use in a non-iterative procedure, the algorithm developed to determine best optimum solution is a very important contribution because of the cumulative effect it would have on the total operating cost in an iterative procedure.

It would be impossible to manually optimize the values of the weighting coefficients used in the Optimization Model within a feasible length of time and with a reasonable amount of effort. The development of an automated modification procedure to perform this optimization is an important contribution, because it also makes it possible to run this module on a regular basis when further modification of the coefficients is required such as with an operational policy change or the addition of terminals or switch points.

According to one aspect of the present invention, there is provided: a method suitable for optimizing a linehaul operation, the method comprising the steps of: (a) providing at least one assignment algorithm designed to solve an assignment problem; (b) providing at least one heuristic; (c) combining the at least one heuristic with the at least one assignment algorithm to solve the scheduling problem, the combining step comprising the following acts: (i) identifying at least one equivalent assignment solution to an instantaneous assignment problem using the at least one assignment algorithm; and (ii) using the at least one heuristic to select one assignment solution from the at least one equivalent assignment solution such that the selected one assignment solution reduces the cost of at least one other instantaneous assignment solution.

Other aspects and features of the present invention will become apparent to those ordinarily skilled in the art upon review of the following description of specific embodiments of a system and method suitable for optimizing linehaul operations in conjunction with the accompanying drawing figures.

BRIEF DESCRIPTION OF THE DRAWINGS

Embodiments of the present invention will now be described, by way of example only, with reference to the accompanying drawing figures, wherein:

FIGS. 4a-c are an exemplary list of terminals, states, and switch points;

FIGS. 8a-d show exemplary tables to illustrate how the steps of FIG. 7 work;

FIG. 10 shows the working of the heuristic of FIG. 9, by an example illustrating 6 main steps;

FIGS. 27a-m illustrate a flowchart of a revised Hungarian Assignment algorithm or equivalent provided in accordance with one embodiments of the present invention;

Like reference numerals are used in different figures to denote similar elements.

DETAILED DESCRIPTION OF THE DRAWINGS

Terminology

Figure 1:
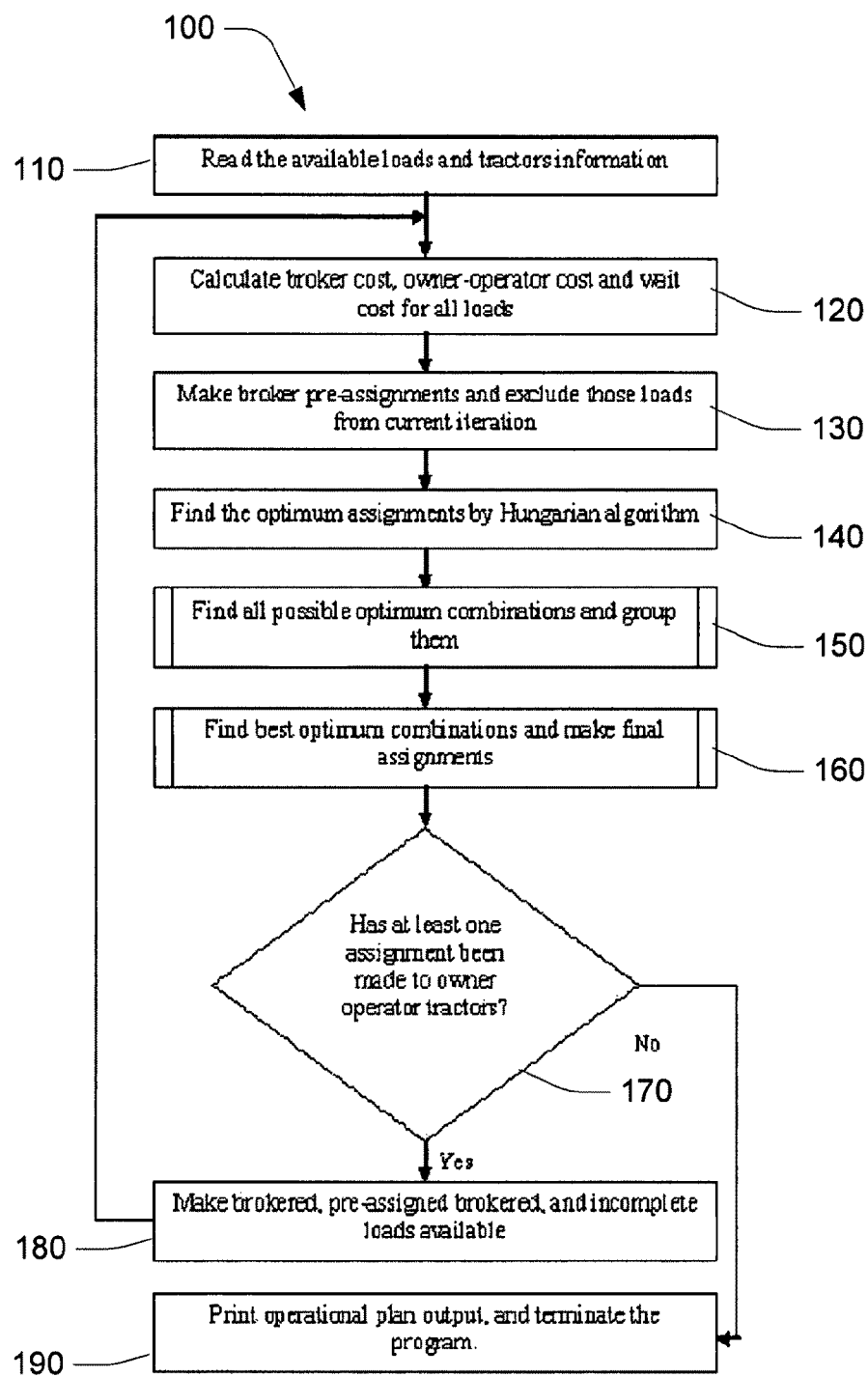
FIG. 1 illustrates an Optimization Model flowchart, provided in accordance with one embodiment of the present invention.

As used in the present description, appended claims, and drawings, the term unit refers to a unit of transport such as for example a container, trailer, or car load. The use of the term trailer or tractor or equivalent in the examples is illustrative only for applicability to the trucking mode of transportation and in no way limits the applicability of the present invention to other modes of transportation than trucking. The invention finds applicability to linehaul operations such as but not limited to trucking, busing, navigation, aviation, rail, and any other mode of transportation and combinations thereof. Furthermore, the use of the two countries Canada and United States in the specification is exemplary only. Application of the invention to other countries is obvious in view of the present specification, drawings, and claims.

As used in the present specification, appended claims, and drawings, the following abbreviations respectively mean:

| | |
|---|---|
| GDP: | Gross Domestic Product; |
| LTL: | Less-than-truck load; |
| FTL: | Full Truck (Trailer) Load; |
| OR: | Operations Research; |
| IS: | Information Systems; |
| GPS: | Global Positioning Systems; |
| TSP: | Traveling Salesman Problem; |
| VRP: | Vehicle Routing Problem; |
| TS: | Tabu Search; |
| SA: | Simulated Annealing; |
| GA: | Genetic Algorithms; |
| RD: | Repeated Descent; |
| VRPFTL: | VRP with FTL; |
| MDVSPTW: | Multi-Depot Vehicle Scheduling Problem with Time Windows; |
| MTVRSP: | Multi-Trip Vehicle Routing and Scheduling Problem; |
| P & D: | Pickup and Delivery; |
| EM: | Effective Matrix; |
| ETA: | Estimated Time of Arrival; |
| PTA: | Projected Time of Availability; |
| EPT: | Earliest Pick-up Time; |
| LPT: | Latest Pick-up Time; |
| EDT: | Earliest Delivery Time; |
| LDT: | Latest Delivery Time; |
| SPT: | Surplus Tractors; |
| O-D: | Origin Destination; |
| MIP: | Mixed Integer Programming; |
| EMR: | Empty Mile Ratio; |
| EDM: | Effective Decision Matrix; |
| WTR: | Wait Time Ratio; |
| HBF: | Home Base Factor; |
| LHBF: | Leg Home Base Factor; |
| GCR: | Getting Close Ratio; and |
| MR: | Maximum Ratio. |

Mathematical Definition of the Problem

The mathematical definition of the problem of linehaul planning and scheduling is presented as follows.

There is an undirected traffic network G=(V, E), with the following parameters:
(1) Node set V corresponding to all the terminals and dummy terminals (switch points and states in the US);
(2) Edge set E corresponding to the distance between two nodes in the network;
(3) Job set J, each job $j \in J | 0 \leq j < l$ ((where l is the number of available loads) characterized by the following parameters:
  (a) Order number,
  (b) Origin and destination terminals (nodes),
  (c) Intermediate nodes that have to be visited,
  (d) Commodity type and number of LTL shipments,
  (e) Earliest Pick-up Time (EPT),
  (f) Latest Pick-up Time (LPT),
  (g) Earliest Delivery Time (EDT), and
  (h) Latest Delivery Time (LDT).
(4) Tractor set T, each tractor $j \in T | 0 \leq i < t$ (where t is the number of available tractors) characterized by the following parameters:
  (a) Team or single driver ($i_d$),
  (b) Canada or US+Canada fleet (driver of the tractor must also be eligible to drive in the US),
  (c) Current location (Node),
  (d) Home base,
  (e) Running mileage,
  (f) Maximum mileage,
  (g) Current time away,
  (h) Maximum time away,
  (i) Projected time of availability, and
  j) Estimate time of availability.
(5) Broker tractor set B, each tractor $i \in B | t \leq i < t+1$, such that there is a broker tractor available at the origin of every load.
(6) Cost matrix C, $c_{ij} \in C | 0 \leq i < t+1, 0 \leq j < l$, where $c_{ij}$ represents the operating cost of assigning a job to an owner-operator or broker tractor, and $c_{ij}$ is a function of full miles, owner-operator or broker tractor cost per mile, empty miles, cost per empty mile for an owner-operator tractor, and wait time cost for an owner-operator tractor at a non-home based node.
(7) Traveling distance $d_j$ between the origin and destination for any $j \in J$; and
(8) Traveling time $t_{ij}$ for any $i \in T$ and $j \in J$, which is a function of $d_j$ and $i_d$ ($f(d_j, i_d)$).

A feasible solution consists of:
(1) Job assignments to both owner-operator and broker tractors, and
(2) A set of specified routes and schedules for the assigned tractors, indicating empty mile movements if any.

Subject to the following operational constraints:
(1) Job has to be done by a tractor within the job's time window,
(2) A tractor must not be assigned job(s) that will result in the accumulation of more than its maximum allowable mileage within a certain predetermined time period.
(3) A tractor must not be assigned job(s) that will result in the tractor being away for longer than its maximum time away period,
(4) At any given time, one job can be assigned to only one tractor, and one tractor can do only one job, and
(5) A US job has to be assigned to a US+Canada fleet tractor.

The objective is to find a feasible solution that minimizes the total operating cost, where the operating cost is a function of owner-operator's full miles, brokered full miles, wait time of owner-operator tractors for jobs at non home-base nodes.

The Optimization Model

In order to make the most of the Optimization Model, the following sequence of steps was executed: Mathematical definition of the problem, Model Development, and Solutions Algorithms. This customized solution development for line-haul operations enabled the Optimization Model to provide more efficient operational decisions.

The Optimization Model focuses on producing a better solution, which yields lower operating costs than known models. The Optimization Model also makes use of the same information as that available to dispatchers and planners, but can handle very complex calculations. It is an iterative Hybrid Model, where exact solution assignment algorithms are used in conjunction with improvement heuristics in every iteration to improve the final solution.

The Optimization Model uses the following structures which are known from other models:
(1) Loads: l available loads
  (a) Load number: assigned by the computer program for relative referencing
  (b) Order number: as given by COMPANY
  (c) Originating Terminal
  (d) Destination Terminal
  (e) LOS
  (f) Assignments
  (g) Time window
  (h) Sort_field (=10*distance/(LDT−EPT)+(10*LTL_weight)−(10*EPT))
  (i) EPT
  j) LPT
  (k) EDT
  (l) LDT
  (m) Commodity_type
  (n) No_of_LTLs: number of LTL shipments
(2) AVTR: t available tractors
  (a) Tractor_no: assigned by the computer program for relative referencing
  (b) Tractor_code: tractor code assigned by COMPANY
  (c) Cur_term_code: three letter terminal code assigned by COMPANY denoting the current location of the tractor
  (d) Cur_term_num: corresponding terminal number used in the Models
  (e) Running_mil: the accumulated running mileage of the available tractor for the last 7 days
  (f) Max_mil: maximum allowable mileage for a tractor
  (g) Home_base: home base of the available tractor
  (h) Sched/wild: denotes whether a tractor is scheduled or not (wild)
  (i) Sort_field (=(max_mil+min_mil)/2−running_mil+1000/(avail_time or 1 if avail_time<1))
  (j) (Team/Single) Driver: 1=>single;0=>team
  (k) (US/Canada) Fleet: 1=>US+Canada; 0=>Canada only
  (l) Assignments: to store details of the load assignments to be made (as explained in (4))
  (m) Cur_time_away
  (n) Work_time
(3) Terminal list: contains three-letter terminal code and matching terminal number.
(4) as_tr: Used for the assignment field in tractors
  (a) Load number: the load number of the load that is assigned to the tractor. It is set to −1 if the tractor has not been assigned a job as yet
  (b) Leg number: of the load that is assigned to that tractor
  (c) Cost: cost for the tractor to do the job
  (d) ETA
  (e) PTA
  (f) Wait_time: wait time incurred by a tractor in doing the assigned job
(5) as_load: Used for the assignment field in loads
  (a) ETA
  (b) Tract_num: number of the tractor that is assigned to the load
  (c) Leg_org_term: origin terminal of that leg of the load
  (d) Leg_dest_term: destination terminal of the leg of the load
  (e) Dis: distance between origin and destination of a leg
(6) SPT_type: (Used to process information on surplus tractors at a terminal. This is created in the preprocessing phase to use in the algorithm, and is not initial input]
  (a) SPT_num: numbering used for relative referencing
  (b) term_num: terminal number associated with the SPT_num
(7) time_field: Used for time fields in load and truck files. Separates the time read into year, julian_day and time and is converted to a floating point value
  (a) year
  (b) jul_day: date in julian format
  (c) time_float: floating point value of time
  (d) relative time: =(current_date−date being read in)*24−current time+time being read in)
(8) Distance Matrix: stores the distance in miles between any pair of terminals (including the switch points)
(9) Time Matrix: stores the time taken (in hours) for a single driver to drive between any pair of terminals by taking the driving regulations into consideration The following additional structure (leg_arr) introduced to handle switch points. This structure stores the leg information for any pair of terminals
(10) Leg_arr:
  (a) Org_term: origin terminal of that leg of the load
  (b) Dest_term: Destination terminal of that leg of the load
  (c) Num_sp: number of switch points
  (d) Legs[nas]: the pre-determined legs (switch points and terminals)
  (e) Dis: distance between the origin and destination of the leg Referring to the drawings, FIG. 1 illustrates an Optimization Model flowchart, provided in accordance with one embodiment of the present invention. The Optimization Model flowchart 100 uses iterative procedures to make operational decisions for a given situation of jobs and tractors and is explained in detail, together with the mathematical model on which it is based further below.

The systematic approach followed to make the job assignments to tractors using this model is given in the steps and acts recited below:

(1) At step 100, read in information on available loads, tractors and the pre-determined switch points between every possible pair of terminals.

(2) Divide every load into a fixed number of legs, depending on the pre-determined switch points for that particular O-D pair.

(3) At step 120, calculate the broker cost for each leg of every load, and also for the entire distance between the origin and destination of the load.

(4) Form a cost matrix with the available loads along the columns, and available tractors along the rows. Each cell represents the cost of assigning the corresponding job (or leg of the job) to the tractor.

(5) Form a wait cost matrix, where each cell of the wait cost matrix represents the wait cost in dollars when a particular job is assigned to the corresponding tractor.

(6) At step 130, make the broker pre-assignments for those loads that cost less if assigned to brokers. These loads are then excluded from the available loads for the current iteration.

(7) At step 140, assign the remaining loads (or leg of the load) by an exact solution algorithm (Hungarian Assignment algorithm or equivalent) to yield the set of assignments that have the overall minimum operating costs for that given situation.

(8) At step 150, send the effective matrix, which is produced by the Hungarian Assignment algorithm or equivalent to determine the optimum solution, to the find optimum combinations function which has an algorithm to find all the possible optimum combinations.

(9) At step 160, make final assignments for the current iteration by using the algorithm in the final optimal assignments function, in which several factors such as a tractor's home base, wait time, maximum time away, and maximum mileage are weighted for final assignments.

(10) Start the next iteration (repeat acts 4 through 10), if at least one assignment is made to owner-operator tractors at step 170. In this case, at step 180, make all the loads that are assigned to brokers, and incomplete jobs (when at least one leg is yet to be assigned) available.

(11) At step 190, print all the required output such as, the owner-operator tractors' full-mile and empty-mile assignments, the number of brokers required at each terminal, and the total operating cost.

Every job in the Optimization Model is thus treated as having a fixed number of legs, with one leg processed per iteration.

The broker cost for each leg of the load is calculated by using the current broker cost per mile, and the distance between the origin and destination of that leg, and is stored in the broker cost matrix. Each cell of the cost matrix represents the cost that a trucking company would incur if their tractor was to move a particular load (either for the leg currently being examined, or for the move from origin to destination in the case that there are no switch points between the origin and destination of that load). This cost is calculated using certain formulae, depending on several criteria which are discussed in greater detail further below. When it is not viable or beneficial to move a company tractor to haul a load, the corresponding cells are assigned a big number indicating that such a move is not feasible. These cases are as follows:

(1) If either the origin or destination of the load is in the US, but the tractor is not capable of going to the US, (2) If the load cannot be delivered before its deadline, (3) If a tractor gets more than its maximum allowable mileage by delivering that load, (4) If a tractor will be away longer than its maximum allowable time away by delivering that load, and (5) If an empty mile is greater than half the remaining distance of the legs of the load.

If the cost of assigning a job to an owner-operator tractor (from the cost matrix) is lower than the cost of assigning that job to a broker tractor (from the broker cost matrix), this job is considered assigned to a broker tractor, and unavailable for that iteration. This is done in order to reduce the size of the matrix sent to the Hungarian Assignment algorithm or equivalent, and save processing time.

The Hungarian Assignment algorithm or equivalent is one of the most efficient exact solution assignment algorithms. It can be used on square matrices to find the optimum assignments, which yield the overall minimum operating cost. The assignment of a job to a tractor is indicated by a "1", and no assignment is indicated by a "0" at the corresponding cell of the decision matrix, X. The cost matrix is transformed to a matrix known as the effective matrix, in the Hungarian Assignment algorithm or equivalent. This matrix is used in the find optimum combinations function, where all possible optimum combinations are grouped in such a way that changing a particular job's assignment to a certain tractor within that group still yields the same optimum solution. The different combinations found are then analyzed in the final optimal assignments function to determine the best optimum combination of job assignments to tractors. The difference between the best optimum combination and any possible combination is that, although the operating cost for the current iteration is the same for both, the best optimum combination yields lower operating cost for the next iteration. Using best optimum combinations in every iteration accumulates significant savings at the end of the iterations, thus yielding a solution that is closer to the global optimum solution. Possible optimum combinations are weighted to determine the best optimum solutions with factors such as wait time cost, home base and getting closer to home base factors (the tractors should be at the right location in order to lower the costs for the next iteration), and fairness factors such as a tractor's maximum time away and maximum mileage.

If at least one assignment is made to a company tractor in the current iteration, another iteration is performed with the remaining unassigned loads (including loads that were assigned to brokers in the current iteration). This process is repeated until no more company tractor assignments can be made. In the case where all possible assignments have been made, the program terminates by printing all the required output.

Figure 24:
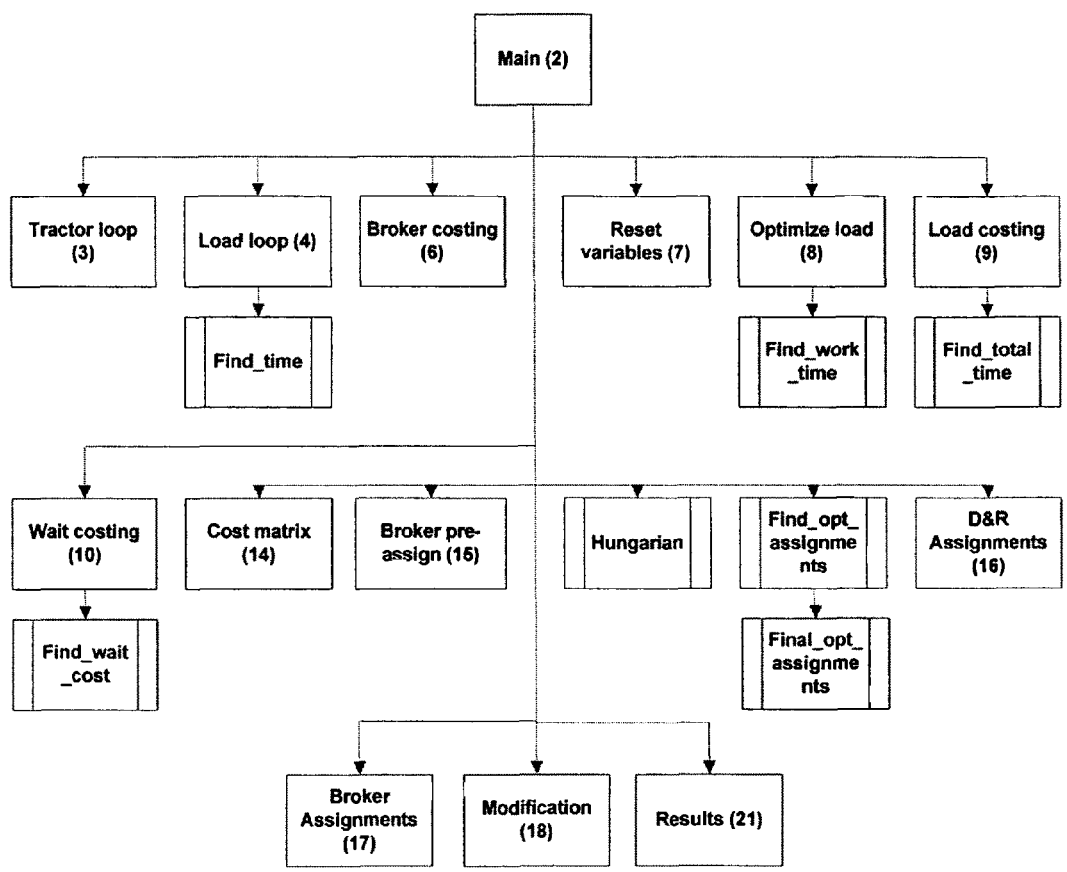
FIG. 24 illustrates the structure of one embodiment of a system comprising an optimization model provided in accordance with one embodiment of the present invention.

FIG. 24 illustrates the structure of one embodiment of a system comprising an optimization model provided in accordance with one embodiment of the present invention. FIG. 25 illustrates a flowchart of one embodiment of a method comprising an optimization model provided in accordance with one embodiment of the present invention.

Modification and Verification of the Optimization Model

The coefficients of the weighting factors used in the final optimal assignments function had to be determined to yield the planning solution with the lowest possible operating cost. It was a very cumbersome and almost impossible task to determine the optimum values for these coefficients semimanually as they are very sensitive (changing the values of these coefficients has a significant impact on the total operating cost).

In order to make operations as efficient as possible, it was necessary to automate the modification process of optimizing the values of the coefficients. A modification module was thus developed for use in the Optimization Model. In this module, a customized search algorithm to optimize the values of coefficients was developed, inspired by the basic principles of Pattern Search.

Figure 2:
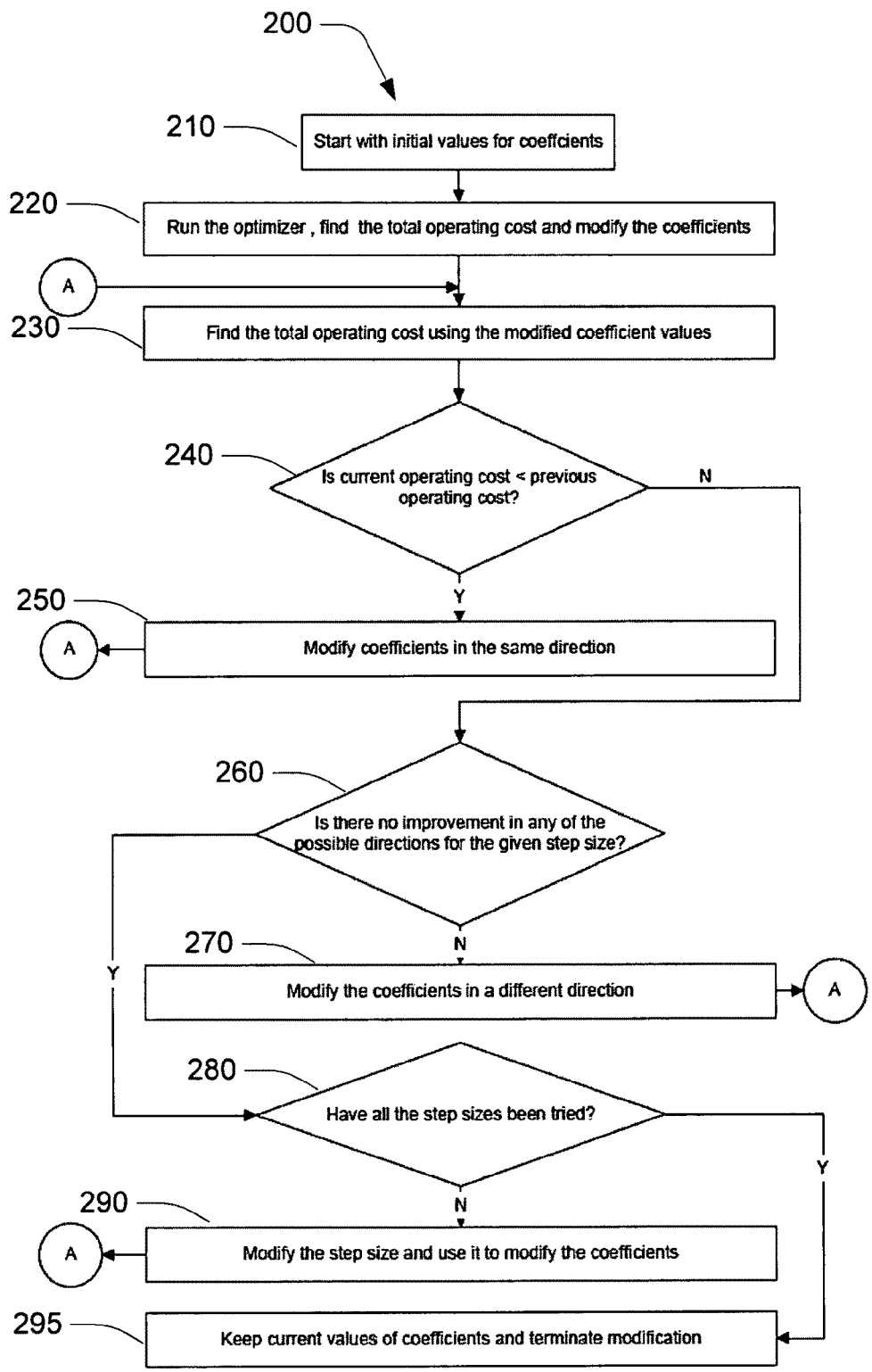
FIG. 2 illustrates a flowchart for the Modification procedure, provided in accordance with one embodiment of the present invention.

FIG. 2 illustrates a flowchart for the Modification procedure, provided in accordance with one embodiment of the present invention. In the flowchart 200, at steps 210, 220 the optimizer is first run with given initial values for the coefficients, and the total operating cost is calculated. At step 230, the coefficients are then modified by a certain pre-determined step size, after which the optimizer is run again, to calculate the new total operating cost. At step 240, if this cost is less than the previous operating cost that was calculated, the coefficients are modified again in the same direction at step 250 (where direction refers to either incrementing or decrementing a coefficient by the step size). The total operating cost is then recalculated. If there is no improvement after modification of the coefficients (that is, if the resulting total operating cost is higher than the previous operating cost), then it is necessary to check if the coefficients have been varied in all possible directions with the given step size at step 260. If all possible directions have been tried at step 270, then the step size is modified by either incrementing or decrementing it at steps 280, 290. This is because the solution could otherwise be stuck at a local optimum. Step 295 returns the values of the coefficients selected by the modification method.

The amount and number of times the step size should be varied depends on the amount of precision required. Once the step size has been changed, the optimizer is run again with the modified value of coefficients. If all possible directions have not been tried, the direction is modified and the optimizer is run again, and the entire process repeated until all the different step sizes have been tried for all directions without any improvement.

The modification process can take up to several days to run on a large data set, because it runs the optimizer hundreds of times. In order to make the modification process more efficient, it is first run with a smaller data set, to find the initial values of the coefficients. These coefficients are then used for the larger data set, to fine tune the initial values and further optimize the values of the coefficients. This makes it feasible to run the modification process even with large data sets within a day.

It is necessary to run this modification module only when there are changes in the company's operational policy. For instance, the company's policies on the importance of the wait time cost, home base and getting closer to home base factors, and fairness factors such as a tractor's maximum time away and maximum mileage might change. This change in the company's operational policy must be reflected in the functions where these factors are calculated and the modification process must then be re-run to optimize the values of the coefficients.

FIGS. 25$q$, 25$r$, and 25$s$ illustrate in further detail steps of a modification procedure provided in accordance with one embodiment of the present invention.

Quantifying Efficiency Gains

There are two main types of efficiency gains obtained from the Optimization Model. One of the gains is quantifiable, while the other is non-quantifiable. The quantifiable gains are obtained by comparison of the total operating cost obtained in the Optimization Model and a known reference model. The same input data set is used in both models, to determine the magnitude of savings that can be made in terms of the total operating cost. The operating cost is based on the four values of full miles, broker miles, empty miles, and wait time cost. Thirty days of operational data from a trucking company were used, and the average percentage changes in these values between their current Model and the Optimization Model were calculated. This percentage change in these four values represents the efficiency change in the operations when the Optimization Model is used.

The annual economic benefits of using the Optimization Model can be estimated by calculating the difference between the annual cost of existing operations and the annual cost determined by using the Optimization Model. The total annual cost of linehaul operations for a trucking company was calculated by using past operational data from January 2005 to December 2005. The percentage changes (that were previously calculated) were applied to the existing operational values to estimate the operational values for the same time period assuming the decisions had been made using the Optimization Model. The estimated operational values for the Optimization Model were used to calculate the total annual operating cost.

It is not possible to directly quantify the benefits of higher customer, planner, and owner-operator satisfaction obtained from better decision-making and scheduling. However, these factors can be estimated in time through a series of surveys and also by observing the trends in owner-operator, customer, and planner retention. Observing the trends may not be a very accurate way to estimate these benefits, due to the changing nature of the market conditions.

Further Details of the Optimization Model

The Optimization Model is a hybrid model to be used as a decision support system, which was developed by integrating the exact and heuristic solution approaches. This decision support system is intended to make the majority of operational decisions, as well as to assist in making tactical and strategic decisions. The model primarily helps to make operational decisions by optimizing job assignments to tractors.

Tactical decisions such as determining the right number of owner-operator tractors at a terminal can be made by running the model with different scenarios (number of owner-operator tractors at a terminal) and choosing the scenario that yields minimum cost.

Strategic decisions include determining the location of a new terminal or changing the location of an existing terminal to a different one. It would be almost impossible to carry out such intensive analyses manually, but the model can justify either an existing terminal location change or adding a new terminal by running both scenarios with the same operational data and choosing the scenario that yields lower operating costs. If the current situation has a lower operating cost, then no changes should be made.

Figure 3:
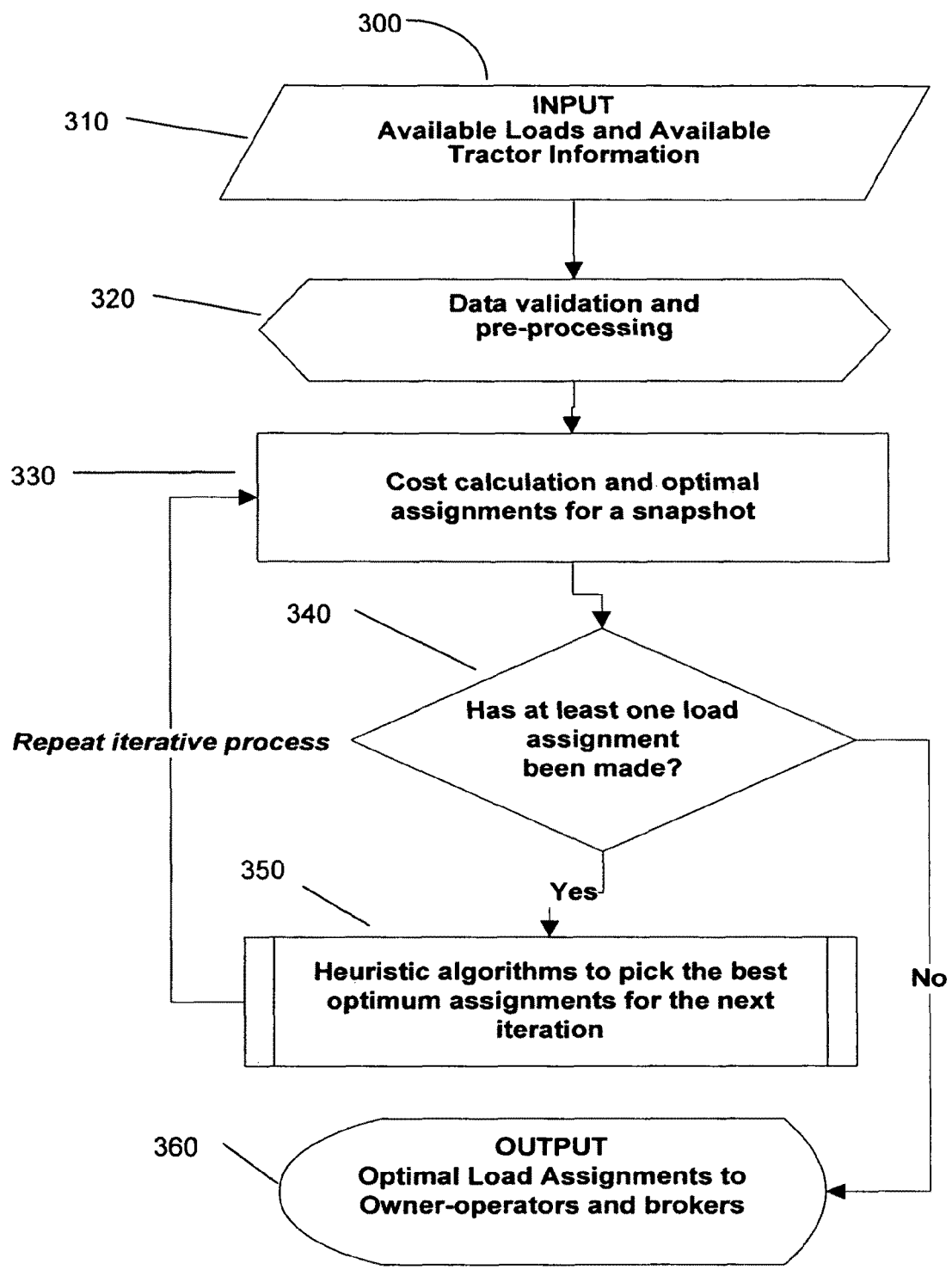
FIG. 3 illustrates an Optimization Model flowchart, provided in accordance with one embodiment of the present invention.

FIG. 3 illustrates an Optimization Model flowchart, provided in accordance with one embodiment of the present invention. Flowchart 300 outlines the main processing steps of the Optimization Model. The quality of the operational decisions made by the Model relies on the accuracy of the input data at step 310. Thus the input on available loads and tractors collected at step 310 is sent to the data preprocessing and validation module at step 320 to produce the refined data for the model before proceeding to the next step 330. This refined data then enters the hybrid model, where load assignments are made in each iteration by the exact solution algorithm for a given situation or snapshot at step 330 and the assignments for that iteration are finalized by heuristic algorithms that choose the best optimum combination of assignments for the next iteration or snapshot at step 350 (as is discussed in greater detail below). This process is repeated until it is determined at step 340 that no further load assignments can be made. The operational decisions are then produced as output from the Model at step 360.

The Optimization Model uses fixed and variable input data. The fixed input data includes the distance matrix, list of terminal codes, and information on switch points between O-D terminal pairs. The variable input data (as discussed above) used in the Model is the data on available loads and tractors, which is the same information that planners and dispatchers use to make operational decisions. The output from the model is primarily the operational decision plan, but also includes statistical information on the various parameters used to make these decisions. The optimization model will be discussed further under the following headings:

(1) Fixed Input Data Structure,
(2) Exact Solution Approach,
(3) Finding Best Optimum Heuristics,
(4) Iterative Solution Procedure,
(5) Supporting Functions, and
(6) Modification.

Fixed Input Data Structure

Fixed input data is data that does not have to be updated on a daily basis, but changes only in such situations as when a terminal or switch point is added (or removed). FIG. 4 is an exemplary list of terminals, states, and switch points. The first column contains the terminal numbers used by the optimization program, the second column contains the 3-letter terminal code as assigned by a trucking company, the third column contains the terminal names, and the last column contains the time differences relative to Atlantic Time. This time difference information is used in the program to find the time that is gained or lost while traveling across different time zones. This list must be updated whenever a switch point or terminal is added or removed. Terminals 0-40 are the actual Canadian terminals, while the rest of the list contains dummy terminals that represent either US States or Canadian switch points. The number of terminals including the dummy terminals is n=117, starting from 0 and going up to 116.

Each cell of the distance matrix contains the distance (in miles) between the O-D pair represented by that cell. A sample distance matrix is given in Table 1:

|   | 0 | 1 | 2 | 3 | 4 | 5 | ... | 116 |
|---|---|---|---|---|---|---|---|---|
| 0 | 0 | 400 | 148 | 248 | 265 | 335 | ... | 631 |
| 1 | 400 | 0 | 44 | 55 | 106 | 217 | ... | 451 |
| 2 | 148 | 44 | 0 | 100 | 117 | 188 | ... | 483 |
| 3 | 248 | 55 | 100 | 0 | 62 | 201 | ... | 497 |
| 4 | 265 | 106 | 117 | 62 | 0 | 218 | ... | 514 |
| 5 | 335 | 217 | 188 | 201 | 218 | 0 | ... | 447 |
| . | . | . | . | . | . | . | . | . |
| . | . | . | . | . | . | . | . | . |
| . | . | . | . | . | . | . | . | . |
| 116 | 631 | 451 | 483 | 497 | 514 | 447 | ... | 0 |

Given the nature of linehaul operations, the time taken to travel between an O-D pair can be estimated by dividing the distance between the two terminals by the average speed (as a fairly constant speed can be maintained while traveling between terminals). However in cases where this estimation is not precise enough for the application, an additional time matrix can be constructed to store the time it takes to travel between O-D pairs.

The switch points for a given O-D pair are determined using two files—one that contains the actual information on the switch points, and the other that contains a matrix where each cell stores line numbers to reference the correct O-D pair in the first file. The default order for a given pair of terminals is to have the origin first, and then the destination. However a terminal that occurs as the destination in one case may be the origin in another. The system of relative referencing using the line number matrix makes it possible to determine the correct switch points for any O-D pair, regardless of the order in which the terminals occur. A sample 10×10 line number matrix for the first 10 terminals is given in Table 2:

|   | 0 | 1 | 2 | 3 | 4 | 5 | 6 | 7 | 8 | 9 |
|---|---|---|---|---|---|---|---|---|---|---|
| 0 | -1 | 0 | 1 | 2 | 3 | 4 | 5 | 6 | 7 | 8 |
| 1 | 0 | -1 | 40 | 41 | 42 | 43 | 44 | 45 | 46 | 47 |
| 2 | 1 | 40 | -1 | 79 | 80 | 81 | 82 | 83 | 84 | 85 |
| 3 | 2 | 41 | 79 | -1 | 117 | 118 | 119 | 120 | 121 | 122 |
| 4 | 3 | 42 | 80 | 117 | -1 | 154 | 155 | 156 | 157 | 158 |
| 5 | 4 | 43 | 81 | 118 | 154 | -1 | 190 | 191 | 192 | 193 |
| 6 | 5 | 44 | 82 | 119 | 155 | 190 | -1 | 225 | 226 | 227 |
| 7 | 6 | 45 | 83 | 120 | 156 | 191 | 225 | -1 | 259 | 260 |
| 8 | 7 | 46 | 84 | 121 | 157 | 192 | 226 | 259 | -1 | 292 |
| 9 | 8 | 47 | 85 | 122 | 158 | 193 | 227 | 260 | 292 | -1 |

A "−1" at a cell implies that no switch points are possible in this case, because the origin and destination are the same terminal.

Consider the O-D pair 0-7, which has a "6" at that cell. The corresponding switch point(s) for that pair can be found by going to the corresponding line number (row 6) of Table 3 which contains sample switch point information for 22 O-D pairs:

| Line Number | Origin | Destination | No. of Switch pts. | Switch Points |   |   |   |   |
|---|---|---|---|---|---|---|---|---|
| 0 | 0 | 1 | 0 | -1 | | | | |
| 1 | 0 | 2 | 0 | -1 | | | | |
| 2 | 0 | 3 | 0 | -1 | | | | |
| 3 | 0 | 4 | 0 | -1 | | | | |
| 4 | 0 | 5 | 0 | -1 | | | | |
| 5 | 0 | 6 | 0 | -1 | | | | |
| 6 | 0 | 7 | 1 | 6 | | | | |
| 7 | 0 | 8 | 1 | 6 | | | | |
| 8 | 0 | 9 | 1 | 6 | | | | |
| 9 | 0 | 10 | 1 | 6 | | | | |
| 10 | 0 | 11 | 1 | 6 | | | | |
| 11 | 0 | 12 | 2 | 6 | 11 | | | |
| 12 | 0 | 13 | 3 | 6 | 11 | 14 | | |
| 13 | 0 | 14 | 2 | 6 | 11 | | | |
| 14 | 0 | 15 | 2 | 6 | 11 | | | |
| 15 | 0 | 16 | 3 | 6 | 11 | 10 | | |
| 16 | 0 | 17 | 4 | 6 | 11 | 107 | 16 | |
| 17 | 0 | 18 | 4 | 6 | 11 | 107 | 16 | |
| 18 | 0 | 19 | 5 | 6 | 11 | 107 | 16 | 18 |
| 19 | 0 | 20 | 6 | 6 | 11 | 107 | 16 | 18 | 19 |
| 20 | 0 | 21 | 6 | 6 | 11 | 107 | 16 | 18 | 19 |
| 21 | 0 | 22 | 6 | 6 | 11 | 107 | 16 | 18 | 19 |

The switch point information for the O-D pair 7-0 is the same as for 0-7, and is thus available at row 6 as well. The table of switch points contains information on the O-D pair, the number of switch points for that O-D pair, and the actual switch points. "−1" is used when an O-D pair that does not have any switch points. A load may have as many as 9 legs in this Model, and can be changed as per the requirements. The line number matrix, as well as the switch points table has to be suitably changed when a terminal or switch point is added.

A terminal may have one or more codes in addition to the standard 3-letter code assigned to the terminal. An additional fixed input file is used to match such code(s) to the standard code. For instance consider the Hartland terminal, which has the standard code HAR. A US fleet tractor based in Hartland may have the code UHA to indicate its home base, and a pre-scheduled tractor may have the code SHA.

Exact Solution Approach

For a given situation (of jobs and tractors), a cost matrix is created, where each cell of the matrix represents the cost of assigning the corresponding job to the corresponding tractor. An infeasible assignment is indicated by a large number (10000). Infeasible assignments as discussed above occur in the following cases:

(1) If either the origin or destination of the load is in the US, but the tractor is not capable of going to the US,
(2) If the load cannot be delivered before its deadline,
(3) If a tractor gets more than its maximum allowable mileage by delivering that load,
(4) If a tractor will be away longer than its maximum allowable time away by delivering that load, and
(5) If an empty mile is greater than half the remaining distance of the legs of the load.

Figure 5:
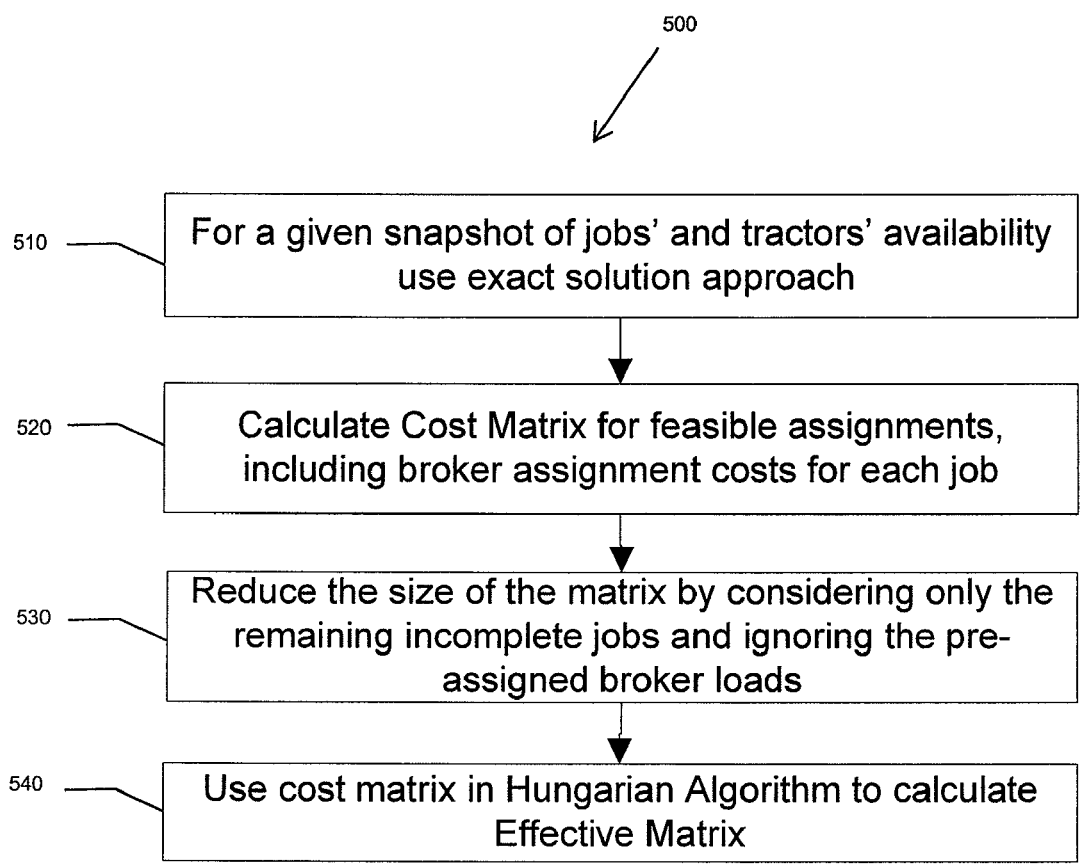
FIG. 5 illustrates an exact solution approach, provided in accordance with one embodiment of the present invention.

FIG. 5 illustrates an exact solution approach, provided in accordance with one embodiment of the present invention. At step 510, the exact solution approach is used for a given snapshot of jobs and tractors' availability. Creating the cost matrix at step 520 is the most crucial step of the exact solution approach 500. At steps 530 and 540, an effective matrix (EM) is calculated based on the cost matrix and this is used in the Hungarian Assignment algorithm or equivalent (for assignment problems), which is the exact solution approach to determine the reduced EM rather than the Decision Matrix (optimum assignments of jobs to tractors) for a given situation. In almost all cases any optimum set of assignments would suffice, but because the Model uses an iterative solution approach, a set of assignments made in one iteration has a great impact on the solution in the next iteration. Each iteration processes one leg of a job, whether the job has one or many legs. Thus an optimum solution, which would give a better solution in the future iterations, is found by using the reduced EM in a heuristic solution approach. Such an optimum solution is called the "best optimum solution" in this present invention, and will be discussed in the next section. The exact solution approach will be discussed in greater detail under the following headings:

(1) Mathematical Model,
(2) Cost Calculation, and
(3) Solving the model using the Hungarian Assignment algorithm or equivalent.

Mathematical Model

For a problem of this size and complexity, the efficiency of the solution algorithm is crucial, to be able to obtain the solution in an acceptable length of time. In the iterative approach, feasible assignments are made for the given situation and the completion times (new relative available time for the next iteration) are calculated. The iterative approach also reduces the problem size for the next iteration by considering only incomplete (if at least one leg remaining to be assigned) and pre-assigned broker loads. The original MIP problem was reformulated as an assignment problem so that the Hungarian Assignment algorithm or equivalent could be utilized. The Hungarian Assignment algorithm or equivalent is one of the most efficient exact solution algorithms and can determine the job assignments to tractors within a reasonable period of time even for problems of extremely large size.

As shown in the mathematical model below, the assignment problem is subject to 3 constraints:

(1) A load cannot be assigned to more than one tractor,
(2) A tractor cannot be assigned more than one job, and
(3) A binary decision variable should be used to indicate whether a job is assigned to a tractor or not.

Cost calculation plays a crucial role in making efficient use of the assignment algorithm, which will be discussed in detail in the next sub-section. The mathematical formulation of the model is presented in equations (1) to (12) below:

1. Objective function: $\text{Min} \sum_i \sum_j C_{ij}, X_{ij}$, subject to (2), (3), (4):

2. $\sum_i X_{ij} = 1, \forall\, j \in \{0, \ldots, l, \ldots l+t-1\}$

3. $\sum_j X_{ij} = 1, \forall\, i \in \{0, \ldots, t, \ldots t+l-1\}$

4. $X_{ij} = \{0, 1\}, \forall\, i, j$ $C_{ij}$ Calculation:

5. $C_{ij} = \begin{cases} (EMR * \lambda_1 * S_{ij} + \lambda_2 * D_j - (1 - H_{ij}) * WC_{ij}), \forall\, i < t, \forall\, j < l \\ (CBT * D_j), \forall\, i \geq t, \forall\, j < l \\ 0, \forall\, j \geq l \end{cases}$ 6. $T_{ij} = \max(A_i, 0) + \max(ST_{ij}, \tau ST_{ij}) + TDS_{ij}, \forall\, i, j$ 7. $W_{ij} = \max((R_j - T_{ij}), 0) + \min(A_i, 0), \forall\, i, j$ 8. $WC_{ij} = \begin{cases} \max((\lfloor 12 * (8 * \lfloor \lfloor (W_{ij} - 12)/8 \rfloor)/2 \rfloor) + (W_{ij} - 12) \rfloor, 0) & \text{if } i_d = 1 \\ \max(\lfloor 16 * (W_{ij} - 6) \rfloor, 0), & \text{if } i_d = 0 \end{cases}$ 9. $C_{ij} = \begin{cases} M, \text{ if } j_o \text{ or } j_d \in \{US\} \text{ and if } i \in \{USF\}, \forall\, i, j \\ C_{ij}, \text{ otherwise} \end{cases}$ 10. $C_{ij} = \begin{cases} M, \text{ if}(M_i + S_{ij} + D_j + DH_i) > F_i, \forall\, i, j \mid j_d \neq i_h \\ C_{ij}, \text{ otherwise} \end{cases}$ -continued 11. $C_{ij} = \begin{cases} M, \text{ if}(CT_i + \tau ST_{ij} + TDS_{ij} + \tau P_{ij} + TDP_{ij} + DHT_i + TDDH_{ij}) > E_i, \forall\, i, j \mid j_d \neq i_h \\ C_{ij}, \text{ otherwise} \end{cases}$ 12. $C_{ij} = \begin{cases} M, \text{ if } (\max(T_{ij}, R_j) + \max(P_{ij}, \tau P_{ij}) + TDP_{ij}) > DT_j, \forall\, i, j \\ C_{ij}, \text{ otherwise} \end{cases}$ Where:

$l$ = number of available jobs (loads)

$t$ = number of available tractors $X_{ij} = \begin{cases} 1, \text{ if job } j \text{ is assigned to tractor } i \\ 0, \text{ otherwise} \end{cases}$ $M$ = big number (10000)

$R_j$ = available time for load $j$ $W_{ij}$ = wait time of tractor $i$ for job $j$ $WC_{ij}$ = paid waiting time for tractor $i$ for job $j$ $H_{ij} = \begin{cases} 1, \text{ if the tractor } i \text{ is waiting at the home base or is not eligible for wait time} \\ 0, \text{ otherwise} \end{cases}$ $\lambda_1 = \begin{cases} UM, \text{ if load } j\text{'s origin or tractor is current location is } \{US\} \\ CM, \text{ otherwise} \end{cases}$ $\lambda_2 = \begin{cases} UM, \text{ if load } j\text{'s origin or destination is } \{US\} \\ CM, \text{ otherwise} \end{cases}$ $US$ = US terminals $USF$ = tractor $i$ is a US fleet if the tractor is registered at US fleet and the driver of that tractor $i$ is eligible to drive in the US $UM$ = $ paid for a USA mile $CM$ = $ paid for a Canadian mile $CBT$ = $ paid per mile for brokers $EMR$ = empty mile cost to full mile cost radio (0.9)

$S_{ij}$ = empty mileage for tractor $i$ to start job $j$ $ST_{ij}$ = time to travel $S_{ij}$ $TDST_{ij}$ = time difference between current location of tractor $i$ and origin of job $j$ $\tau ST_{ij}$ = required spill over rest time in addition to $ST_{ij}$ to satisfy driving regulations from the last job that tractor $i$ undertook $D_j$ = total mileage for job $j$ (distance between the origin and the destination)

$DH_i$ = distance between $j_d$ (destination terminal of the load $j$) and $i_h$ (home base terminal of tractor $i$)

$DHT_i$ = travel time between $j_d$ and $i_h$ $P_{ij}$ = processing time for tractor $i$ to do job $j$ $TDP_{ij}$ = time difference between origin of job $j$ and destination of job $j$ $\tau P_{ij}$ = required spill over rest time in addition to $P_{ij}$ to satisfy driving regulations from the last job that tractor $i$ undertook $TDDH_{ij}$ = time difference between destination of job $j$ and home base of tractor $i$ $E_i$ = maximum time away for tractor $i$ $CT_i$ = current time away for tractor $i$ -continued $F_i$ = maximum mileage for tractor $i$ $M_i$ = current running mileage for tractor $i$ $A_i$ = available time for tractor $i$ $T_{ij}$ = earliest time that tractor $i$ can start job $j$ $DT_j$ = the latest time that the job $j$ has to be finished (deadline time)

$j_o$ = origin terminal of the load $j$ $j_d$ = destination terminal of the load $j$ $i_h$ = home base terminal of tractor $i$ $i_c$ = current terminal of tractor $i$ $i_d = \begin{cases} 1, & \text{if tractor } i \text{ has a single driver} \\ 0, & \text{if tractor } i \text{ has a team driver} \end{cases}$ Equation (1) is the objective function, which is minimizing the total cost of tractor assignments to jobs. Equations (2) and (3) ensure that every tractor and job is assigned only once. Equation (4) is the binary decision variable, which can take a value of 1 if an assignment is made and 0 otherwise. Equation (5) shows the cost calculation for the assignment of owner-operator tractors and broker tractors to jobs and dummy jobs. Equation (6) represents the calculation of $T_{ij}$, which is the earliest time that tractor i can start job j. Equations (7) and (8) denote the calculation of wait time and wait cost of tractor i fo job j, respectively. Equation (9) is the constraint that, if the origin or destination of a load is in the US, the tractor assigned to the load has to be eligible to drive in the US. Equations (10) and (11) are the maximum mileage and maximum time away constraints for tractor i, respectively, which ensure that the tractor does not exceed these predetermined limits. Equation (12) is the constraint for job j, which ensures that the job is delivered before its deadline.

Cost Calculation

The cost matrix contains the costs of assigning a load to a company tractor and also to a broker tractor. As discussed previously, infeasible or unprofitable assignments are indicated by a big number such as 10000 at the corresponding cell(s) of the cost matrix. As can be seen in the mathematical model, the cost ($C_{ij}$) for feasible assignments is calculated as:

$$C_{ij} = EMR * \lambda_1 * S_{ij} = \lambda_2 * D_j - (1 - H_{ij}) * WC_{ij}$$

The cost depends on the following three main factors:
(1) Whether there is an empty mile or not,
(2) Whether the empty miles and/or full miles are in the US and/or Canada, and
(3) Whether there is a wait cost.

The cost per empty mile is lower than the cost per full mile, and the Empty Mile Ratio (EMR) is used to reflect this in the cost calculation. EMR is the ratio between the cost per empty mile and the cost per full mile, and is set at 0.9 for one embodiment of this present invention after discussion with the executives of a trucking company. Full mile costs are also different between Canada and the US as the company pays different owner-operator rates for a US and Canadian mile. Wait costs are incurred when a tractor is waiting at a non-home based terminal for a job longer than a predetermined number of hours (a tractor is available but there is no available load). When such a wait cost occurs, it is added to the full and empty mile costs in order to calculate the actual operating cost.

The general structure of the cost matrix used in the Model is shown in Table 4:

|  |  | Available Jobs (loads) | | | | | Dummy Jobs | | | | |
|---|---|---|---|---|---|---|---|---|---|---|---|
|  | No. | 0 | 1 | 2 | ... l−2 | l−1 | l | l+1 | ... | l+t−2 | l+t−1 |
| Owner-operator Tractors | 0 | $C_{00}$ | $C_{01}$ | $C_{02}$ | ... $C_{0(l-2)}$ | $C_{0(l-1)}$ | 0 | 0 | ... | 0 | 0 |
|  | 1 | $C_{10}$ | $C_{11}$ | $C_{12}$ | ... $C_{1(l-2)}$ | $C_{1(l-1)}$ | 0 | 0 | ... | 0 | 0 |
|  | 2 | $C_{20}$ | $C_{21}$ | $C_{22}$ | ... $C_{2(l-2)}$ | $C_{2(l-1)}$ | 0 | 0 | ... | 0 | 0 |
|  | . | . | . | . | . | . | . | . | . | . | . |
|  | . | . | . | . | . | . | . | . | . | . | . |
|  | t−2 | $C_{(t-2)0}$ | $C_{(t-2)1}$ | $C_{(t-2)2}$ | ... $C_{(t-2)(l-2)}$ | $C_{(t-2)(l-1)}$ | 0 | 0 | ... | 0 | 0 |
|  | t−1 | $C_{(t-1)0}$ | $C_{(t-1)1}$ | $C_{(t-1)2}$ | ... $C_{(t-1)(l-2)}$ | $C_{(t-1)(l-1)}$ | 0 | 0 | ... | 0 | 0 |
| Broker Tractors | t | $BC_0$ | $BC_1$ | $BC_2$ | ... $BC_{(l-2)}$ | $BC_{(l-1)}$ | 0 | 0 | ... | 0 | 0 |
|  | t+1 | $BC_0$ | $BC_1$ | $BC_2$ | ... $BC_{(l-2)}$ | $BC_{(l-1)}$ | 0 | 0 | ... | 0 | 0 |
|  | . | . | . | . | . | . | . | . | . | . | . |
|  | . | . | . | . | . | . | . | . | . | . | . |
|  | t+l−2 | $BC_0$ | $BC_1$ | $BC_2$ | ... $BC_{(l-2)}$ | $BC_{(l-1)}$ | 0 | 0 | ... | 0 | 0 |
|  | t+l−1 | $BC_0$ | $BC_1$ | $BC_2$ | ... $BC_{(l-2)}$ | $BC_{(l-1)}$ | 0 | 0 | ... | 0 | 0 |

It is assumed that there are 0 to l−1 available jobs (along the columns) and 0 to t−1 tractors potentially available to do these jobs (along the rows). To calculate the trade-off between using broker tractors and owner-operator tractors automatically, l rows are added after the owner-operator tractor rows to indicate broker tractors. The cost for a job to be done by any of the broker tractors is the same and is denoted by $BC_j$. In order to be able to use the cost matrix in the Hungarian Assignment algorithm or equivalent, it has to be a square matrix so that every job and tractor can have exactly one assignment. Thus t dummy jobs (columns) are added after the available job columns. The cost for all these jobs is set as 0. There are typically between 400 and 650 available tractors and 500 and 800 available loads for this linehaul operation. Thus a typical cost matrix for this Model is over 1000×1000 in size.

Solving the Model Using the Hungarian Assignment Algorithm or Equivalent

In order to be able to obtain the solution in a reasonable length of time, it was crucial to reduce the problem size as much as possible for every successive iteration. Thus in every iteration, the original cost matrix is reduced to a smaller matrix (the EM) to use in the Hungarian Assignment algorithm or equivalent. For each of the jobs from 0 to l−1, the jobs are renumbered from 0 to ll-1 in each iteration where ll is the number of available loads for that iteration.

The loads that are eliminated from the original matrix for an iteration are those jobs (all the legs of the job) that have already been assigned to an owner-operator tractor and those jobs for which the broker tractor cost is lower than any of the owner-operator tractor costs. In the first case (if all the legs have been assigned), the job is considered complete and therefore there is no need to do any further processing for that job. In this present invention, the second case is referred to as a pre-broker assignment in this thesis and since such jobs cannot be done at lower costs using company resources (owner-operator tractors), they will be assigned to broker tractors when using the Hungarian Assignment algorithm or equivalent. Hence these jobs are also eliminated from the original matrix.

Consider a situation of 400 available tractors and 600 available jobs. The original cost matrix to be used in the Hungarian Assignment algorithm or equivalent would be a 1000×1000 matrix. The Hungarian Assignment algorithm or equivalent would then have to process one million cells. However using this iterative approach, the number of available loads in the last iteration may be lower than 100. Even if the number of loads is 100 in the last iteration, this reduces the size of the matrix to 500×500, which effectively reduces the number of cells that have to be processed by a factor of 4. Table 5 shows the structure of the reduced cost matrix which is used in the Hungarian Assignment algorithm or equivalent:

|  |  | Available Jobs (loads) | | | Dummy Jobs | | | | |
| --- | --- | --- | --- | --- | --- | --- | --- | --- | --- |
|  | No. | 0 | 1 | ... ll − 1 | ll | ll + 1 | ... | ll + t − 2 | ll + t − 1 |
| Owner-operator Tractors | 0 | $C_{00}$ | $C_{01}$ | ... $C_{0(ll-1)}$ | 0 | 0 | ... | 0 | 0 |
|  | 1 | $C_{10}$ | $C_{11}$ | ... $C_{1(ll-1)}$ | 0 | 0 | ... | 0 | 0 |
|  | 2 | $C_{20}$ | $C_{21}$ | ... $C_{2(ll-1)}$ | 0 | 0 | ... | 0 | 0 |
|  | . | . | . | . . | . | . | . | . | . |
|  | t − 2 | $C_{(t-2)0}$ | $C_{(t-2)1}$ | ... $C_{(t-2)(ll-1)}$ | 0 | 0 | ... | 0 | 0 |
|  | t − 1 | $C_{(t-1)0}$ | $C_{(t-1)1}$ | ... $C_{(t-1)(ll-1)}$ | 0 | 0 | ... | 0 | 0 |
| Broker Tractors | t | $BC_0$ | $BC_1$ | ... $BC_{(ll-1)}$ | 0 | 0 | ... | 0 | 0 |
|  | t + 1 | $BC_0$ | $BC_1$ | ... $BC_{(ll-1)}$ | 0 | 0 | ... | 0 | 0 |
|  | . | . | . | . . | . | . | . | . | . |
|  | t + ll − 1 | $BC_0$ | $BC_1$ | ... $BC_{(ll-1)}$ | 0 | 0 | ... | 0 | 0 |

Reducing the size of the cost matrix in this manner leads to significant savings in terms of the computational time required to obtain the solution. Using the original cost matrix for processing in every iteration would increase the computational time by a factor of at least 10. The original load numbers of the jobs in the reduced matrix are kept track of by using an indexing array.

The EM is sent to the Hungarian Assignment algorithm or equivalent, which processes the matrix to produce the final reduced EM. The Decision Matrix (final assignments) is generally calculated based on this reduced EM to find a random (any) optimum solution, but in this Model, further processing is done on the reduced EM using heuristics to obtain the best optimum solution as will be discussed in the following sections.

The general steps of the Hungarian Assignment algorithm or equivalent are given by Dyalog Limited (2006) as follows:
  (1) Once the matrix has been converted to a square matrix, subtract the smallest element in each row from every element in the row.
  (2) Mark a set of independent zeros in the matrix with a star (*). An independent zero is a zero that has no other zero in its corresponding row or column. Repeat this process until apart from ignored rows and columns, no more zeros remain.
  (3) Line (cover) each column containing a starred zero. An optimal assignment is found when all columns are covered, and is represented by the starred zeros. In the case of an optimum solution, return the Decision Matrix with the positions of the stars, as a result. This is just one possible optimum solution, and there may be many other possible optimum solutions. The modified version of the Hungarian Assignment algorithm or equivalent used in the Model returns the final reduced EM at this point, for further processing. If all columns are not covered, go to Step 4.
  (4) If there is no uncovered zero, go to Step 6 passing the smallest uncovered value as a parameter. Otherwise, mark the uncovered zero with a prime (') and call it P0. In the case of a starred zero (S1) occurring in the row containing P0, cover this row and uncover the column containing S1, and repeat Step 4. If there is no starred zero in P0's row, go to step 5.

(5) Determine a path through alternating primed and starred zeros. Find a star S1 (if any) in the uncovered prime P0's column (found in Step 4). Then find a prime P2 (there is always one) in the same row as S1, followed by a star S3 (if any) in P2's column. Continue this process until a prime (Pn) is found, which has no star in its column. Unstar each starred zero S1 and star each primed zero Pj in the alternating series. Finally, erase all primed zeros in the matrix, uncover all rows and columns, and go to Step 3.

(6) When a cell is covered by a row and column, add the minimum cost value passed from Step 4, and subtract the minimum cost value when the cell is uncovered. Go to Step 4 without altering any stars, primes, or covered lines.

It should be noted that the Model uses the final reduced EM (obtained from step 3 when an optimum assignment can be made from the reduced matrix) for further processing to find the best optimum solution. Each of the 6 main steps of the algorithm was coded as a sub-program (function).

Figure 26:
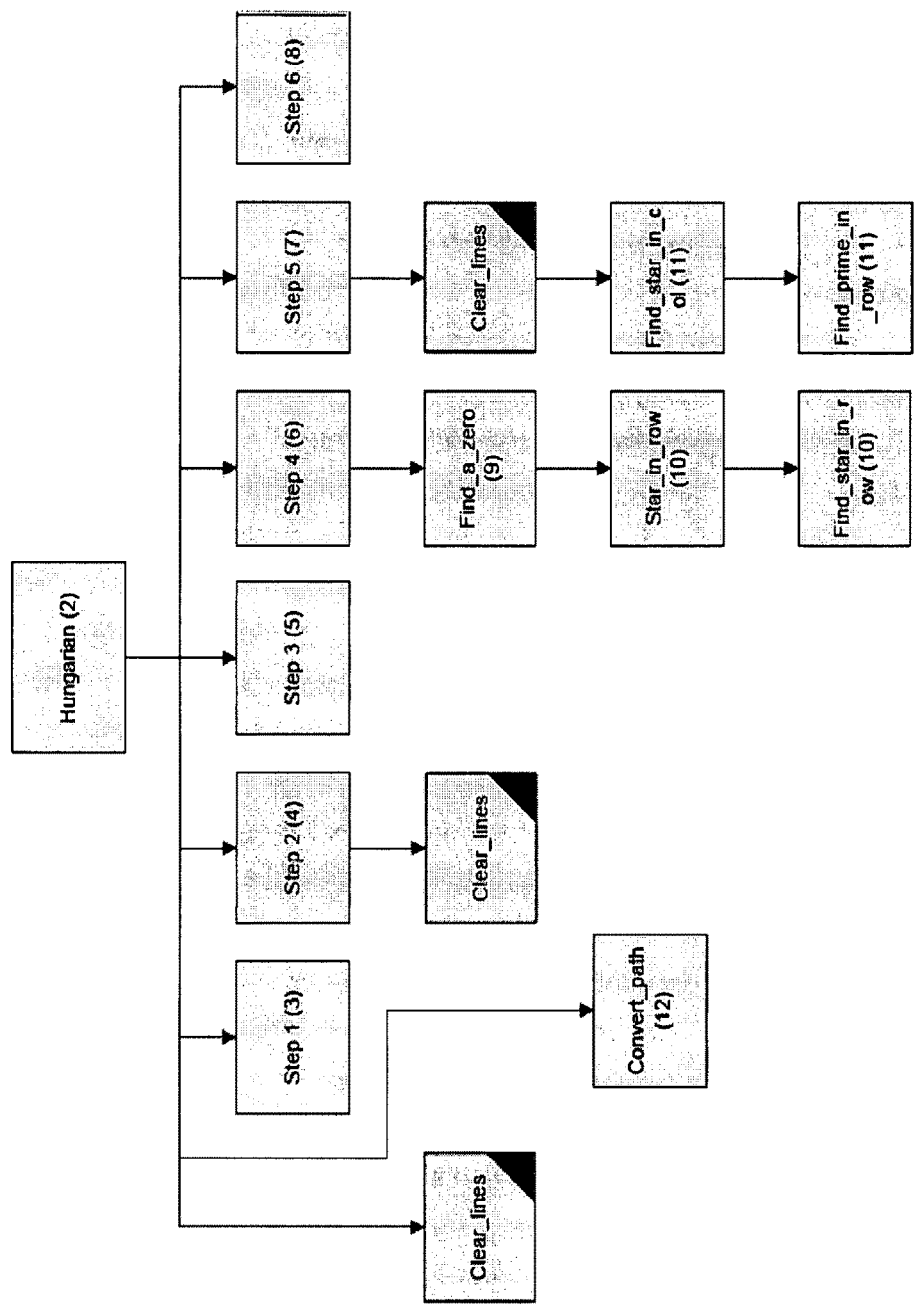
FIG. 26 illustrates the structure of a system comprising a revised Hungarian Assignment algorithm or equivalent module provided in accordance with one embodiments of the present invention.
Figure 27A:
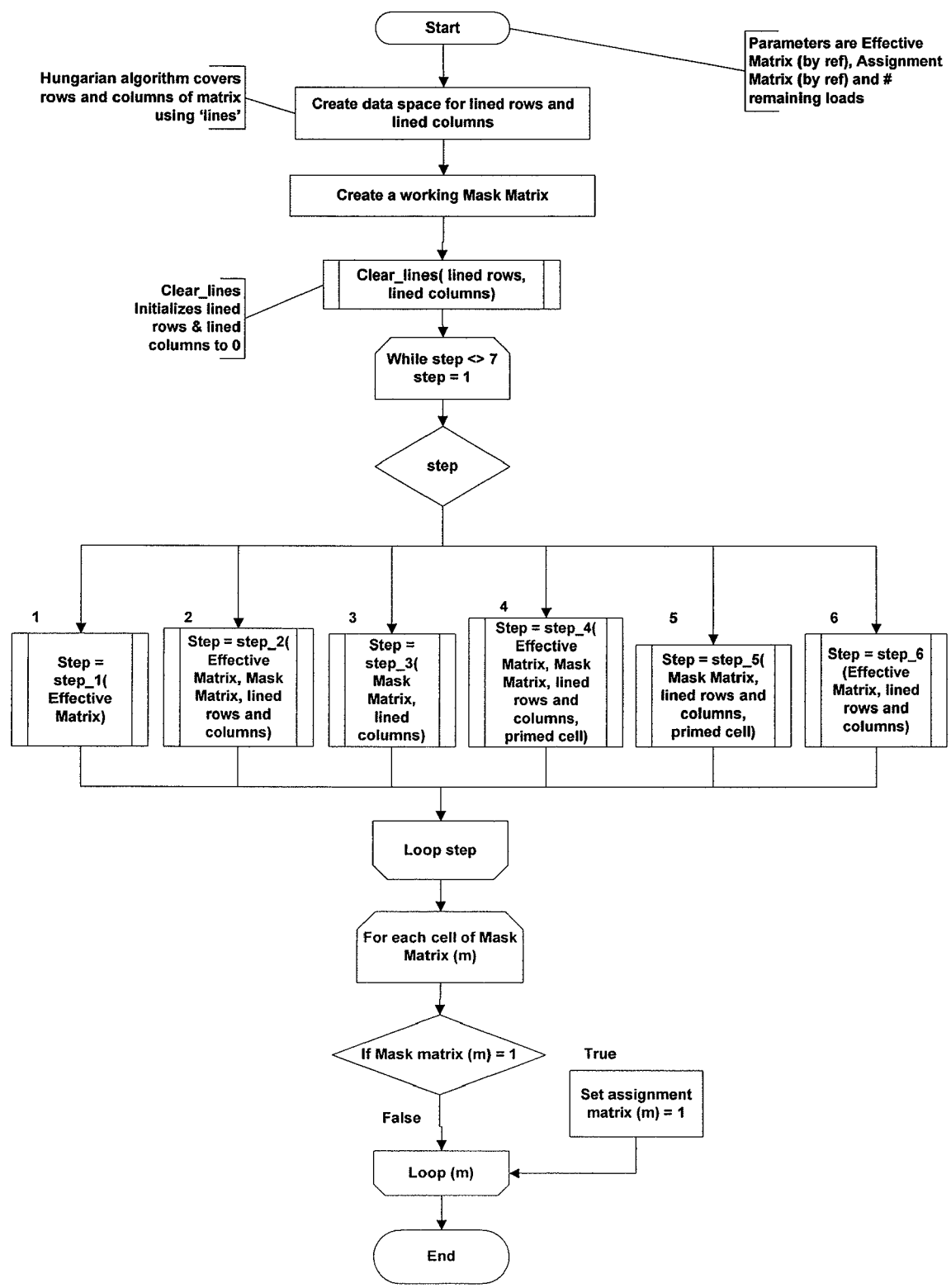
Figure 27B:
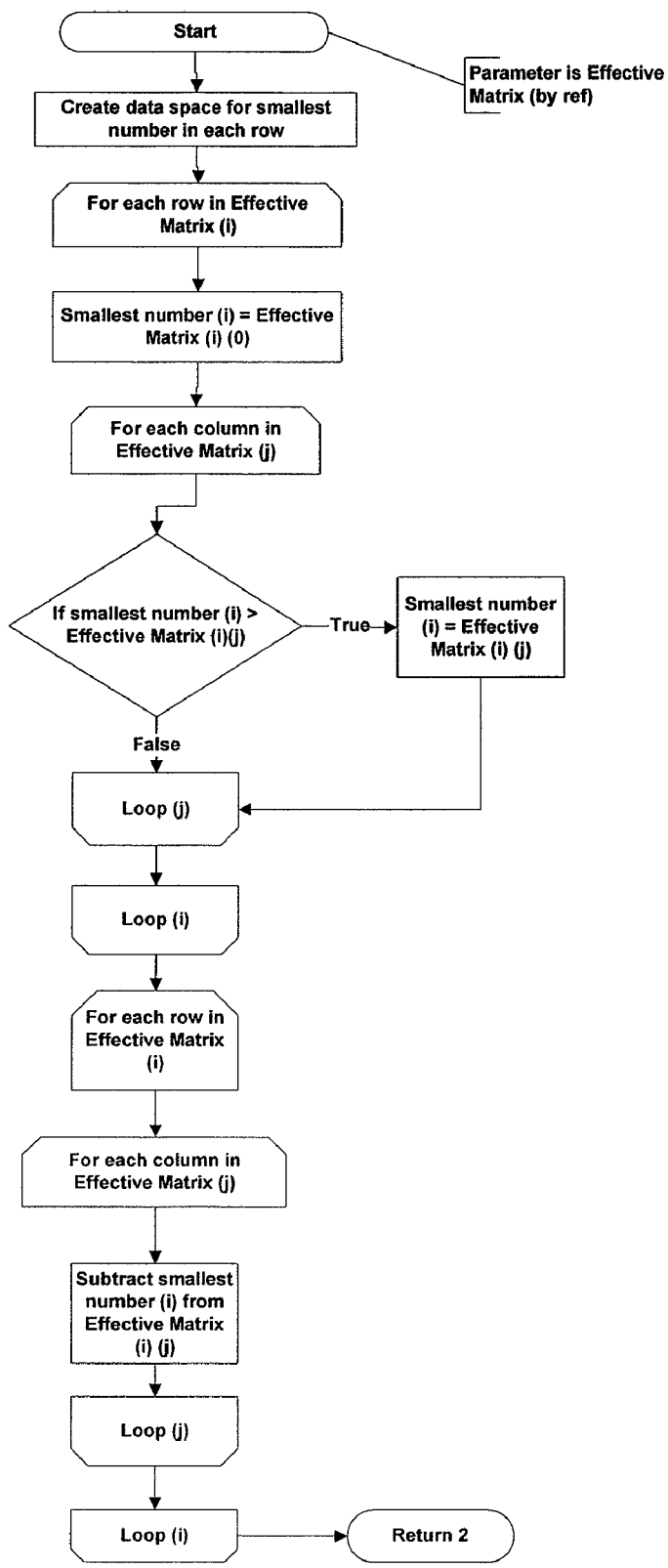
Figure 27C:
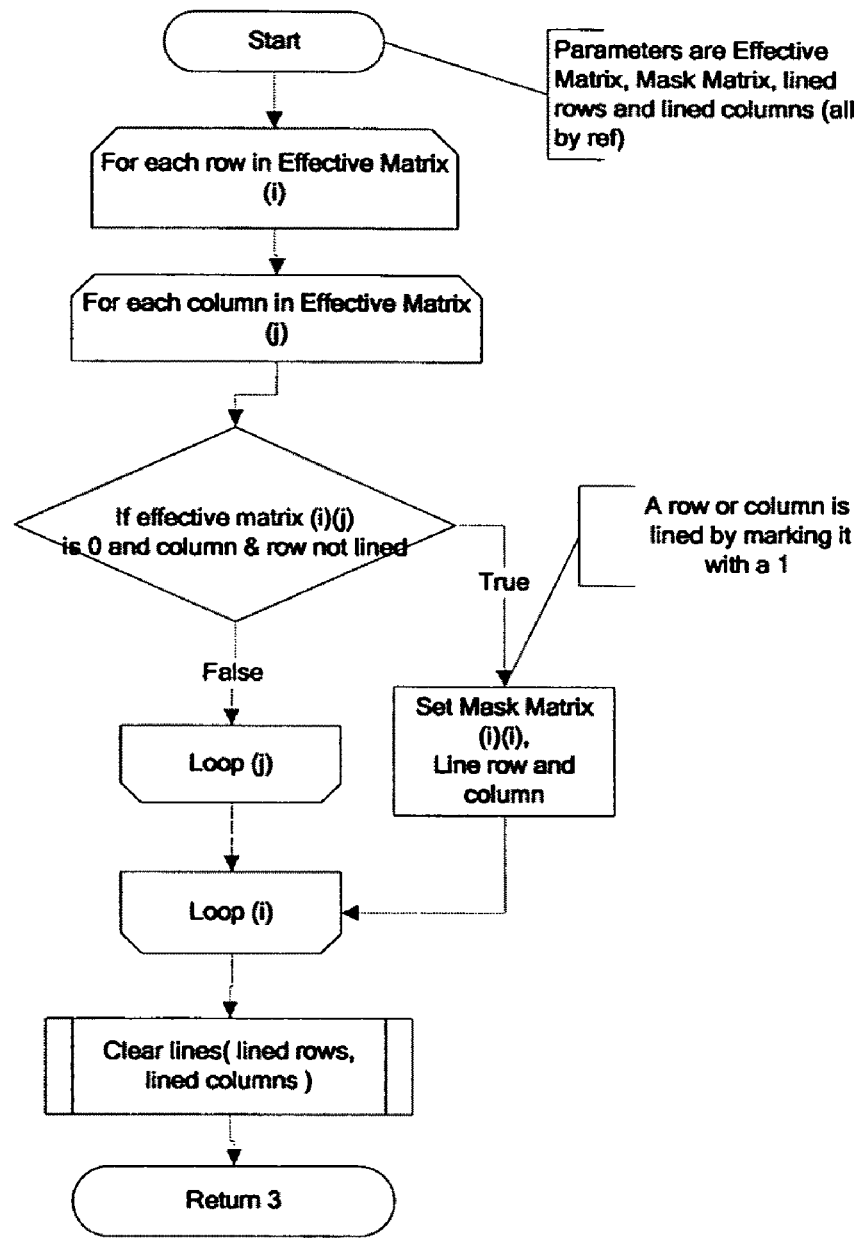
Figure 27D:
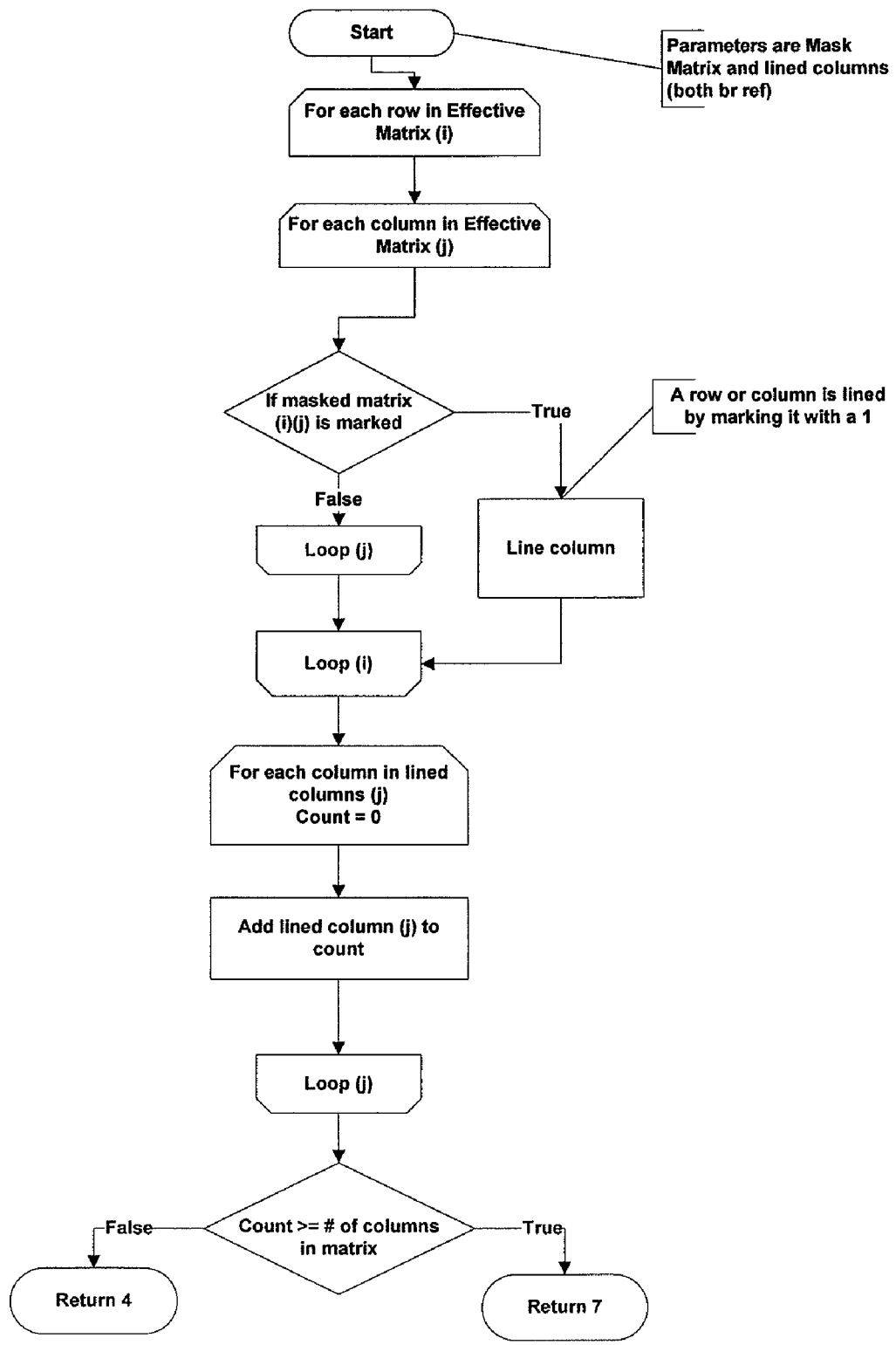
Figure 27E:
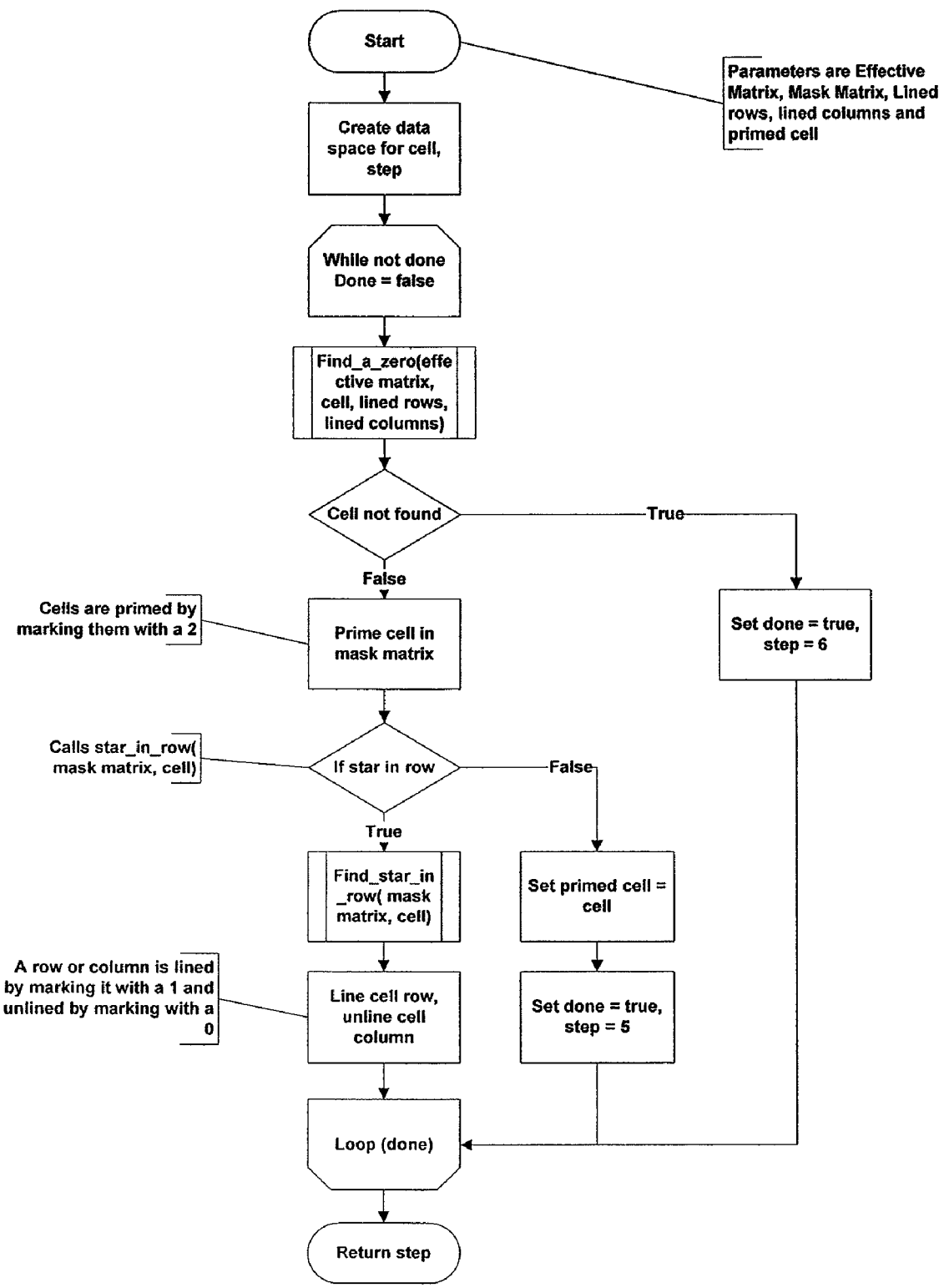
Figure 27F:
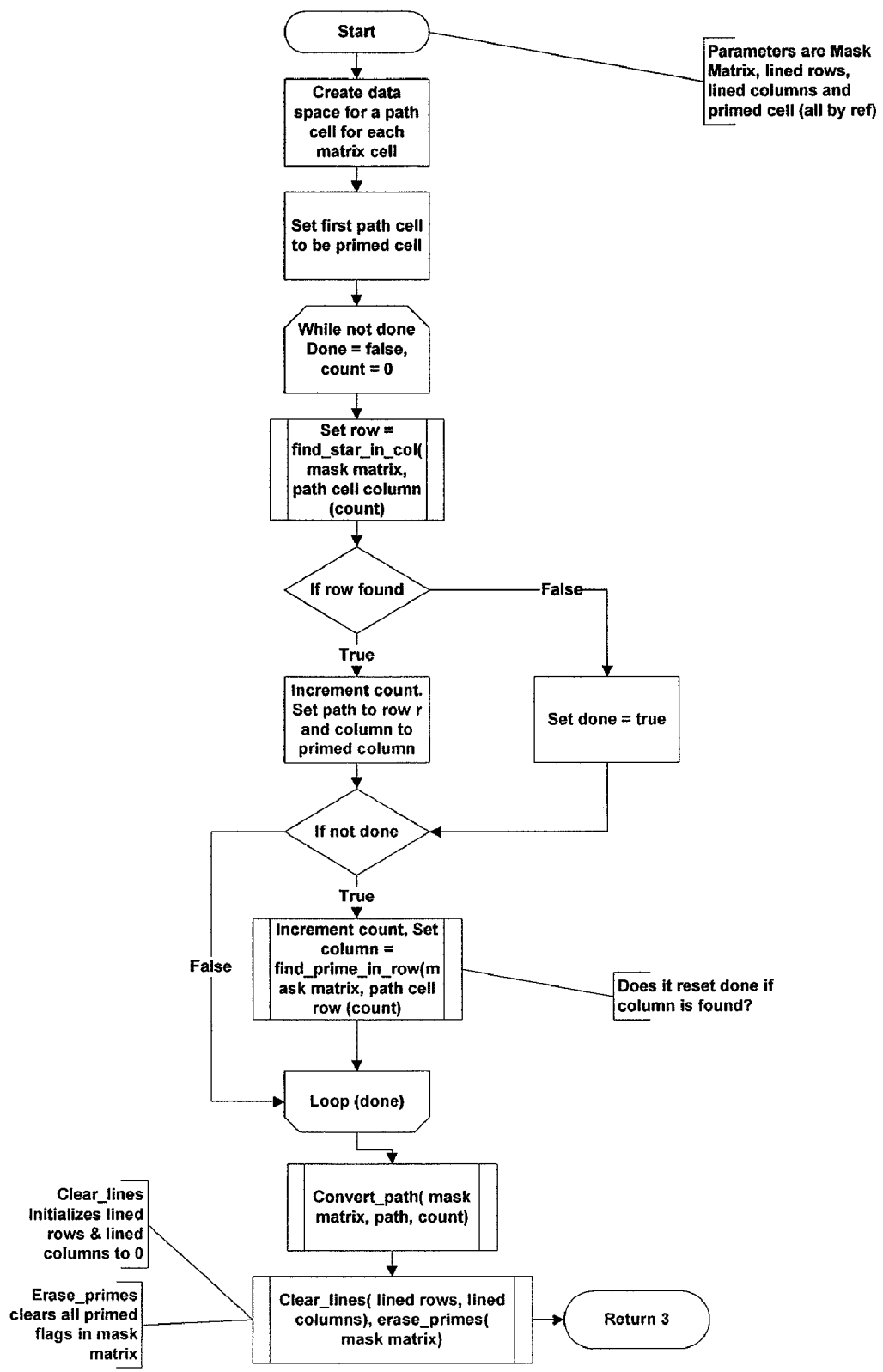
Figure 27G:
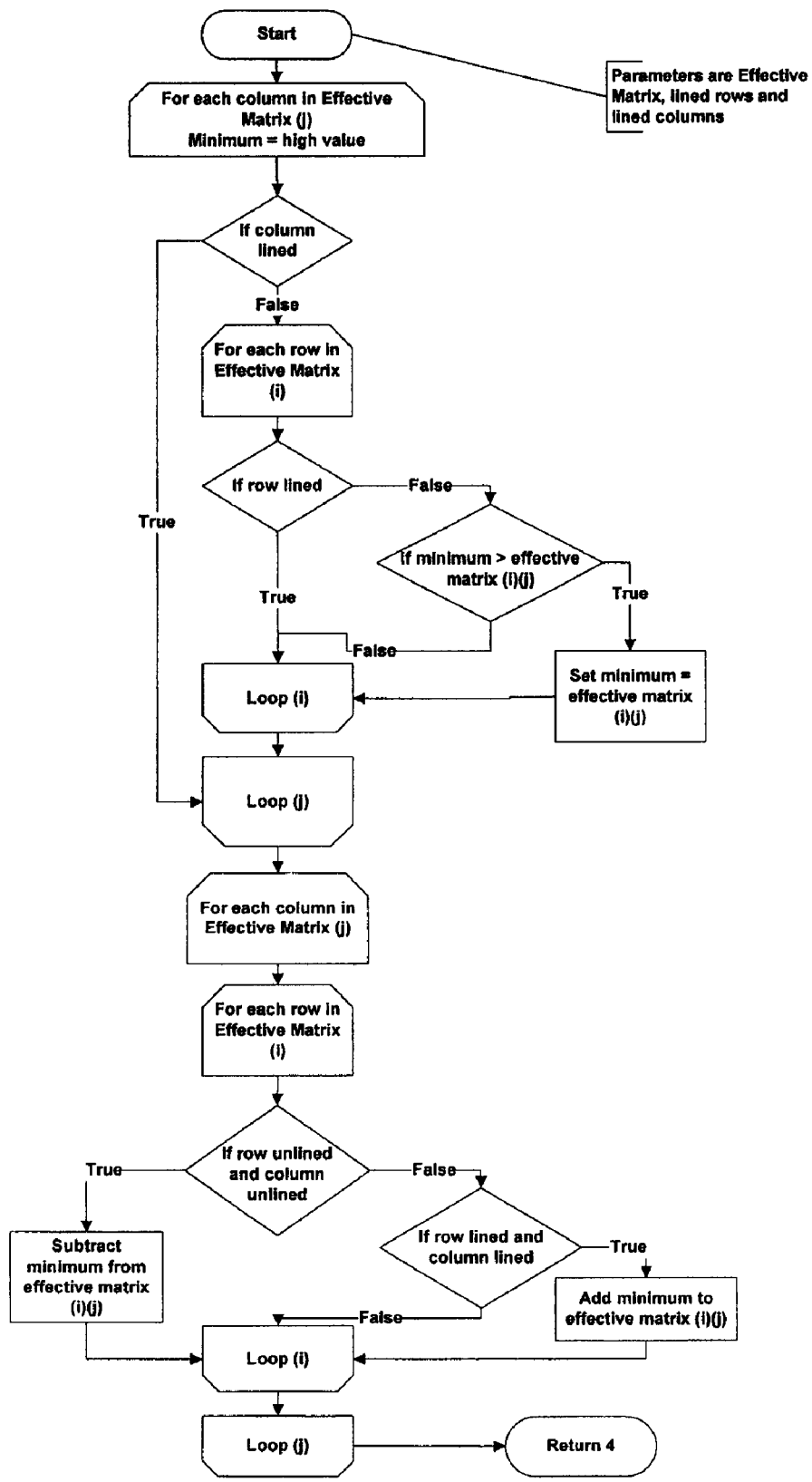
Figure 27H:
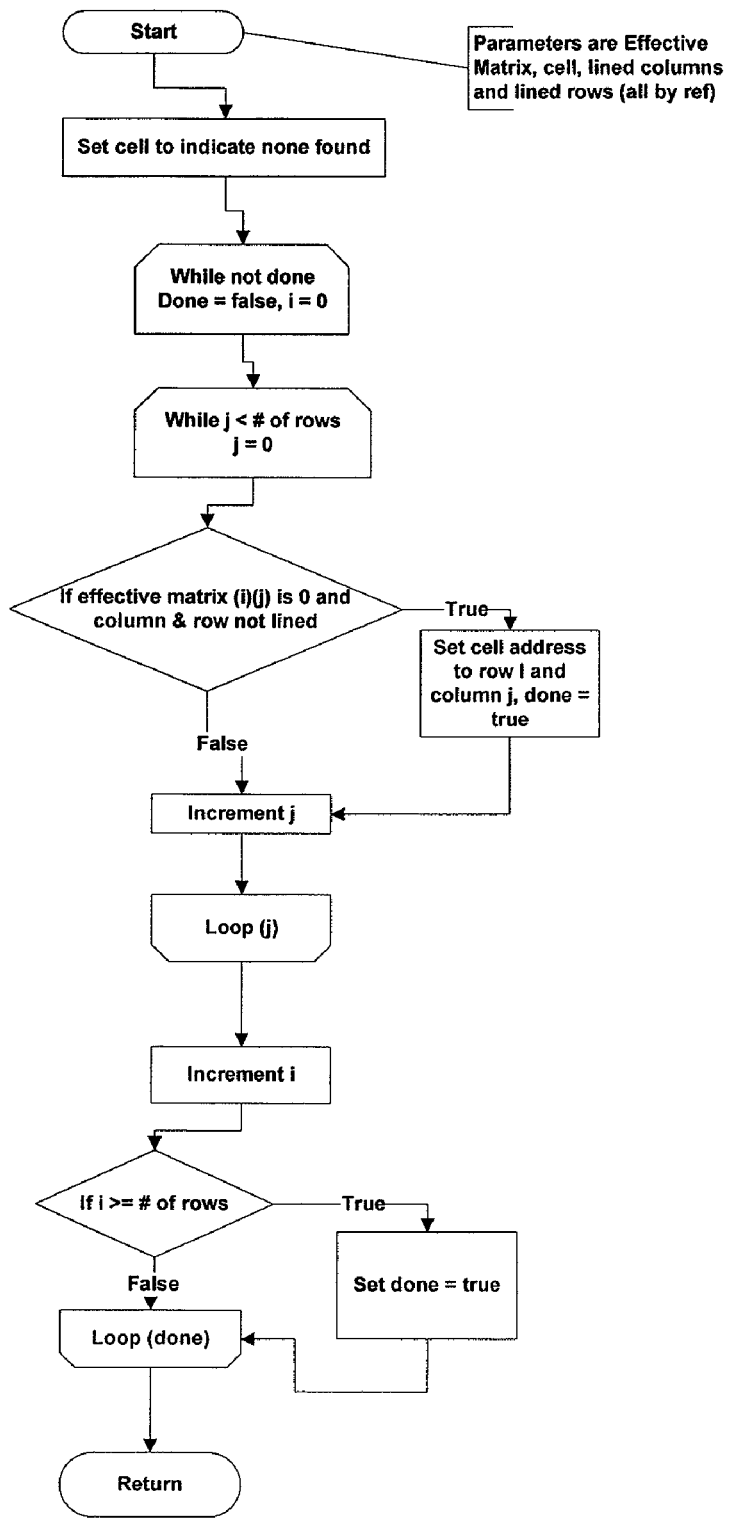
Figure 27I:
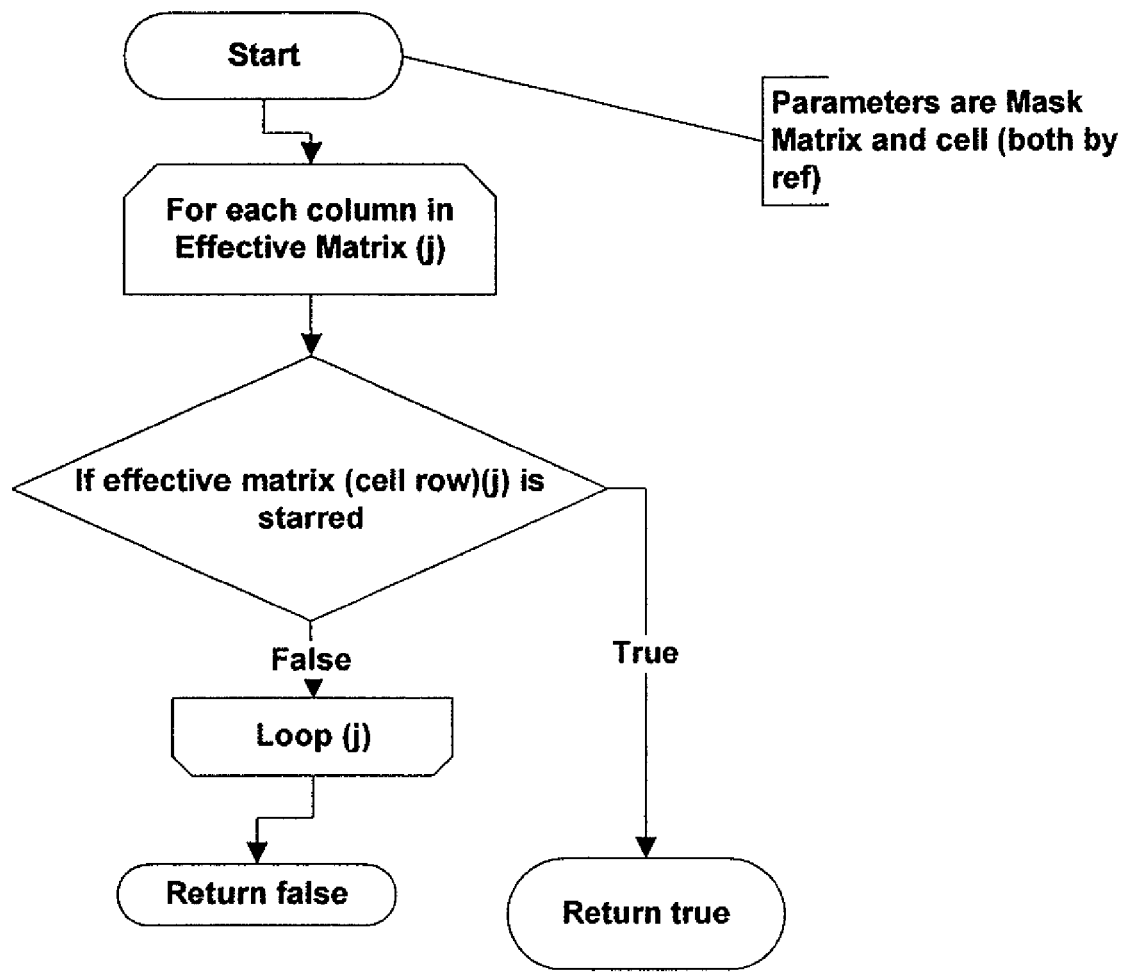
Figure 27J:
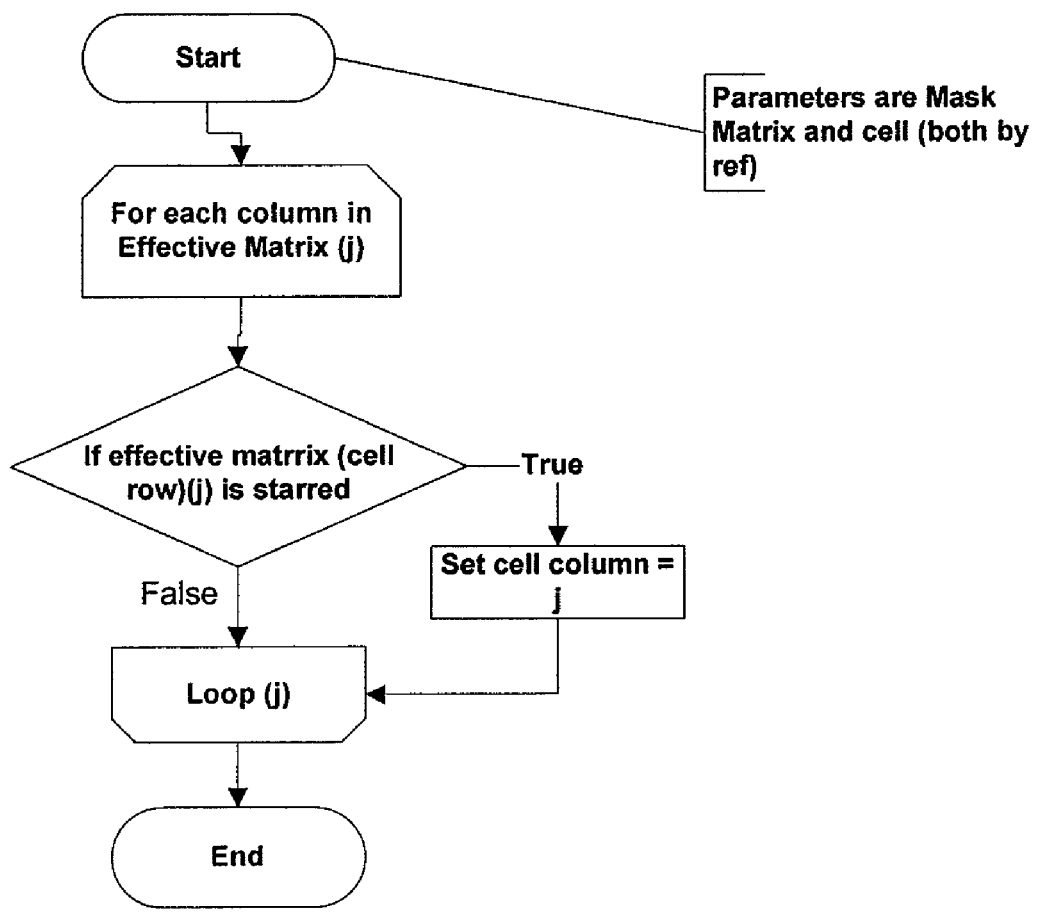
Figure 27K:
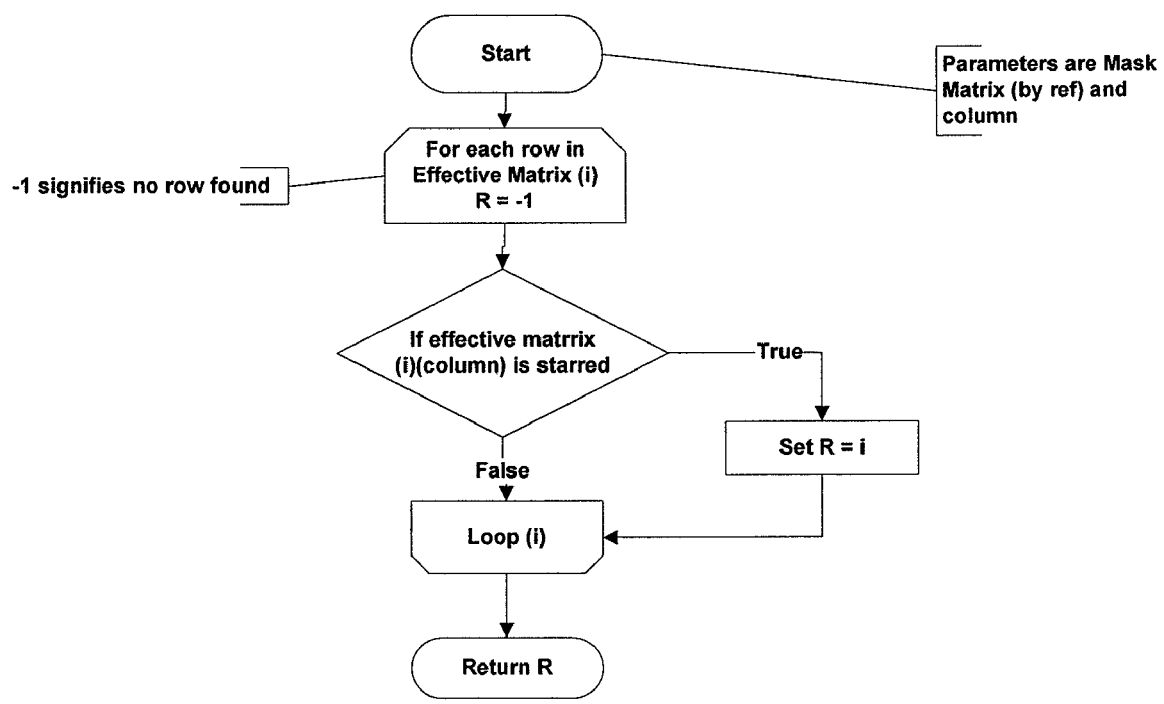
Figure 27I:
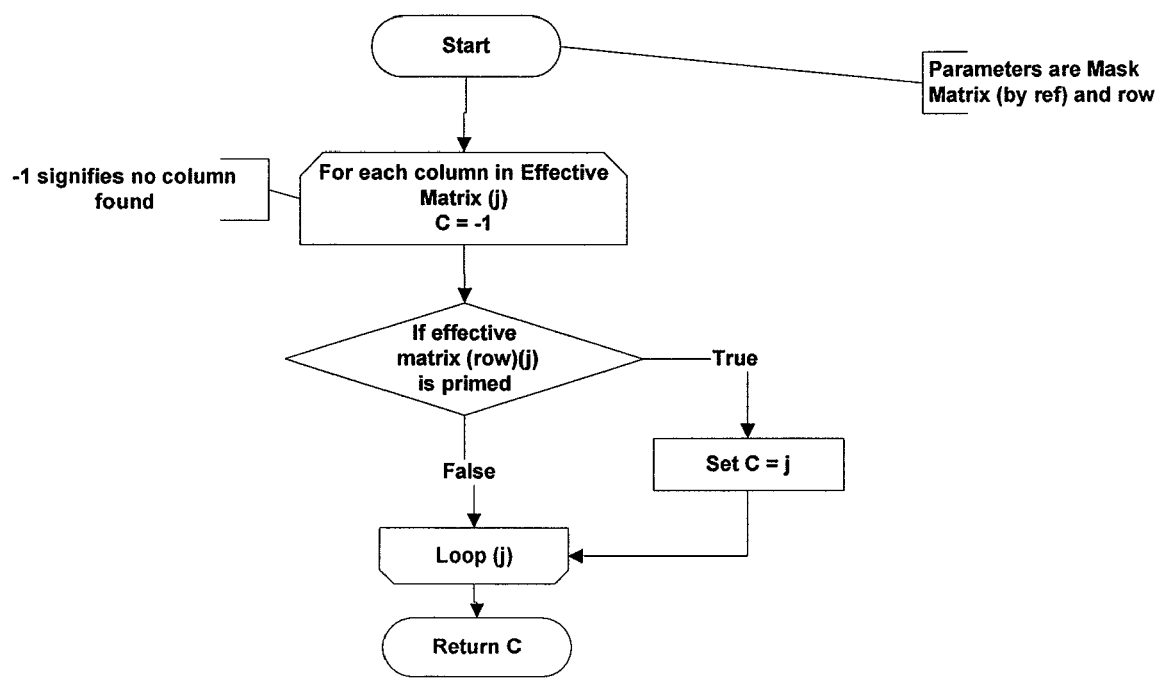
Figure 27M:
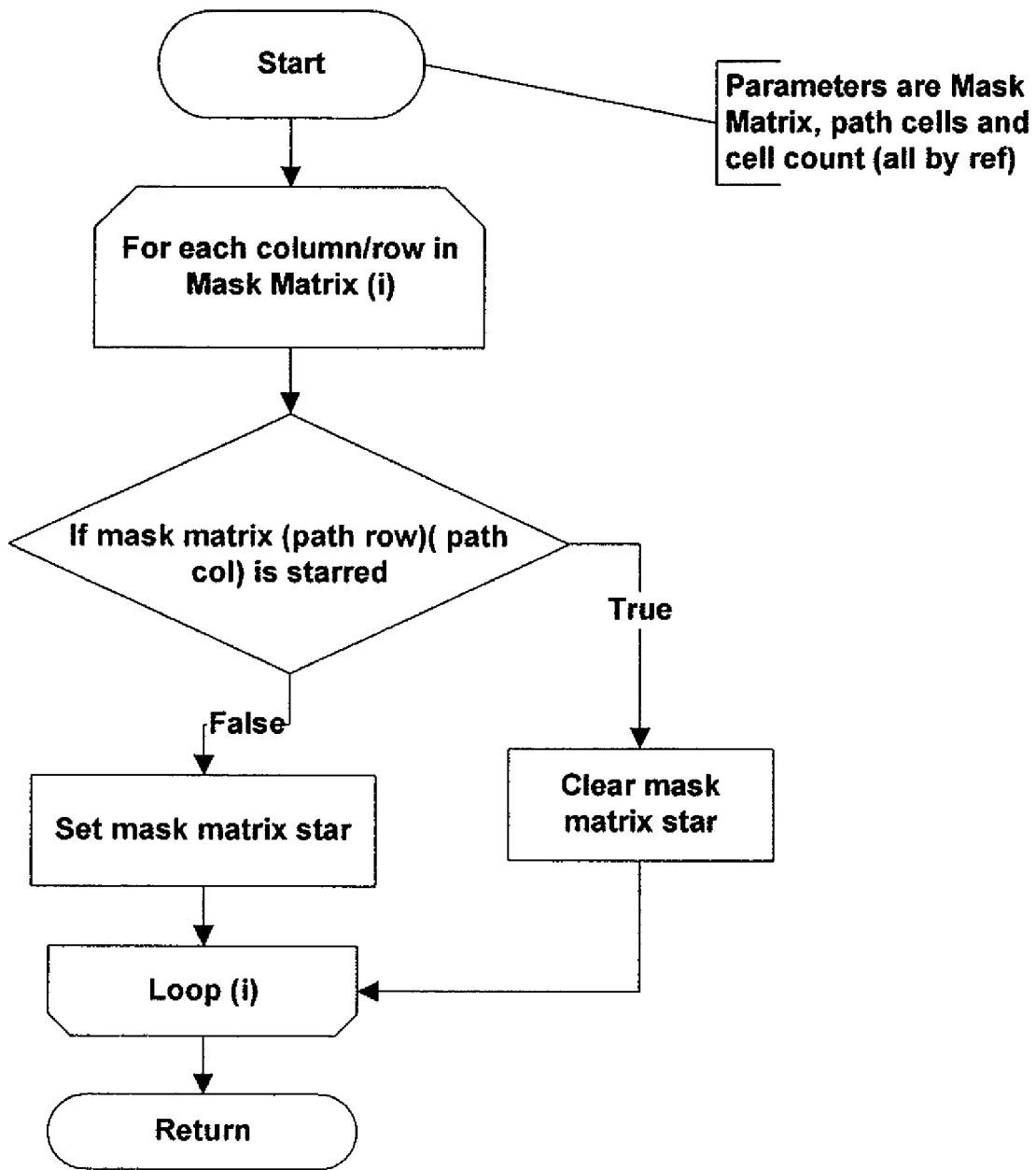
Figure 28A:
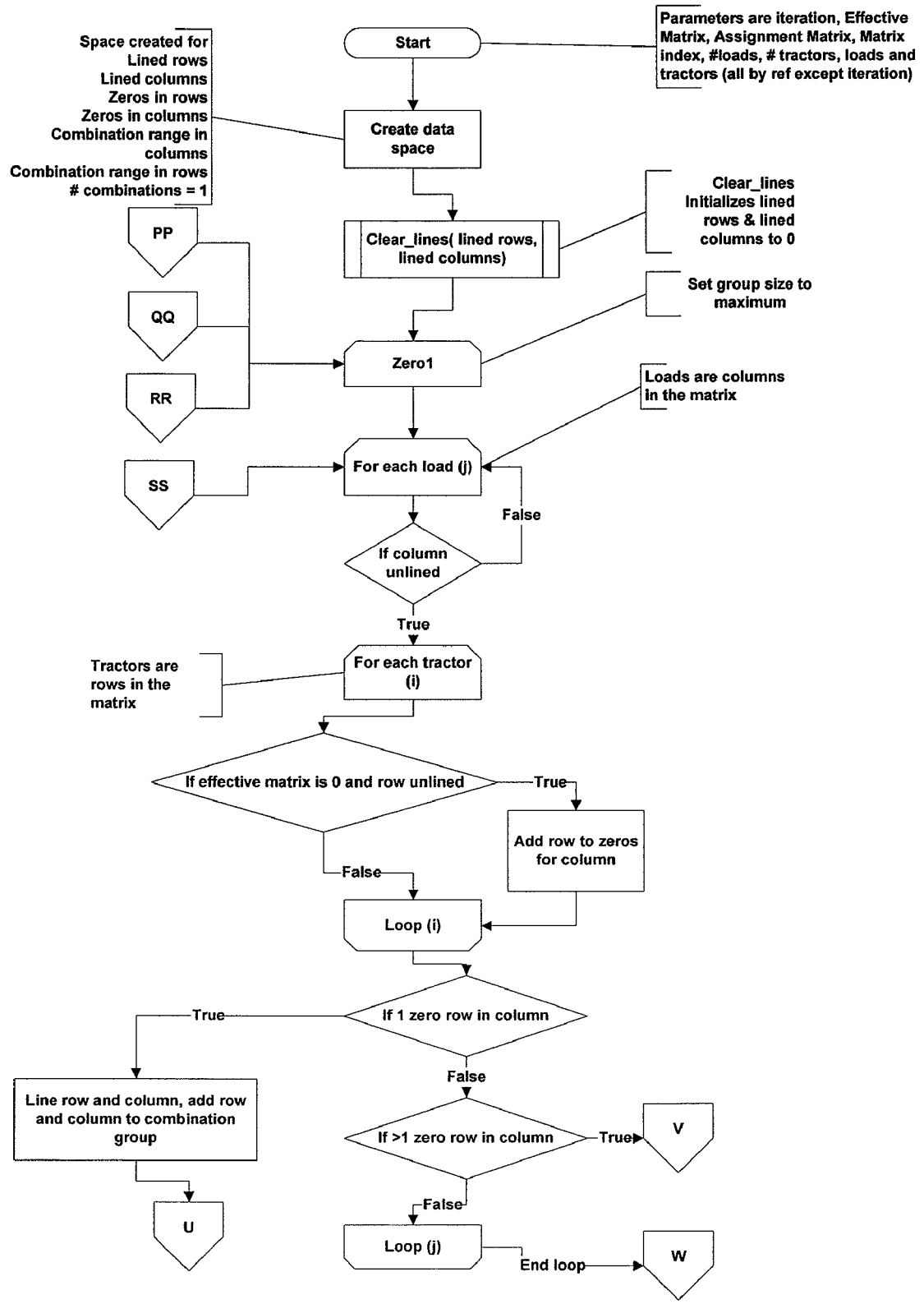
FIGS. 28a-i illustrate a flowchart including heuristics provided in accordance with one embodiment of the present invention.
Figure 28B:
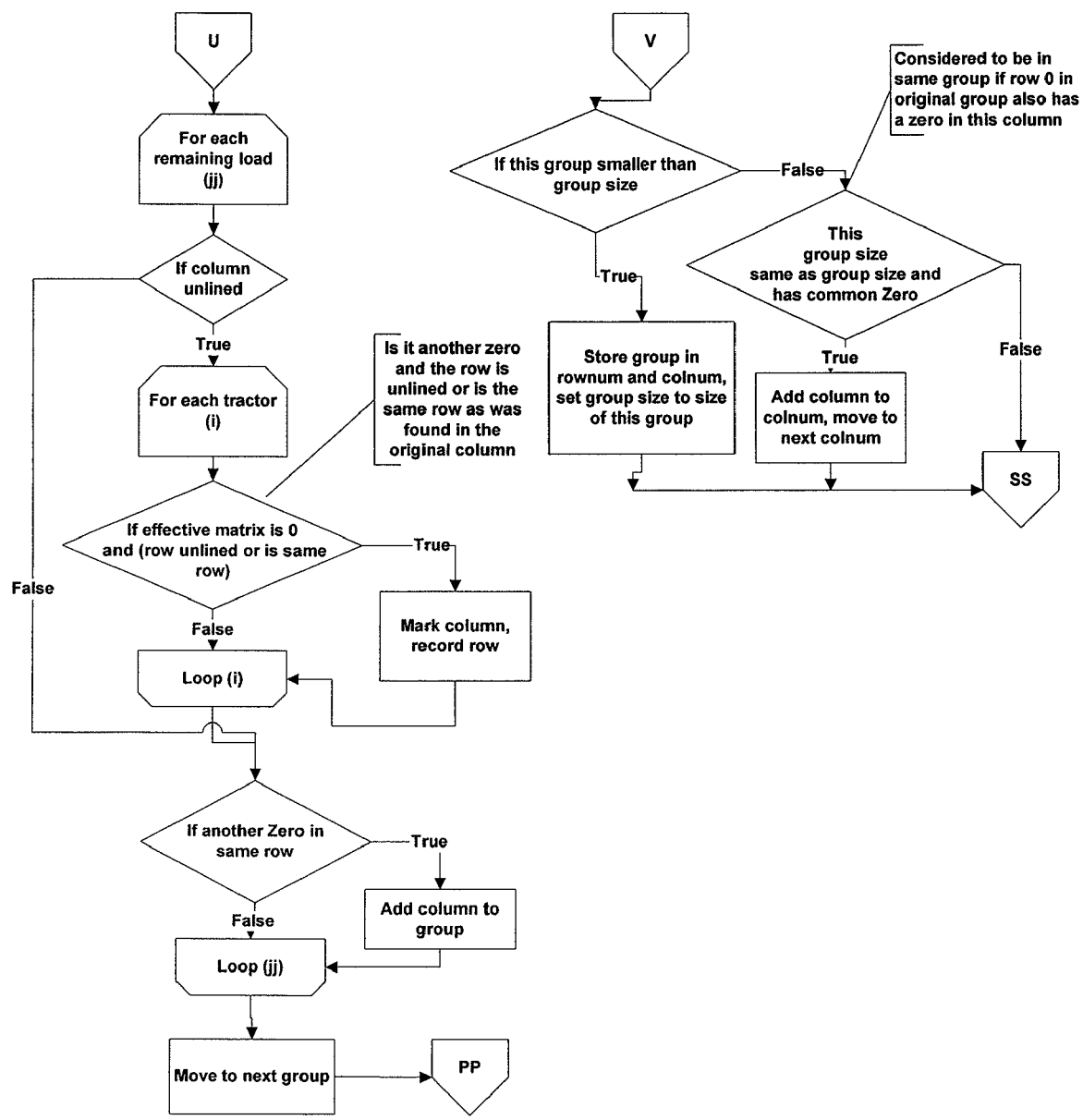
Figure 28C:
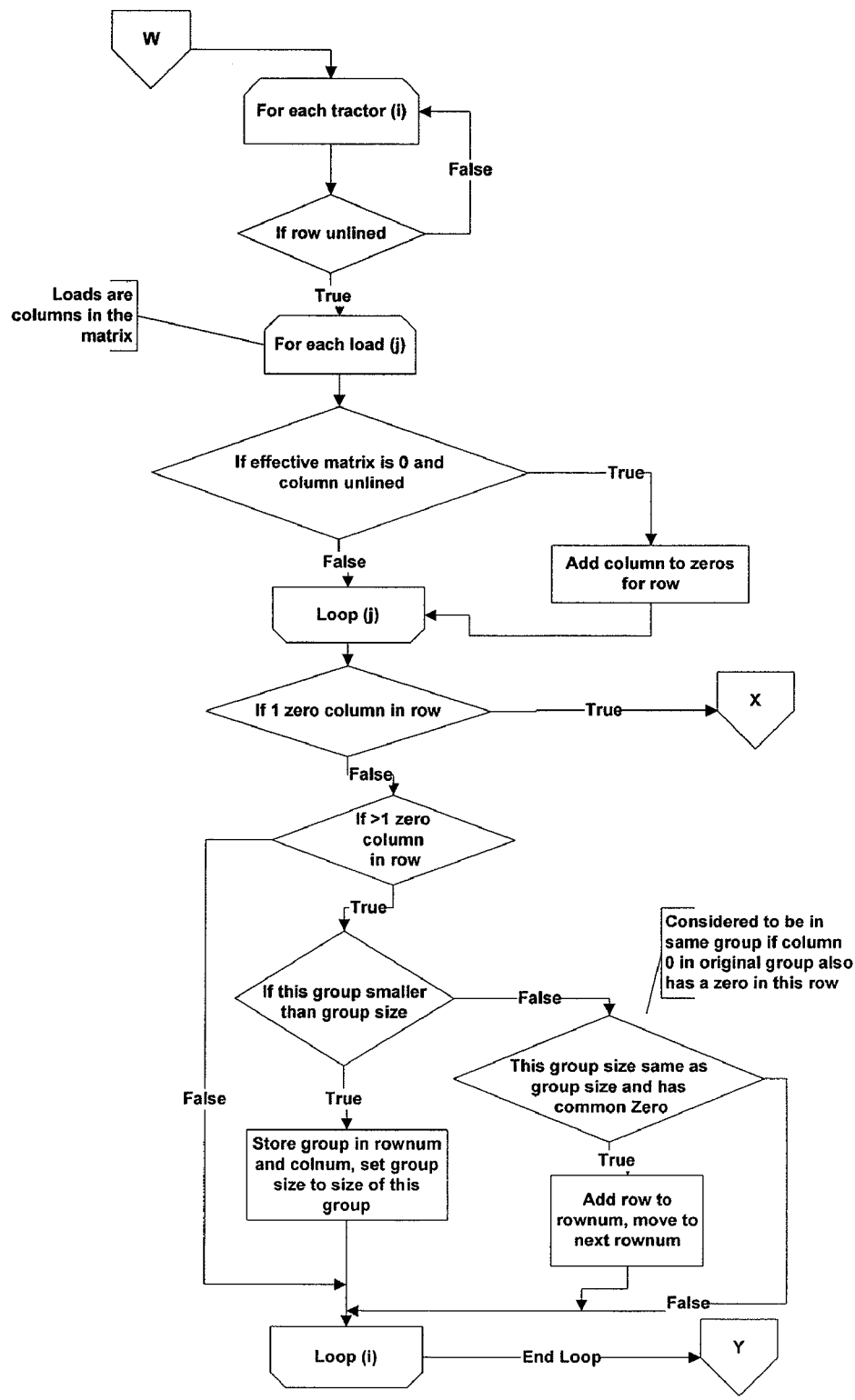
Figure 28D:
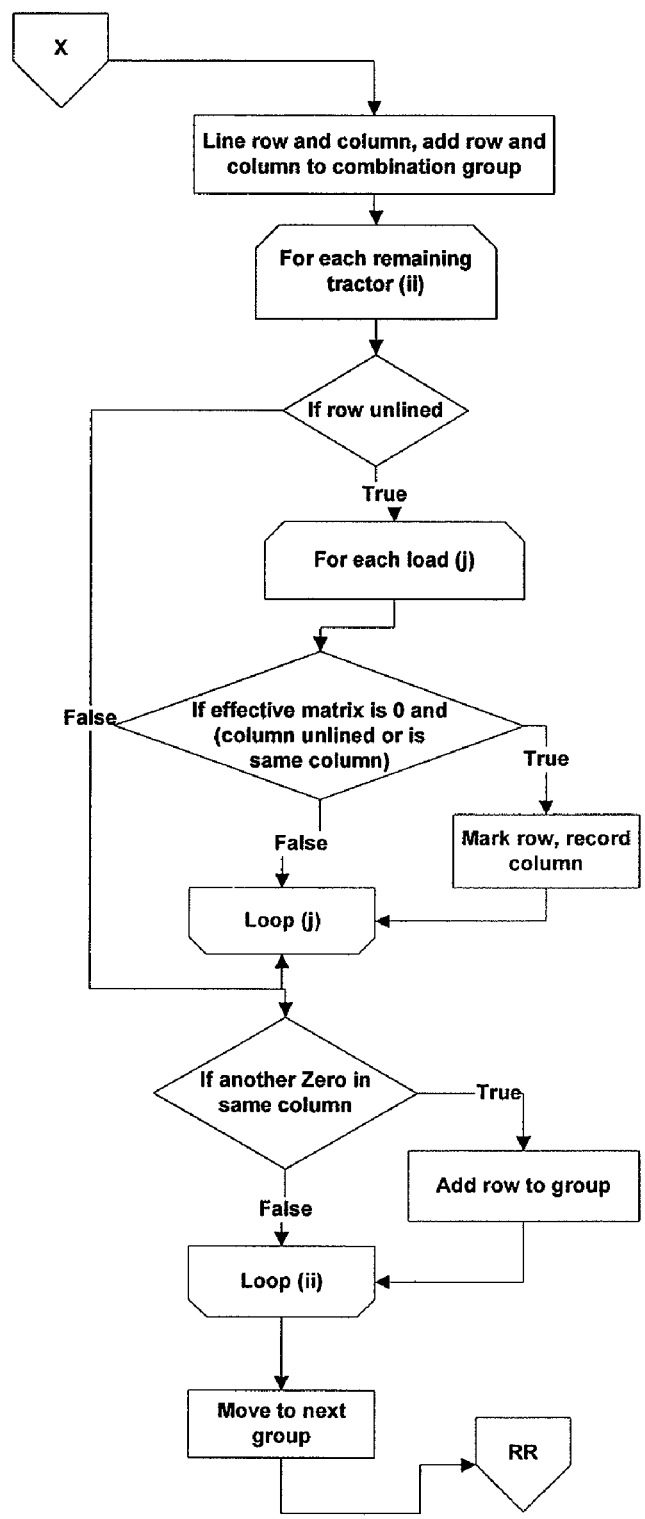
Figure 28E:
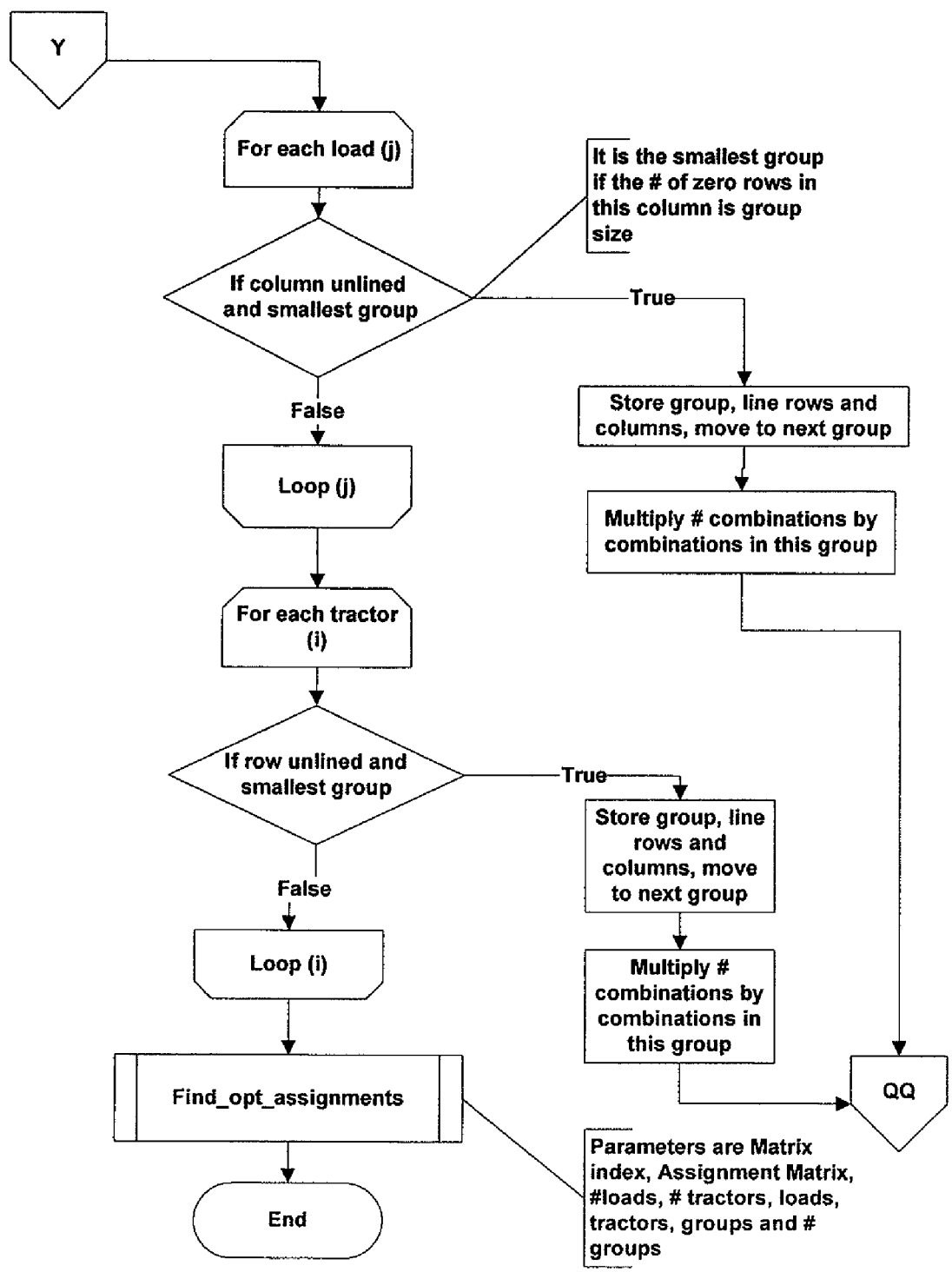
Figure 28F:
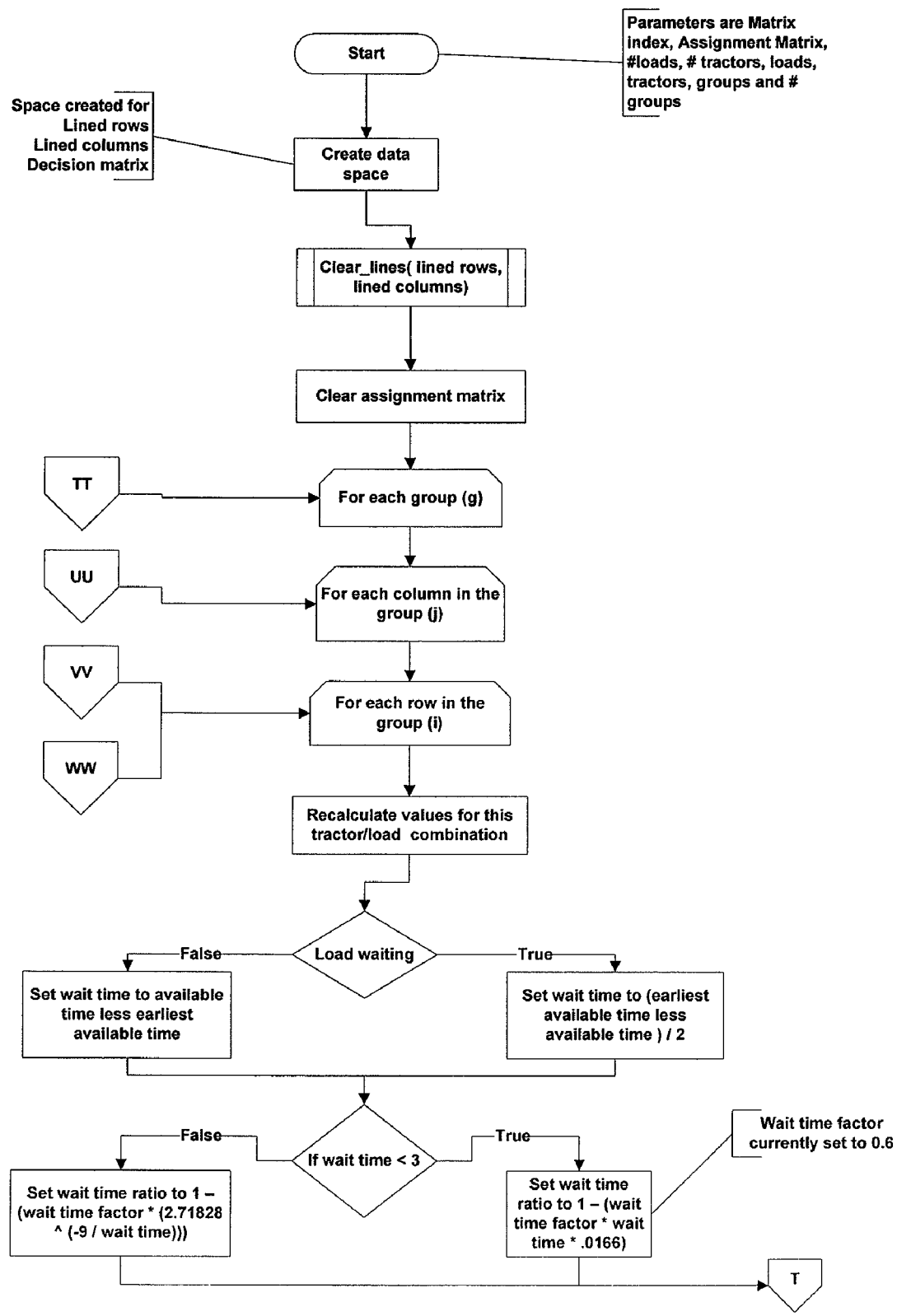
Figure 28G:
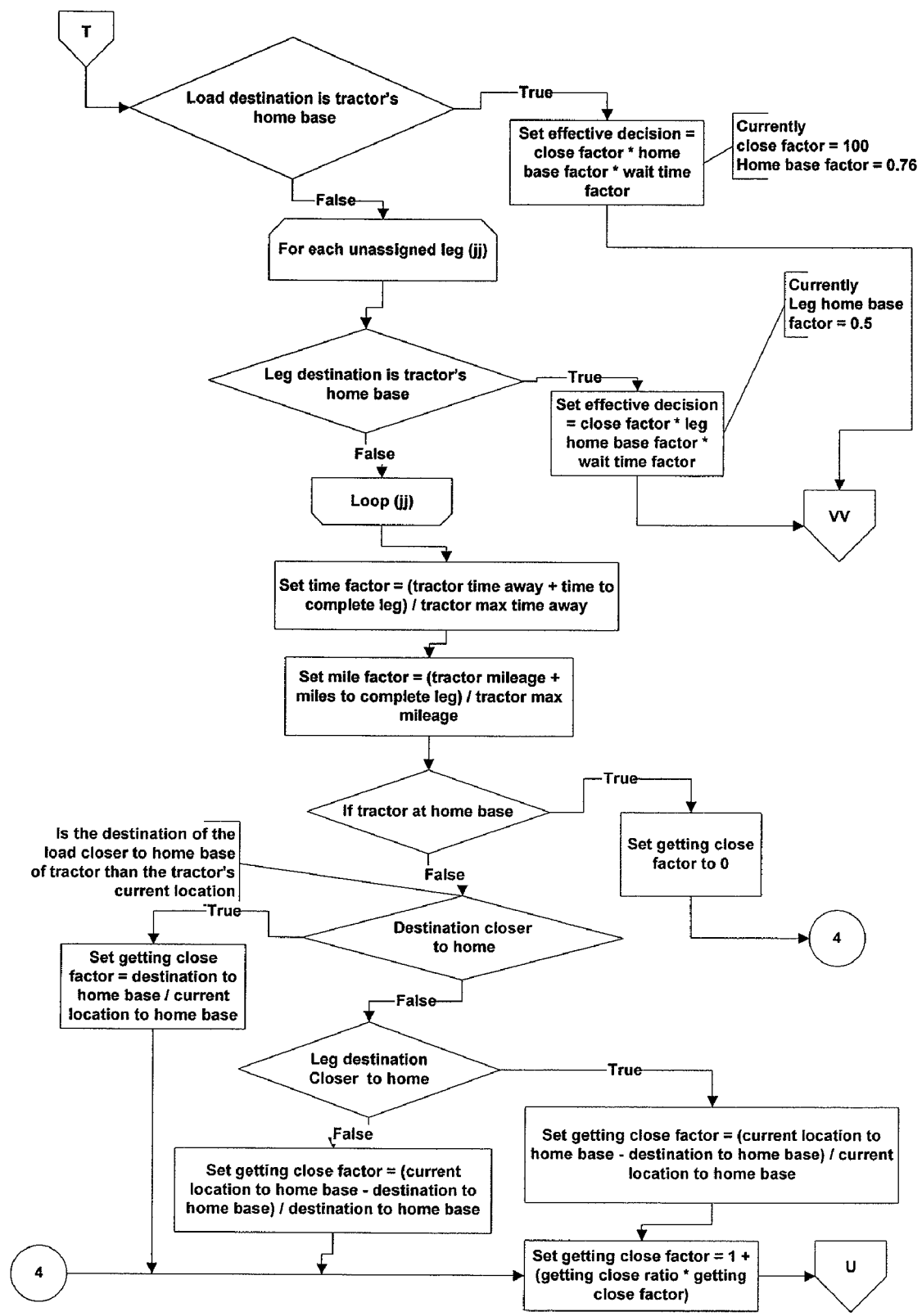
Figure 28H:
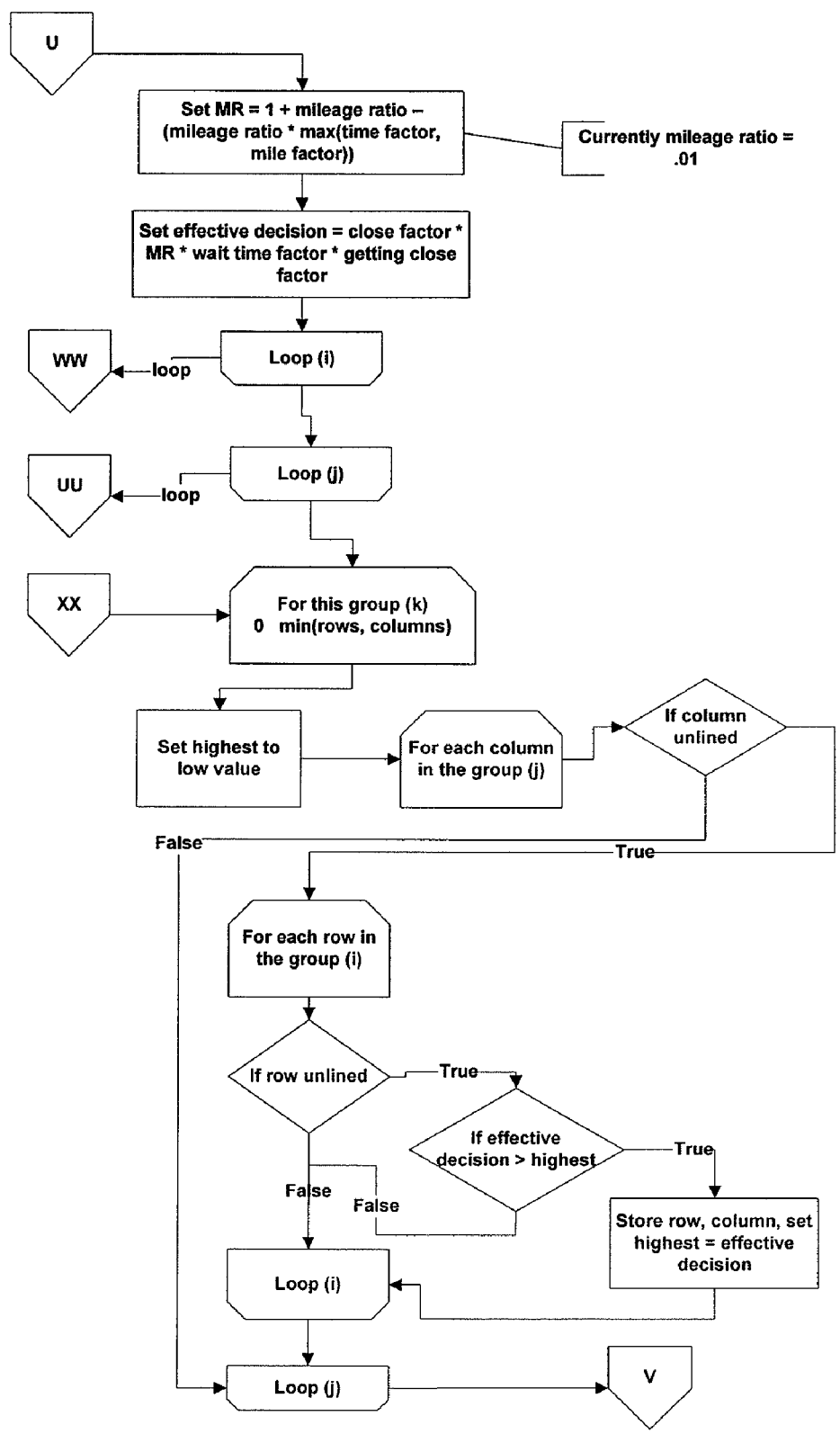
Figure 28I:
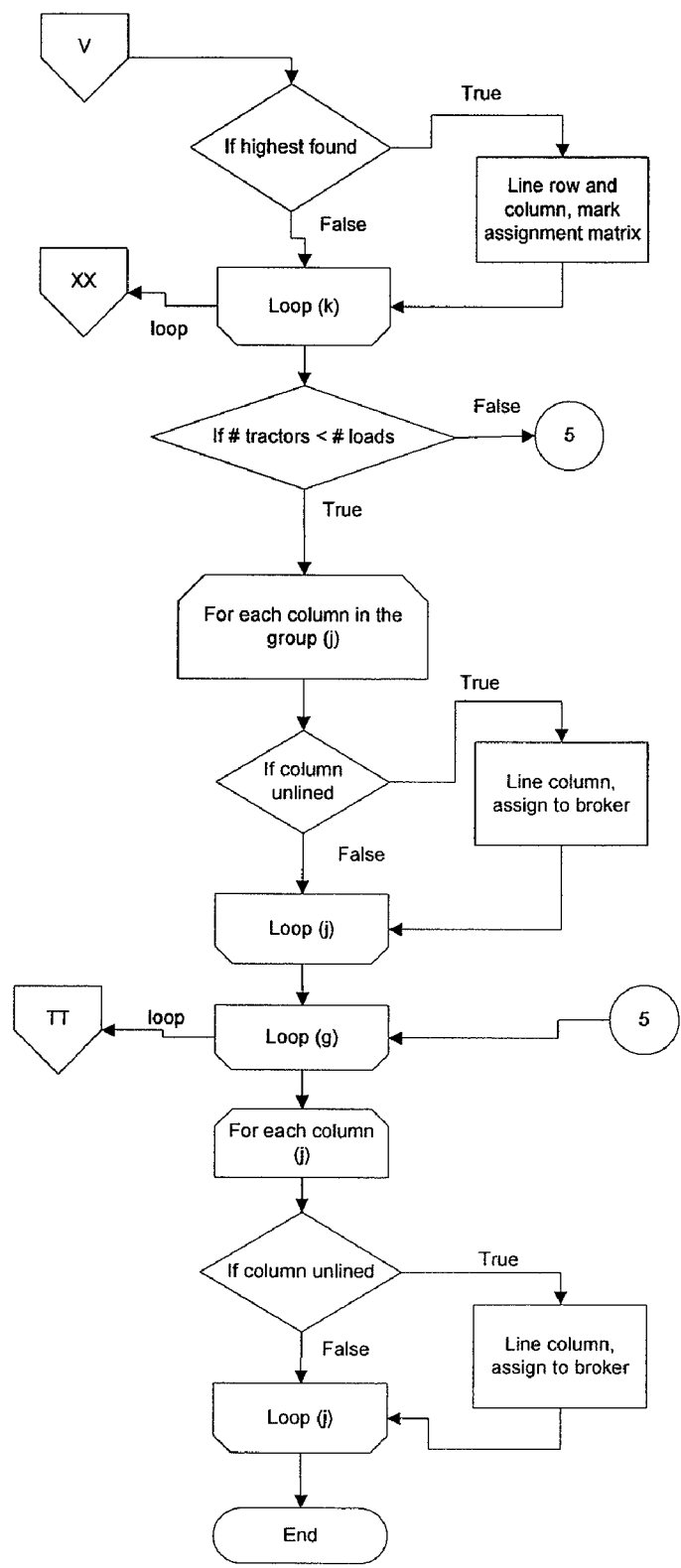

FIG. 26 illustrates the structure of a system comprising a Hungarian Assignment algorithm or equivalent module provided in accordance with one embodiment of the present invention.

FIG. 27 illustrates a flowchart of a Hungarian Assignment algorithm or equivalent provided in accordance with one embodiment of the present invention.

Finding Best Optimum Heuristics

Two major heuristic algorithms were developed to find the best optimum solution. The first one is to find all possible optimum solution combinations by grouping jobs and tractors in a certain manner, which will be explained in greater detail further below. The second heuristic algorithm determines the best (preferred) optimum solution in such a way that the company tractors (including owner-operators) end up at the preferred location(s), which will lower the operating cost not only for the next iteration but also for the next day.

FIG. 28 illustrates a flowchart including heuristics provided in accordance with one embodiment of the present invention.

Figure 6:
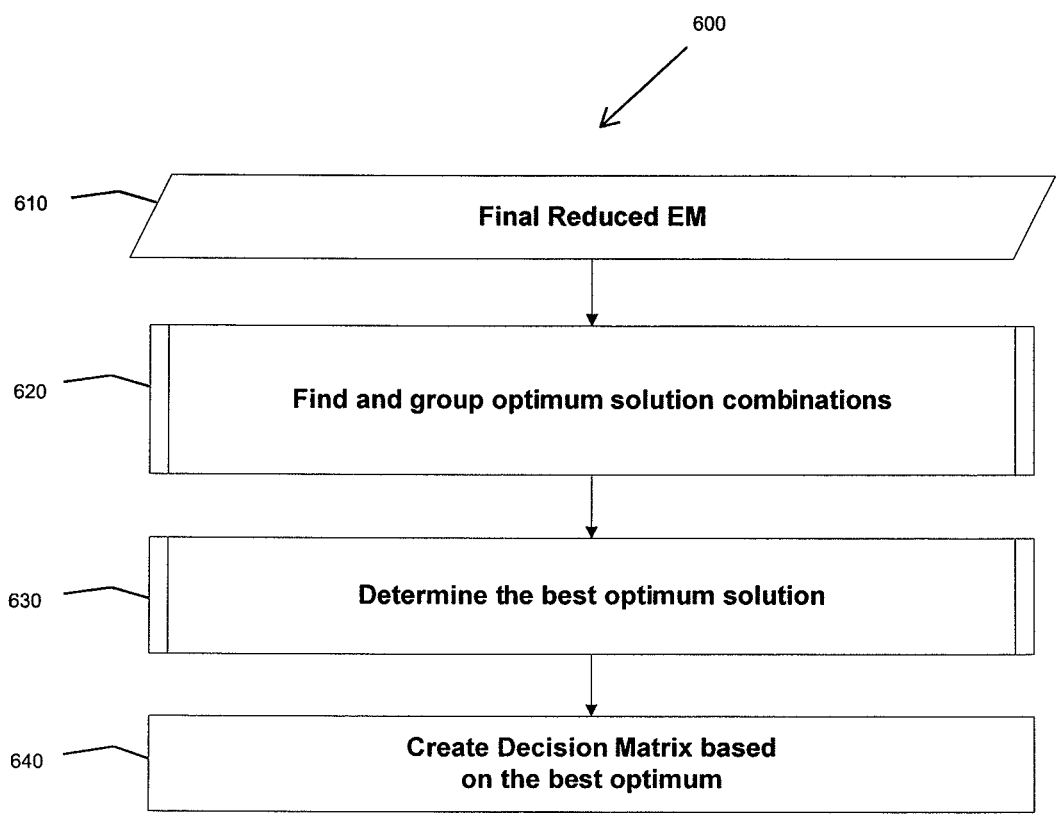
FIG. 6 illustrates a flowchart of the best optimum heuristics, in accordance with one embodiment of the present invention.

FIG. 6 illustrates a flowchart of the best optimum heuristics, in accordance with one embodiment of the present invention. At step 610, a final reduced EM is obtained. At step 620, optimum solution combinations are found and grouped. At step 630, the best optimum solution is determined. At stp 640, a Decision Matrix is created based on the best optimum solution.

Determining Optimum Solution Groups

Figure 7:
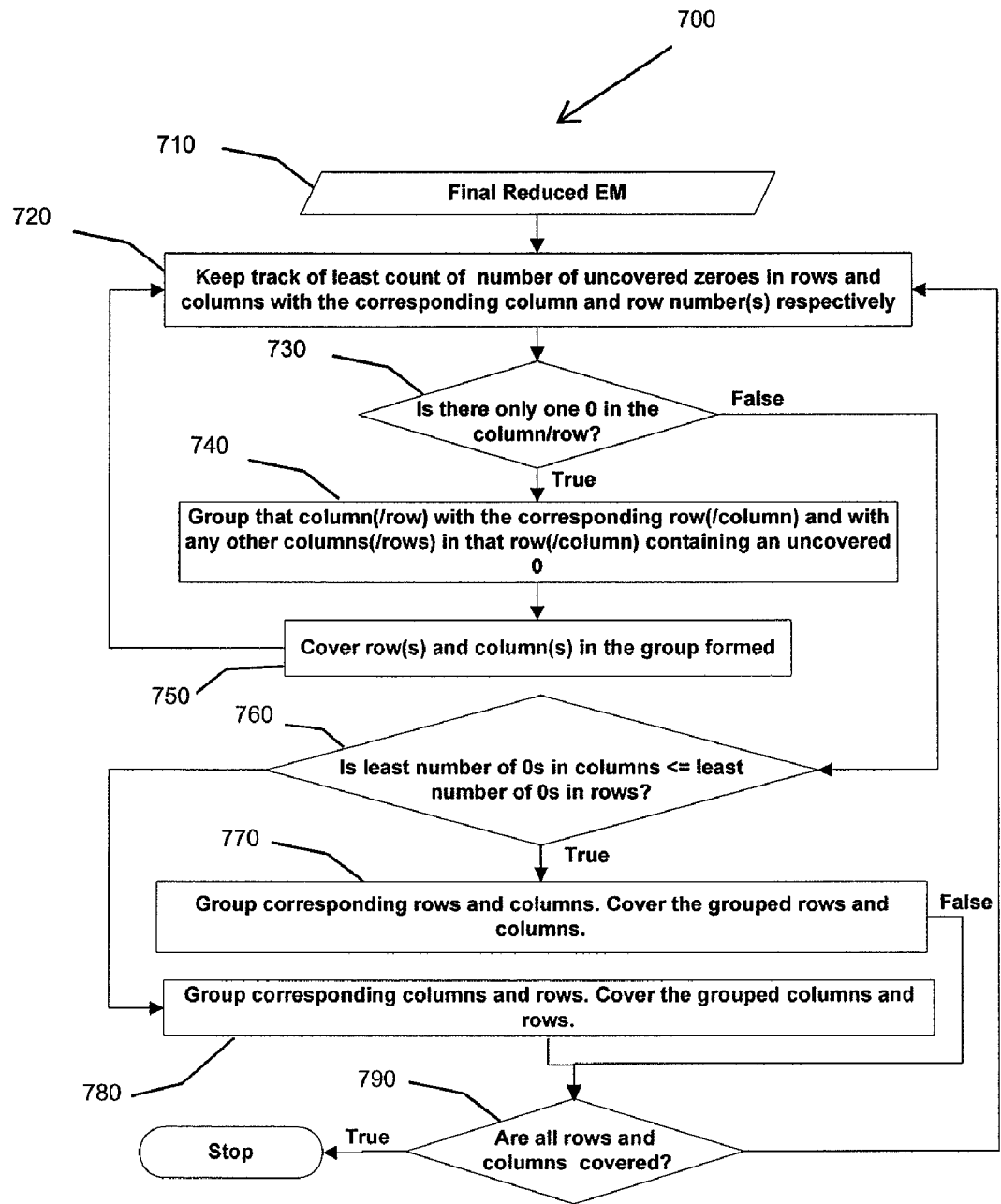
FIG. 7 illustrates a Grouping optimum solution combinations heuristic, provided in accordance with one embodiment of the present invention.

FIG. 7 illustrates a Grouping optimum solution combinations heuristic, provided in accordance with one embodiment of the present invention.

The heuristic which groups all the optimum solution combinations can be summarized in the following steps and acts:

(1) At step 720, count all the uncovered zeroes in each column of the EM. Keep track of the least number of zeroes (minimum of one zero) and the corresponding column in which they occur. At step 730, determine if there is more than one column containing the least number of zeroes and the zeroes occur in the same rows for those columns, then keep track of all those columns at step 750.

(2) At step 720, count all the uncovered zeroes in each row, and keep track of the least number of zeroes and the corresponding row in which they occur. At step 730, determine if there is more than one row containing the least number of zeroes and the zeroes occur in the same columns for those rows, then keep track of all those rows at step 750.

(3) If it is determined at step 730 that there is a column that contains only one uncovered zero, at step 740 group that column with the corresponding row containing the zero and with any other columns in that row that contain an uncovered zero.

(4) At step 730, if there is a row that contains only one uncovered zero, group that row with the corresponding column containing the zero and with any other rows corresponding to that column that contain an uncovered zero.

(5) If either step 3 or 4 is true, cover the corresponding rows and columns in that group. If all the rows and columns are covered, terminate the algorithm. Otherwise go to step 1 and start forming the next group.

(6) At step 760, if the least number of zeroes in columns is less than or equal to the least number of zeroes in the rows, then:
   (a) At step 770, group the columns that contain the least number of zeroes with the corresponding rows that contain these zeroes.
   (b) At step 770, cover all the rows and columns that were grouped in step 6a. At step 790, if all the rows and columns are covered, terminate the algorithm. Otherwise go to step 1 and start forming the next group.

(7) At step 760, if the least number of zeroes in the rows is less than the least number of zeroes in the columns, then:
   (a) At step 780, group the rows that contain the least number of zeroes with the corresponding columns that contain these zeroes.
   (b) At step 780, cover all the rows and columns that were grouped in step 7a. At step 790, if all the rows and columns are covered, terminate the algorithm. Otherwise go to step 1 and start forming the next group.

For practical reasons, the possible groups are determined only for the company tractors and real jobs. This is because it is clear that any remaining tractors that cannot be assigned within a group will be assigned to dummy jobs, which means that they will not be assigned any other jobs for the current iteration. Similarly any remaining job(s) that cannot be assigned within a group will be assigned to broker tractor(s), which means that those job(s) will not be assigned in the current iteration. Broker tractors are still required in the Hungarian Assignment algorithm or equivalent to calculate the trade-offs between using the company tractors and the broker tractors. Dummy jobs are also required because the matrix has to be square to make efficient use of the Hungarian Assignment algorithm or equivalent.

FIG. 8 shows exemplary tables to illustrate how the steps of FIG. 7 work. A sample of the final reduced EM is given in FIG. 8a, and as explained with reference to FIG. 7, the first step is to count the number of zeroes in all rows and columns. Columns 3 and 6 have the least number (2) of zeroes. Therefore these columns are grouped with the corresponding rows (0 and 3) containing the zeroes as shown in FIG. 8b. FIG. 8b also shows the group number and the elements contained in that group. The arrays dim_comb_c[ ], dim_comb_r[ ], comb_range_c[ ][ ], and comb_range_r[ ][ ] are used in the Model to keep track of the groups. dim_comb_c[0]=2 indicates that there are 2 columns belonging to group number 0. The columns numbers corresponding to these 2 columns are indicated by comb_range_c[0][0] and comb_range_c[0][1]. In a similar manner, dim_comb_r[0]=2 indicates that there are 2 rows belonging to group number 0. The row numbers corresponding to these two rows are indicated by comb_range_r

[0][0] and comb_range_r[0][1]. The first index of comb_range_c and comb_range_r arrays indicates the group number, while the second index refers to the position of the row or column number in these arrays. Rows 0 and 3 and columns 3 and 6 are then covered. In summary, the first group indicates that there are two possible optimum solution combinations within this group. The first possible combination is assigning tractor 0 to job 3 and tractor 3 to job 6, while the second possible combination is assigning tractor 0 to job 6 and tractor 3 to job 3.

Uncovered zeroes for each row and column are counted again. The least number of zeroes is 2 for row numbers 2 and 5. Based on this, the second group (group number=1) contains row numbers 2 and 5 and corresponding column numbers 0 and 2. An important point to be observed is that when column numbers 0 and 2 are covered, the cells (1, 0) and (1, 2) are also covered. This indicates that although these cells contain a zero, an assignment cannot be made for these zeroes. Otherwise it would not be possible to ensure having an optimum solution.

As shown in FIG. 8*c*, column numbers 0 and 2, and row numbers 2 and 5 are covered (indicated by the lighter shading). It can be seen that the second group indicates that there are two possible optimum solution combinations within this group. The first possible combination is assigning tractor 2 to job 0 and tractor 5 to job 2, while the second possible combination is assigning tractor 2 to job 2 and tractor 5 to job 0.

In a similar manner uncovered zeroes are counted for the third group (group number=2). Columns 1, 4, and 5 and rows 1, 4, and 6 are grouped and covered as shown in FIG. 8*d*. It can be seen that the second group indicates that there are six possible optimum solution combinations within this group as follows:

(1) Assigning tractor 1 to job 1, tractor 4 to job 4, and tractor 6 to job 5,
(2) Assigning tractor 1 to job 1, tractor 4 to job 5, and tractor 6 to job 4,
(3) Assigning tractor 1 to job 5, tractor 4 to job 4, and tractor 6 to job 1,
(4) Assigning tractor 1 to job 4, tractor 4 to job 5, and tractor 6 to job 1,
(5) Assigning tractor 1 to job 4, tractor 4 to job 1, and tractor 6 to job 5, and
(6) Assigning tractor 1 to job 5, tractor 4 to job 1, and tractor 6 to job 4.

In this simple example, the number of rows and columns in a group happened to be equal. However this is not necessarily the case for real data. If this process is done only for the available loads and tractors (excluding dummy jobs and broker tractors) and if the number of rows or columns is not equal, it would mean that the excess tractor(s) or job(s) would be assigned to dummy jobs or broker tractors respectively. For example if there are 3 jobs and 2 tractors in a group, there would be 6 possible optimum assignment combinations and for each combination one job would have to be assigned to a broker tractor.

Even for this very simple example the number of possible optimum solution combinations is 2×2×3!=24. For real data, the number of different possible optimum assignment combinations is between $10^{25}$ and $10^{100}$. These are only the different assignment combinations that have the same minimum cost. The total possible solution combinations can be approximated to be between $10^{1000}$ and $10^{200000}$. In absence of the present disclosure, there is no method at present that finds all possible optimum combinations systematically in order to make trade offs between optimum combination efficiently using the Hungarian Assignment algorithm or equivalent because for most applications any optimum solution is sufficient. However, because this Model uses an iterative procedure where the outcome of one iteration affects the next iteration significantly, this heuristic was developed, in accordance with one embodiment of the present invention.

Finding Best Optimum Solution

Once the optimum groups are determined, all the cells within each of these groups are weighted using functions, based on several criteria. Only the cells corresponding to the company tractors and real jobs are weighted. The final assignments are made based on the weighted factors. These final assignments represent the best optimum solution, and the decision (assignment) matrix is created based on this preferred solution.

The Effective Decision Matrix (EDM) is created with the same dimensions as the EM to store the weighted factors used in making the final assignments. The following factors and ratios are used to weight the cells:

(1) Wait Time Ratio (WTR),
(2) Home Base Factor (HBF),
(3) Leg Home Base Factor (LHBF),
(4) Getting Close Ratio (GCR), and
(5) Maximum Ratio (MR).

Certain factors and/or ratios that a tractor qualifies for are multiplied by a base number (CHF) to determine the weighting of that cell. Specific formulae were developed to determine each of these factors and ratios, and these formulae will be discussed later in this subsection.

Figure 9:
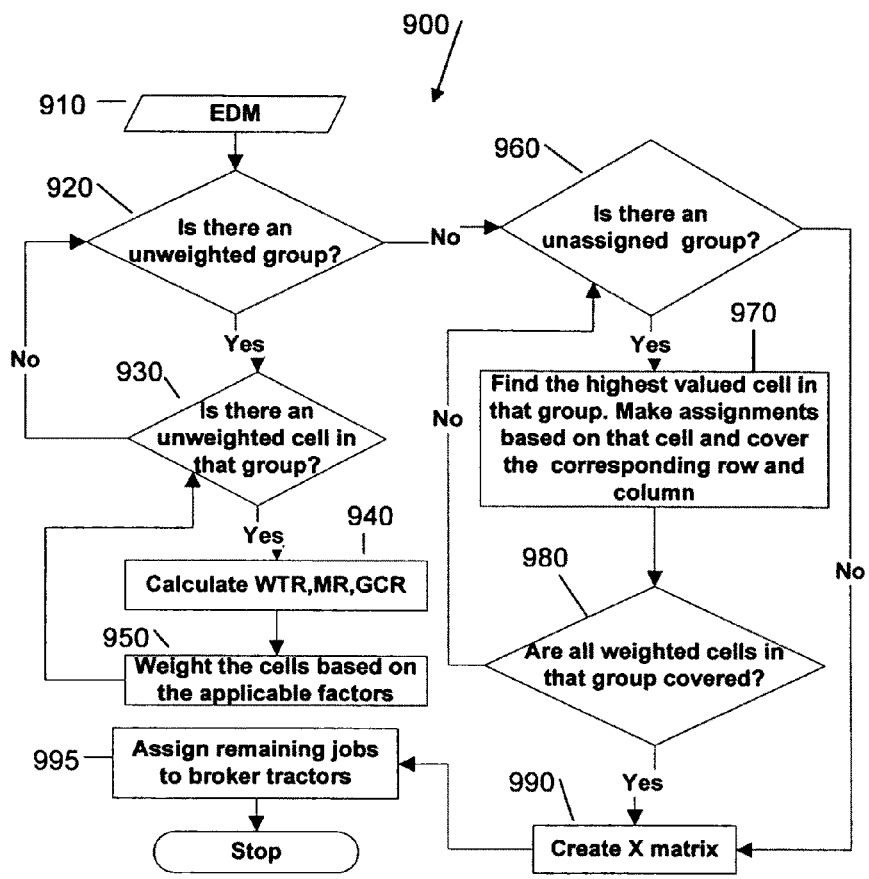
FIG. 9 illustrates a finding best optimum heuristic, provided in accordance with one embodiment of the present invention.

FIG. 9 illustrates a finding best optimum heuristic, provided in accordance with one embodiment of the present invention.

The steps and acts of the heuristic are as follows:

(1) At step 910, create the EDM of the same size as the final reduced EM. Again, the rows represent the tractors, while the columns represent the jobs. This EDM contains the weighted cells that are used to make the final assignments.
(2) At step 920, if there is an unweighted group, go to step (3) to process the first unweighted group in sequential order. When all groups have been weighted, go to step 10.
(3) At step 930, if there is an unweighted cell within the group, go to step (4) to process the first unweighted cell in sequential order. When all cells in the group have been weighted, go to step (2).
(4) At step 940, calculate the WTR by using the wait time of the tractor for that job as a parameter in the WTR function.
(5) At step 950, if the final destination of the load is the same as the home base of the tractor, weight that cell using the HBF and WTR. Weight the next cell within that group (go to step (3)).
(6) Similarly, at step 950 if the destination of one of the legs of the job is the same as the home base of the tractor, weight that cell by using the LHBF and WTR. Weight the next cell within that group (go to step (3)).
(7) At step 940, calculate the GCR depending on whether the tractor is getting closer to or further away from the home base.
(8) At step 940, calculate MR based on the tractor's MMR and MTAR.
(9) At step 950, weight the cell in the EDM based on the WTR, MR, and GCR. Go to step (3) to weight the next cell.
(10) At step 960, if there is a group for which assignment(s) have not been made, go to the next step, to make the assignments for the first unassigned group in sequential order. At step 980, when assignments have been made for all groups, go to step (13).

(11) At step 970, find the first uncovered cell containing the biggest value in that group. If all weighted cells are covered within the group, go to step (10).

(12) At step 970, make assignments for the corresponding tractor and job based on the cell found in step (11). Cover the respective rows and columns.

(13) At step 990, create the final assignment matrix "X" depending on the assignments made in step (12). Repeat step (11).

(14) At step 995, uncovered jobs (columns) are assigned to broker tractors, and these assignments are also indicated in the assignment matrix X.

Figure 10:
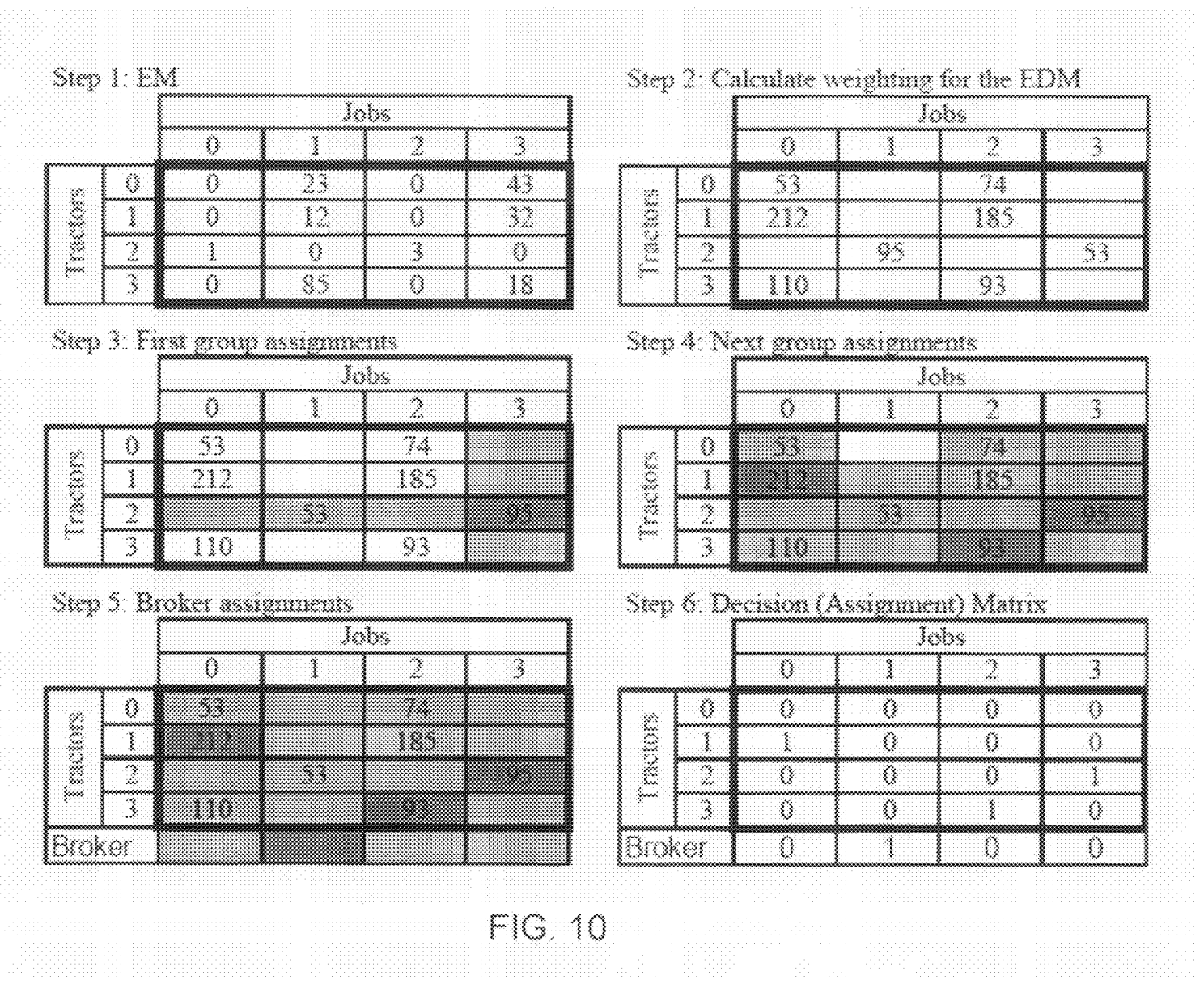

FIG. 10 shows the working of the heuristic of FIG. 9, by an example illustrating 6 main steps. As seen in the first step of the table, the EM is a 4×4 matrix, containing two optimum groups. The first group contains jobs 1, 3 and tractor 2 and the second group contains jobs 0, 2 and tractors 0, 1, 3. Step 2 shows that the EDM created is of the same dimensions as the EM and weighting values are calculated for each group. Step 3 shows the possible assignment for the first group, which is tractor 2 and job 3. The corresponding row and column is then covered. Tractor 2 is assigned to job 3 instead of job 1, because the weighting is higher for job 3 (indicated by darker shading). The first assignment for the second group is tractor 1 to job 0, as it has the highest value amongst the uncovered weighted cells within that group (as shown in step 4). Row 1 and column 0 are then covered. The second assignment within that group is tractor 2 to job 3 because the corresponding cell has the highest values among the uncovered weighted cells in that group. Once all possible assignments have been made the EDM is checked for an uncovered column(s). These remaining job(s) are assigned to the broker tractor(s) starting with the first broker tractor that is available, and the process is continued until all columns are covered (jobs are assigned). In this example, only one job goes to a broker tractor, which is shown in the final assignment matrix in step 6 of the table.

The calculation of the five factors introduced above will be discussed in the rest of this subsection. The formula used to calculate the WTR is:

$$WTR=1-(WTRF*2.72^{-9/wait\_time}).$$

Figure 11:
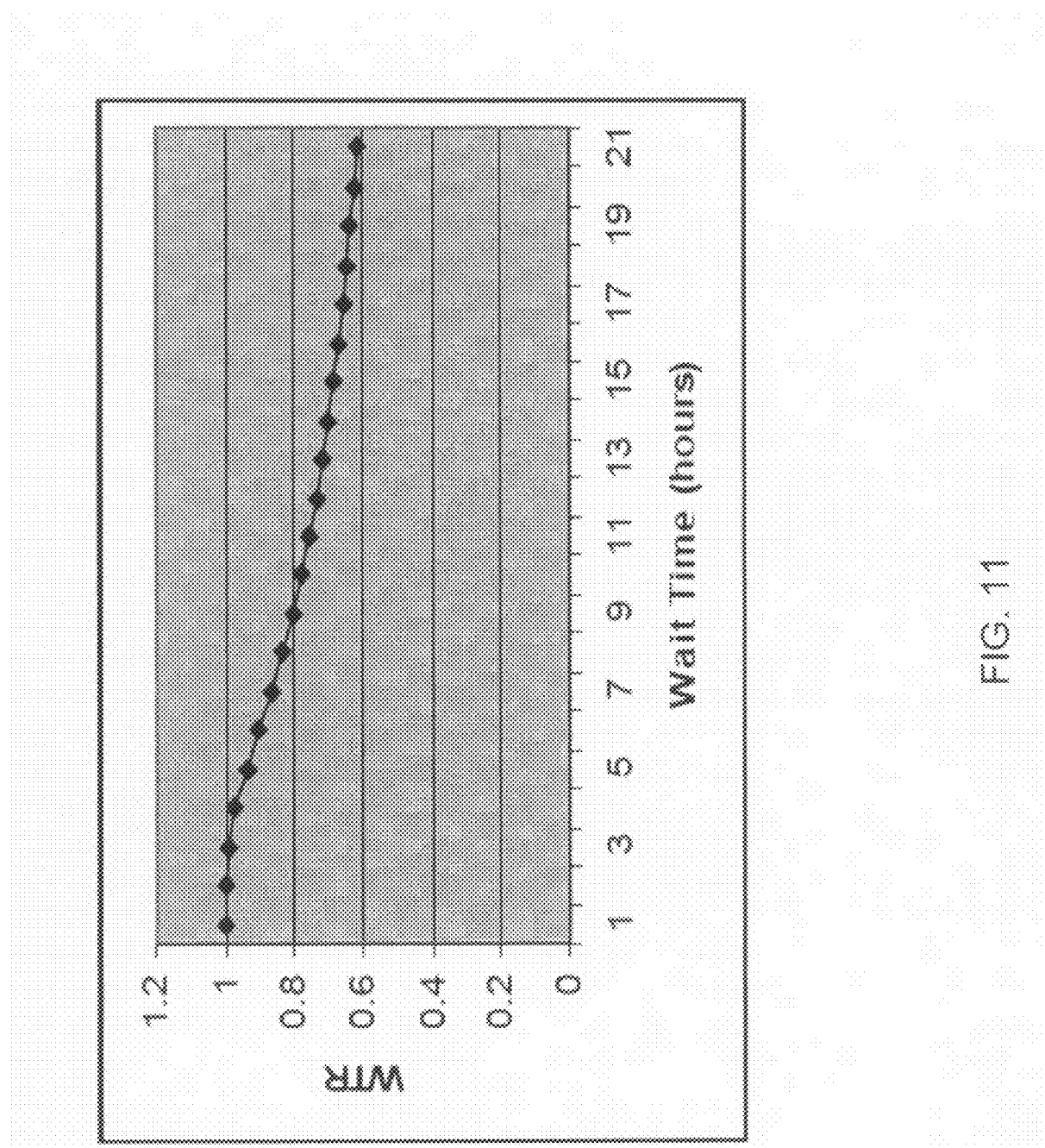
FIG. 11 illustrates Determining Wait Time Ratio (WTR) from wait time.

Wait time is calculated as the time that a tractor waits for the corresponding load or half of the time that a load waits for the corresponding tractor. This is because a tractor's wait time is paid, whereas a load's wait time is not as important especially because if the load is an optimum group, it will be delivered before its deadline. WTRF (Wait Time Ratio Factor) is a predetermined coefficient having a value of 0.6, which reflects the importance of wait time relative to other factors. FIG. 11 shows the relationship between WTR and the wait time. The WTR always has a value between 0.4 and 1. It is 1 when there is no wait time and gets closer to 0.4 when the wait time increases.

FIG. 11 illustrates Determining Wait Time Ratio (WTR) from wait time. If a load is going to the home base of the corresponding tractor, then the weighting is done based on WTR and HBF with the following formula:

$$EDM[\ ][\ ]=CHF*HBF*WTR.$$

HBF and CHF are predetermined coefficients, which have values of 0.76 and 100, respectively. HBF indicates the relative importance of a tractor going home amongst other factors. All weightings are calculated based on CHF, which is a predetermined coefficient that has a constant value. Since the weighting matrix is an integer matrix, the value of CHF can be simply increased, if the precision of the weighting is to be improved.

If the destination of one of the remaining legs of the load is the same as the home base of the corresponding tractor, then the waiting is done based on WTR and LHBF with the following formula:

$$EDM[\ ][\ ]=CHF*LHBF*WTR.$$

LHBF is also a predetermined coefficient having a value of 0.5, which indicates the relative importance of the destination of a leg of a load being the same as the home base of the corresponding tractor.

If a tractor is at its home base, then GCR is 1. If its at another terminal other than its home base then GCR is calculated depending on whether the tractor is getting closer to or away from the home base by doing the corresponding job. If the destination of the leg of a job is closer to the tractor's home base than the current location of the tractor, then GCR is calculated as:

$$GCR=(dis\_cur\_hb-dis\_leg\_dest\_hb)/dis\_cur\_hb$$

Where dis_cur_hb is the distance between the current location of the tractor and the tractor's home base, and dis_leg_dest_hb is the distance between the destination of the leg of the load and the tractor's home base. If the current location of the tractor is closer to its home base than the destination of the leg of the load, then the GCR is calculated as:

$$GCR=-(dis\_leg\_des\_hb-dis\_cur\_hb)/dis\_leg\_dest\_hb.$$

The value of GCR thus obtained is used to calculate the final value of GCR by using the formula GCR=1+(GCRF*GCR). GCRF is a predetermined coefficient having a value of 0.4, which reflects the relative importance of tractor getting closer to its home base. Higher GCR value indicates that the tractor is getting closer to its home base.

MR is calculated as MR=(1+MRF)−(MRF*max(MMR, MTAR)). It can be seen that the value of MR is based on MRF and the maximum of the Maximum Mileage Ratio (MMR) and the Maximum Time Away Ratio (MTAR). MRF is a predetermined coefficient having a value of 0.01, which indicates the relative importance of the Maximum Ratio amongst other factors. The value of MMR is calculated as:

MMR=(tractor's.running mileage+empty mile+distance between origin and destination of leg of the load)/tractor's maximum mileage.

Similarly the value of MTAR is calculated as:

MTAR=(tractor's current time away+time taken to travel the empty mile+processing time for the tractor to do the corresponding job)/tractor's maximum time away.

MR would be 1 if the preferred maximum time away and maximum mileage limits are exceeded. The value of MR might be between 1 and 2 depending on MRF and the maximum of MMR and MTAR.

If none of the remaining legs of the load have a destination the same as the tractor's home base, then the weighting for that cell is calculated using the following formula:

$$EDM[\ ][\ ]=CHF*MR*WTR*GCR.$$

The method used to establish the predetermined coefficients such as HBF, LHBF, GCRF, MRF, and WTRF will be discussed in greater detail under the Modification below.

Iterative Solution Procedure

Once the input data on the available tractors and loads is validated, the cost matrix is created for the jobs, company tractors, and also for the broker tractors and dummy jobs. This cost matrix is then used in the Hungarian Assignment algorithm or equivalent to obtain the final reduced EM. The heuristics developed are used to determine the different possible optimum solution groups and consequently the best optimum solution, and the final decision (assignment) matrix. The assignment matrix as discussed earlier contains the assignment of jobs to company tractors as well as to broker tractors.

All assignments are made based on this decision matrix, and the related fields for the jobs and tractors are updated. The fields that are updated for the available tractors that are assigned are the ETA, work time, current time away, running mileage, wait time, cost, current location, load number, and leg number. The fields that are updated for the available jobs that are assigned are the EPT, ETA, tractor number, and the number of legs that have been assigned.

Once these fields have been updated, all loads that have been assigned to broker tractors or that have unassigned legs remaining, as well as all the tractors are made available for the next iteration. Depending on the new list of available loads and tractors, the cost calculation and assignments are made for that iteration, and this process is repeated until no more assignments can be made. Obtaining the final output from the optimization model requires one complete run of the program, which consists of approximately 25 (±10) iterations.

An understanding of the key concepts of relative time and time step is required to appreciate the iterative procedure used. Thus an outline of the iterative procedure is given under the heading termination of the iterative procedure, after introducing these concepts under the following heading.

Relative Time and Time Step

The jobs and tractors are available at different times, some of them available several hours from the current time and some available several hours previous to the current time. To address this issue for a given situation of jobs and tractors, the time of availability of the jobs and tractors is considered in terms of relative time, which is the time relative to the current time. It is calculated as relative time=(current date−date read in from available load/tractor information file)*24−(current time−time read in from available load/tractor information file). In this formula, the current time and the time read in are not in the usual time format, but are in decimal format. For example, a current time of 2:40 would be 2.66 (2+40/60) and an available time of 4:20 would be 4.33, obtained by converting the minutes to hours. Thus if the current and available dates are the same, the relative time would be 4.33−2.66=1.67, implying that the load/tractor will be available 1.67 hours from the current time. Similarly a tractor/load available before the current time would have a negative value for relative time. The dates read in are in Julian format, so the difference in dates multiplied by 24 gives the difference in hours in the formula. A relative time of 50.5 implies that the job/tractor will be available two days and two-and-a half hours from the current time.

This simple concept of relative time alone was not sufficient to address certain other cases. Consider a tractor that has a relative available time of 5 (hours), and a job that has a relative available time of 20. It may be beneficial for the current iteration to assign the tractor to the job even if wait time has to be paid. However it is possible that in the following iterations there will be a load that has a relative available time of 5, and there will be other tractors available to do the job that has a relative time of 20. It is obvious that, in this case, it is not appropriate to make the assignment in that current iteration. The concept of time step was introduced to address this issue. The assignment of a job to a tractor is considered infeasible if the difference in their relative times is greater than the time step. Time step has a predetermined value, and after several trial runs was fixed to be 8 for this Model. The boundary for the time step is relative to the relative time. For example, the tractor having a relative time of 5 can only be considered to do jobs that do not have a relative time greater than 13. However if the relative time of another tractor is 15, the corresponding time step boundary would be 23.

Figure 12:
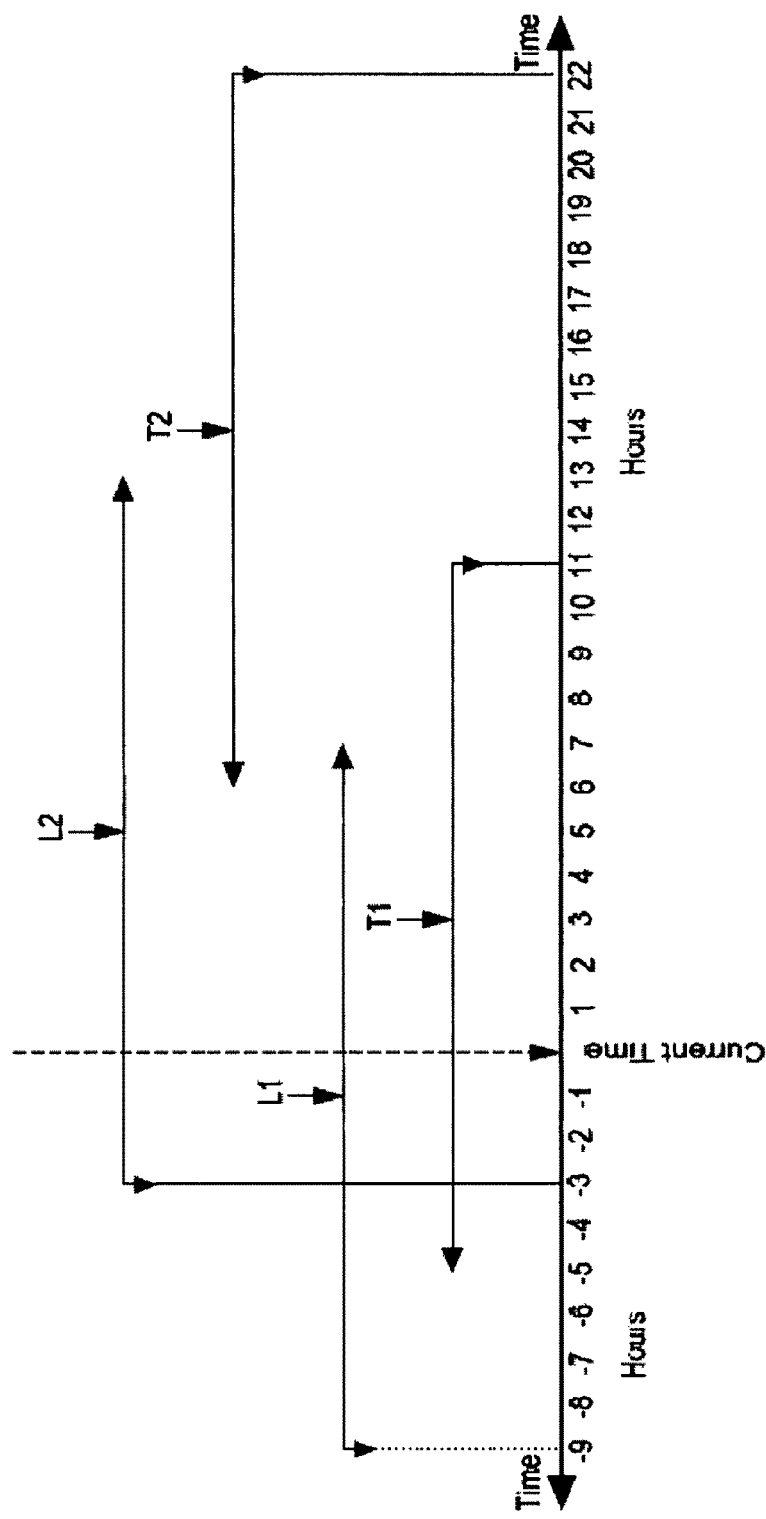
FIG. 12 illustrates a relative time step example.

FIG. 12 illustrates a relative time step example. FIG. 12 shows an example with two loads and two tractors to illustrate the relative time step concept for an iteration. Load 1 (L1) is available at −1 and Load 2 (L2) is available at 5. Thus the tractors considered for L1 in the current iteration must have relative times between 0 and ∞ and between 0 and ∞ for L2. Tractors 1 and 2 (T1 and T2) are available at 3 and 14, respectively. Thus the loads considered for T1 in the current iteration must have relative times between 0 and 11 and between 0 and 22 for T2.

Figure 13:
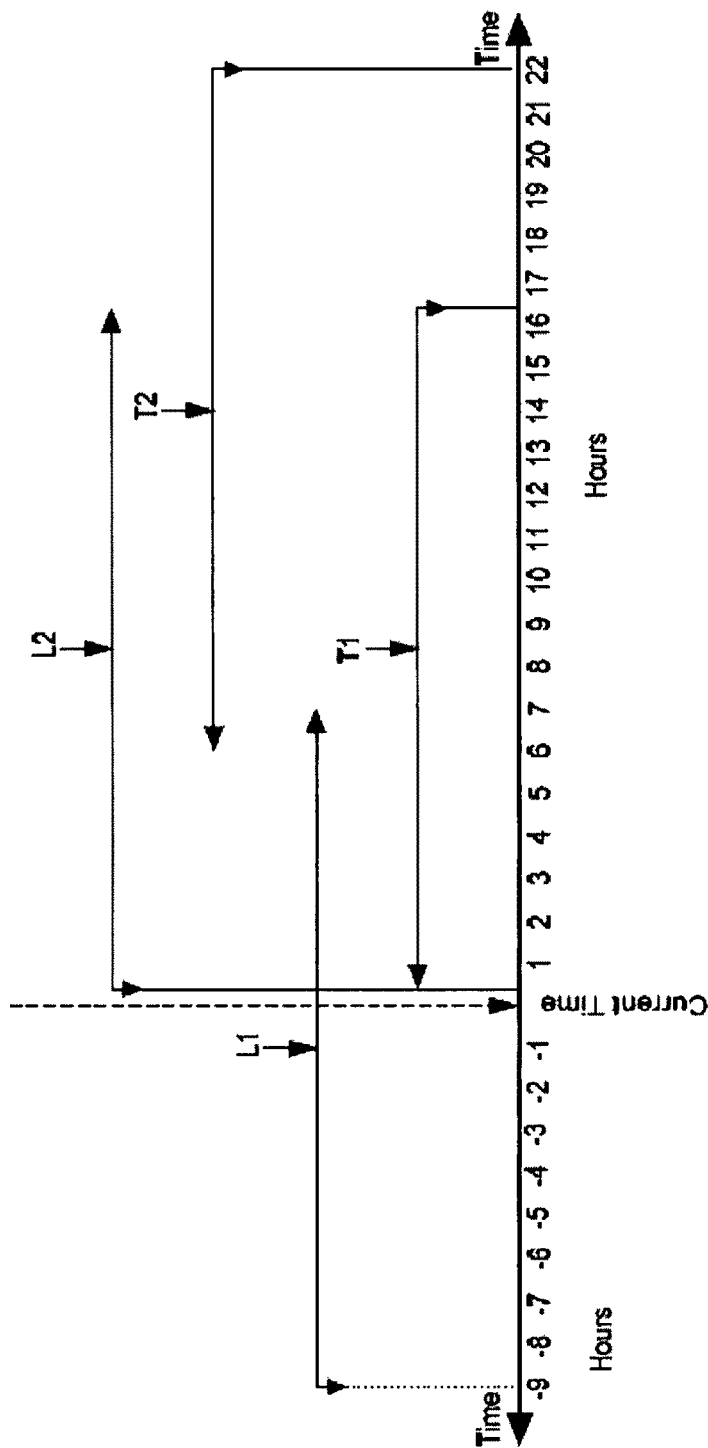
FIG. 13 illustrates a Shifted relative time step example.

Consider that the current leg of L2 to be processed has a relative time of 3.5, L2 is assigned to T1, L1 and T2 have not been assigned, and L2 has at least one more leg remaining. The relative time step for the next iteration for such a situation is shown in FIG. 13. As seen from the figure the relative time step for L1 and T2 have not changed in the next iteration. However L2's relative time shifts 3.5 hours ahead, and its new relative time step range is between 0.5 and ∞ for the next iteration. T1 is shifted 5.5 hours because it has to wait for 2 hours before it can start the current leg of the job L2 and the job (leg) takes 3.5 hours to complete. Thus T1's new relative time step range is between 0 and 16.5 for the next iteration.

FIG. 13 illustrates a Shifted relative time step example. The range starts at 0 (current time) when the relative time is before the current time, because an assignment cannot be made at a time previous to the current time. Regardless of a tractor's availability the loads considered are always from 0 to their available time in addition to the time step. Similarly only tractors which are available 8 hours before a load are considered for that load. It is obvious that tractors, which are available 8 hours after the loads availability, are considered for the load (and loads, which are available 8 hours before the tractor's availability, are considered for the tractor). This is because even though the load waits more than 8 hours for a tractor, if it still meets the deadline by making such an assignment, there is no need to use an additional constraint for this case and hold the potential assignment for another iteration.

It is to be noted that the concepts of relative time and time step were crucial to improving the operational efficiency and the role of these concepts in the iterative procedure is further detailed in the next subsection.

Termination of the Iterative Procedure

Figure 14:
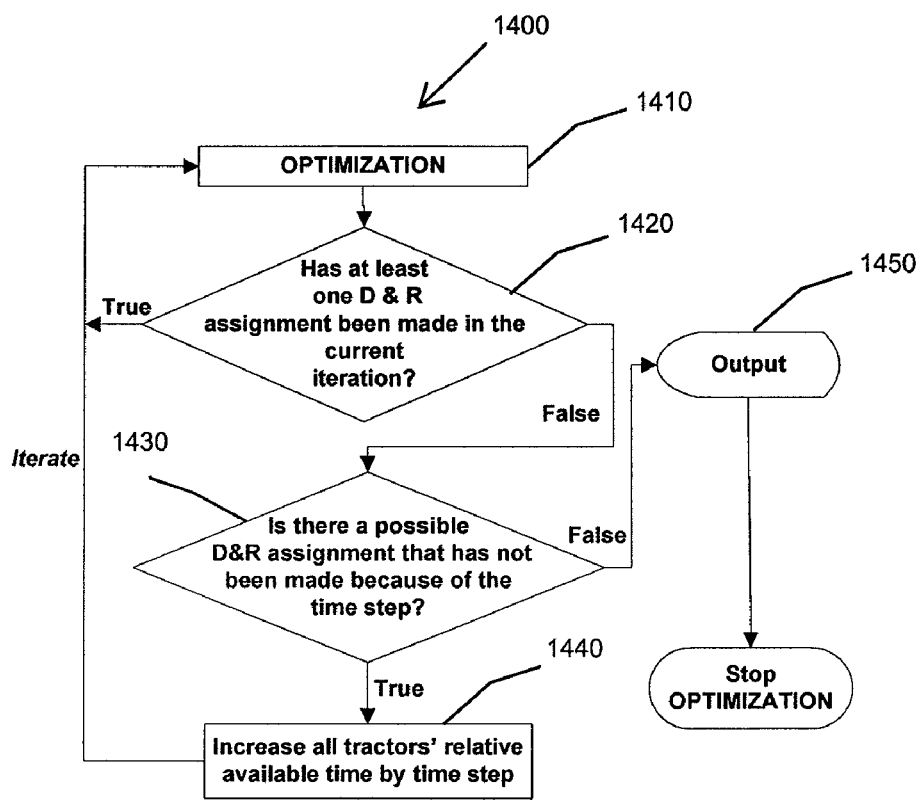
FIG. 14 illustrates an outline of iterative procedure, provided in accordance with one embodiment of the present invention.

FIG. 14 illustrates an outline of iterative procedure, provided in accordance with one embodiment of the present invention. It can be seen that there are two main conditions used in outline 1400 to check if the iterative procedure is to be terminated. If either of these conditions is true, the procedure is repeated for another iteration.

Once the optimization is done for the current situation (of jobs and tractors) at step 1410, the first condition that is checked at step 1420 is whether at least one company tractor has been assigned to a job. If at least one such assignment has been made, the optimization procedure of step 1410 is repeated for the next iteration.

At step 1430, the second condition is checked when not even one company tractor assignment has been made. The second condition checks whether there is at least one possible company tractor assignment, which was not made in the current iteration, because the tractor's availability was at least 8 hours (example value) before the job's availability. In this case the available relative time of all the tractors is increased by time step at step 1440, and it implies that no assignments can be made without performing this increment.

This iterative procedure is continued until neither of the conditions is satisfied. When the iterative procedure is terminated, the required output containing operational decisions are produced at step 1450 and the optimization program ends.

Modification

As discussed above, the modification module is only run when it is required to determine the fixed values of the coefficients for the factors and ratios used in the best optimum solution procedure. This is required only when there are changes in the company's operational policy on any of the preferred and/or fairness factors used. This change in the company's operational policy must be reflected in the functions, where these factors are calculated, and the modification module must be re-run to optimize the values of the coefficients.

The modification module does not include the process of determining the value of MR, due to the absence of the required data. This data includes the maximum time away and maximum mileage fields for each tractor, which will be determined by the company in the near future. The structure of the modification module has been framed such that the process of determining MR can easily be added to determine MR, when required. The company has to also associate a cost with this factor in the Optimization Model, so that the weighting for MR can be determined relative to other factors.

Figure 25A:
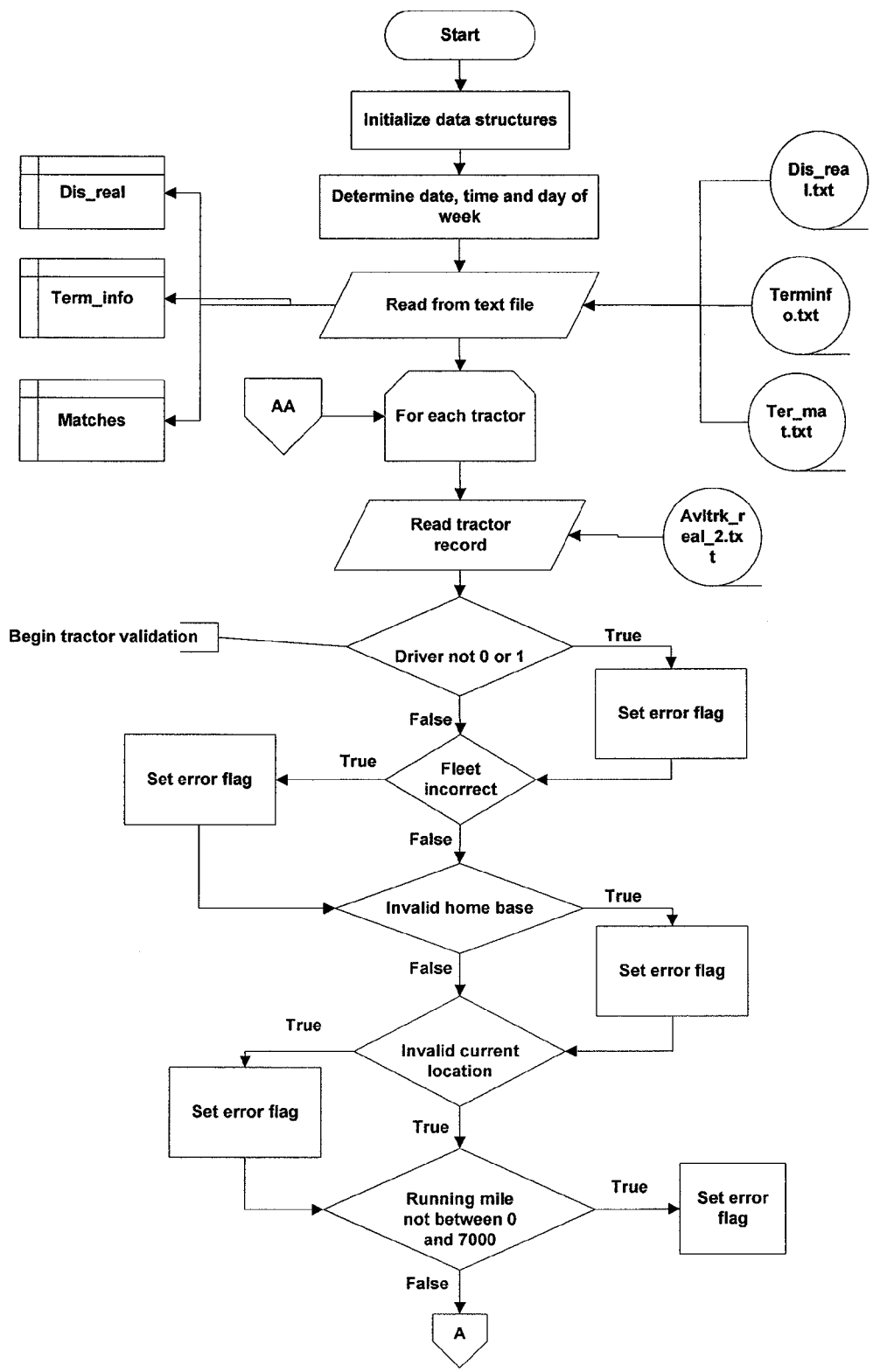
FIGS. 25a-t illustrate a flowchart of one embodiment of a method comprising an optimization model provided in accordance with one embodiment of the present invention.
Figure 25B:
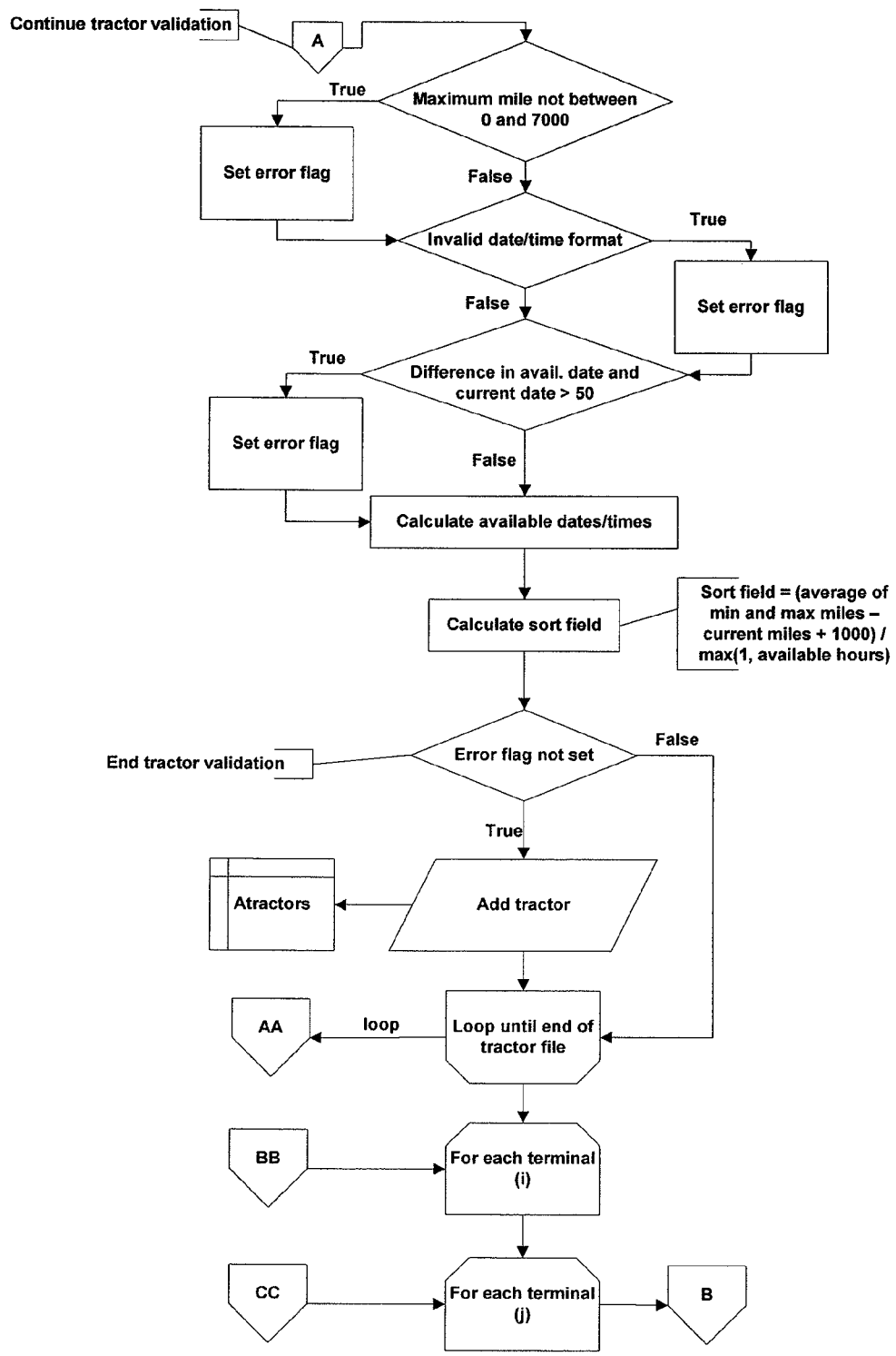
Figure 25C:
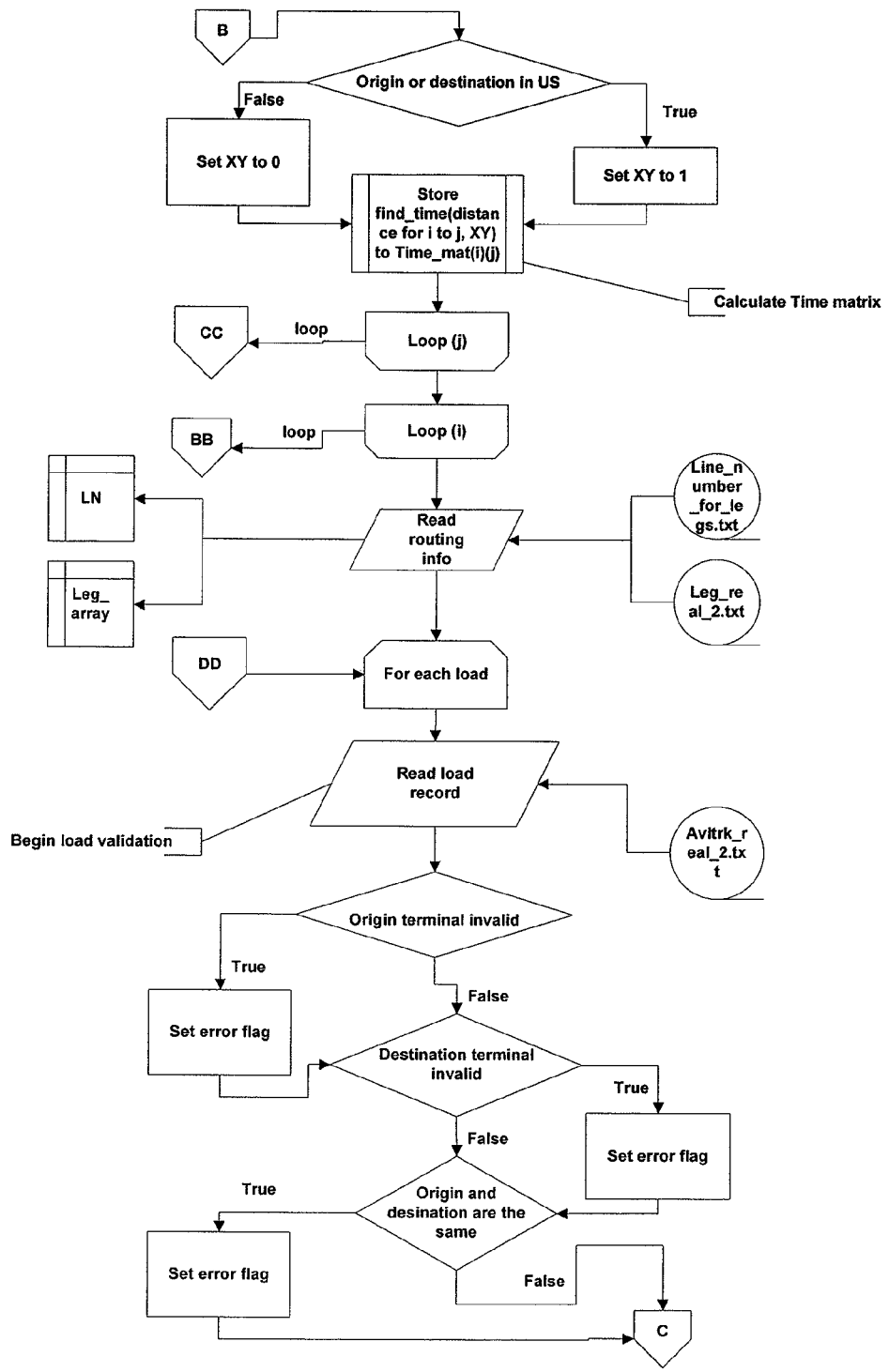
Figure 25D:
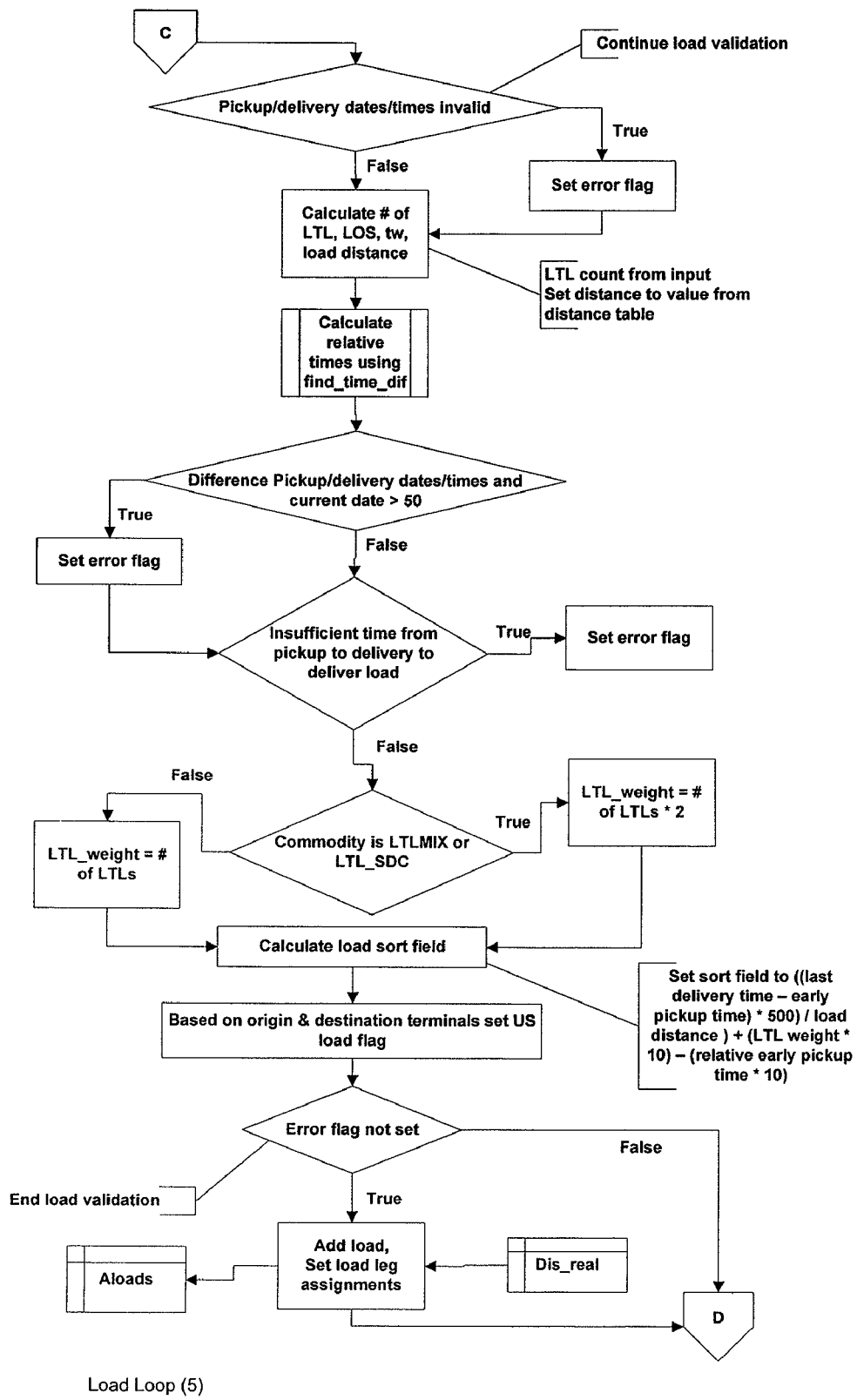
Figure 25E:
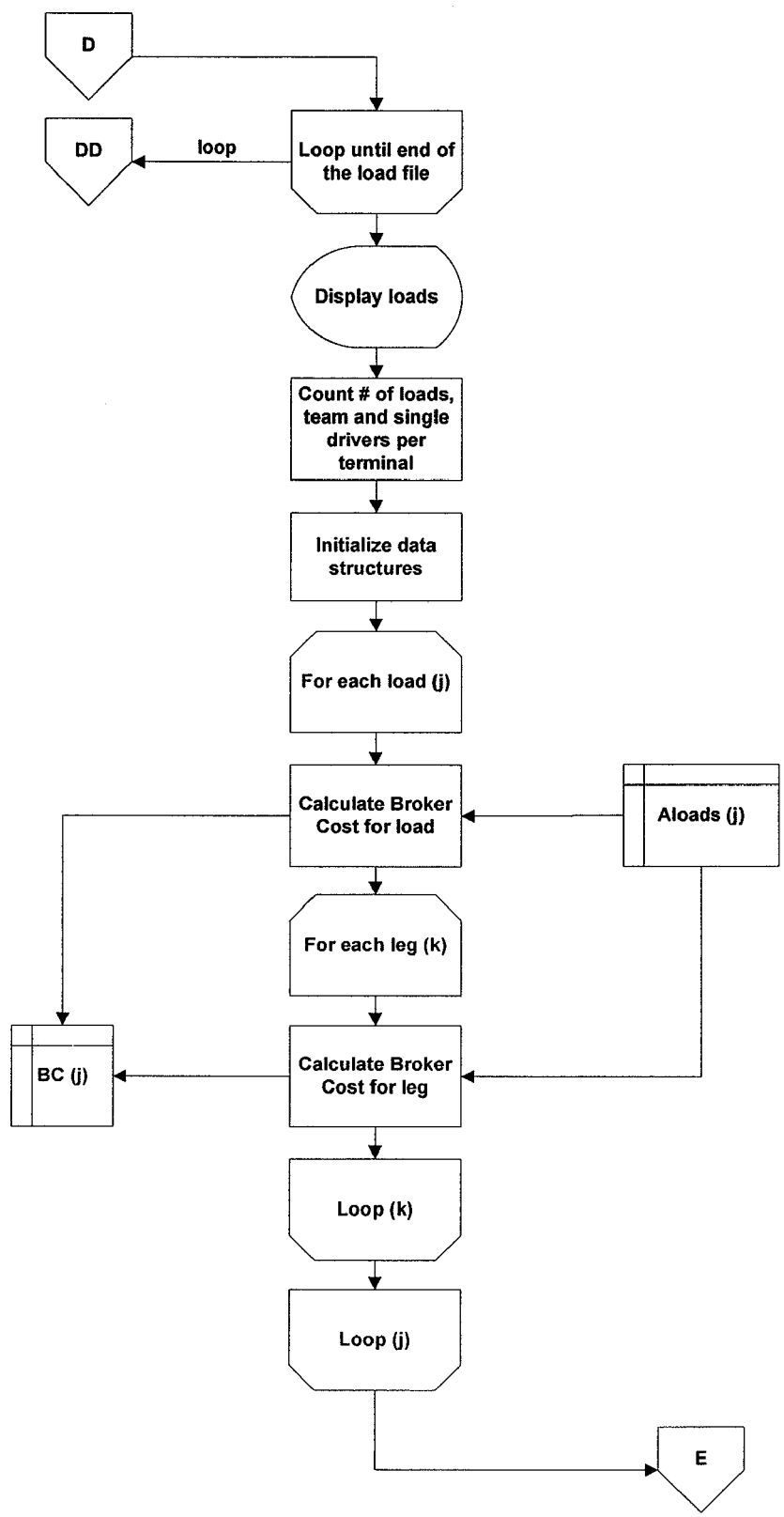
Figure 25F:
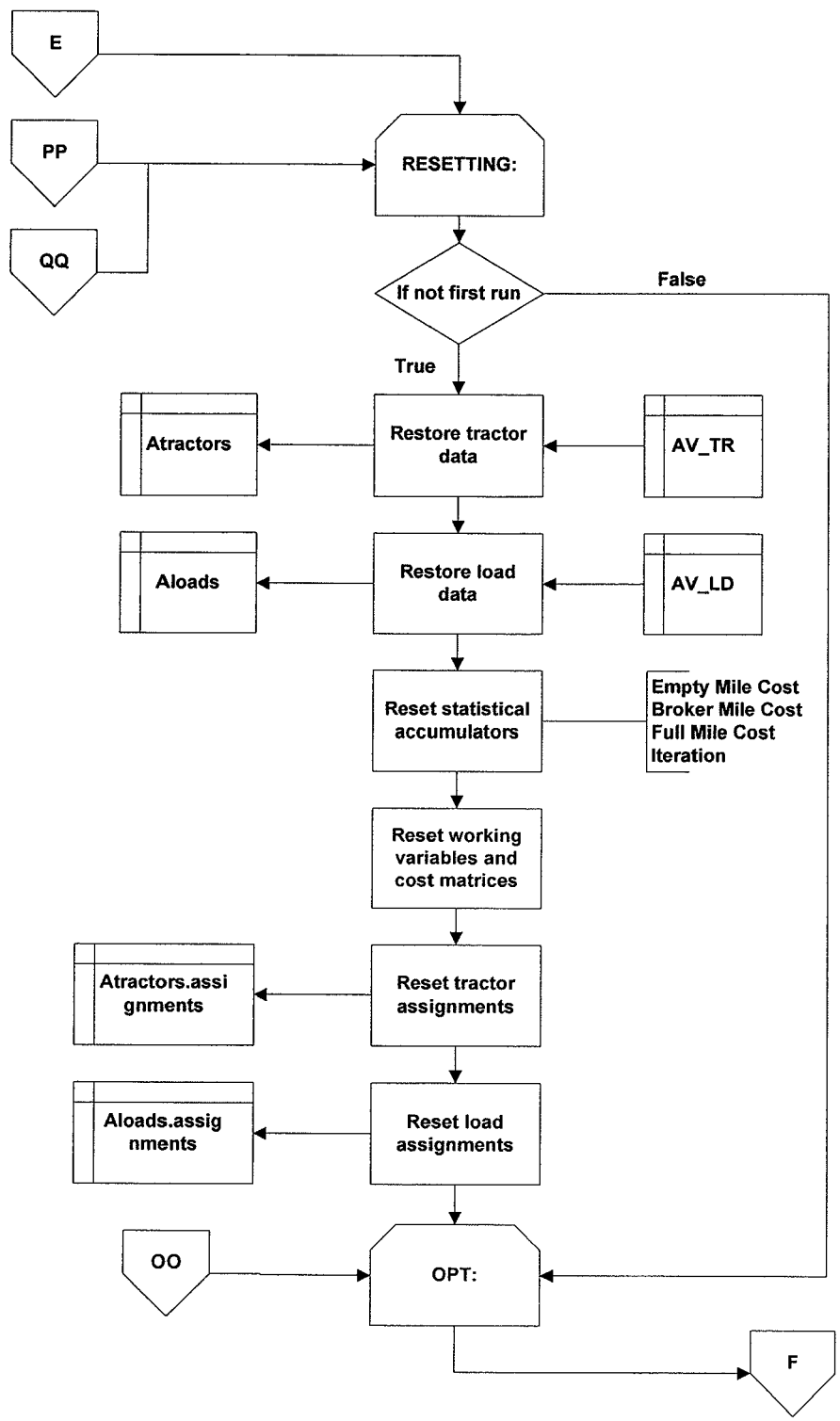
Figure 25G:
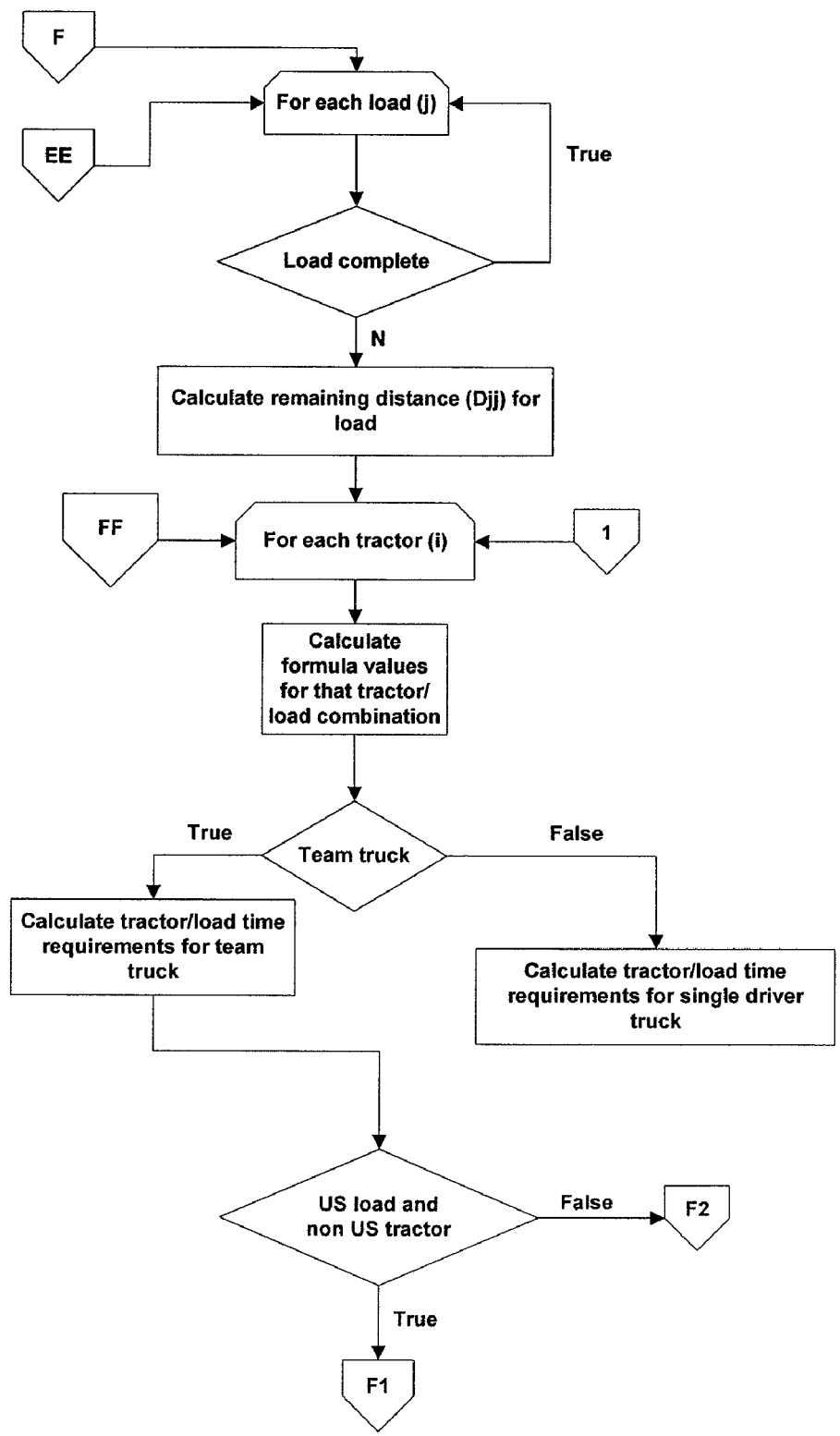
Figure 25G:
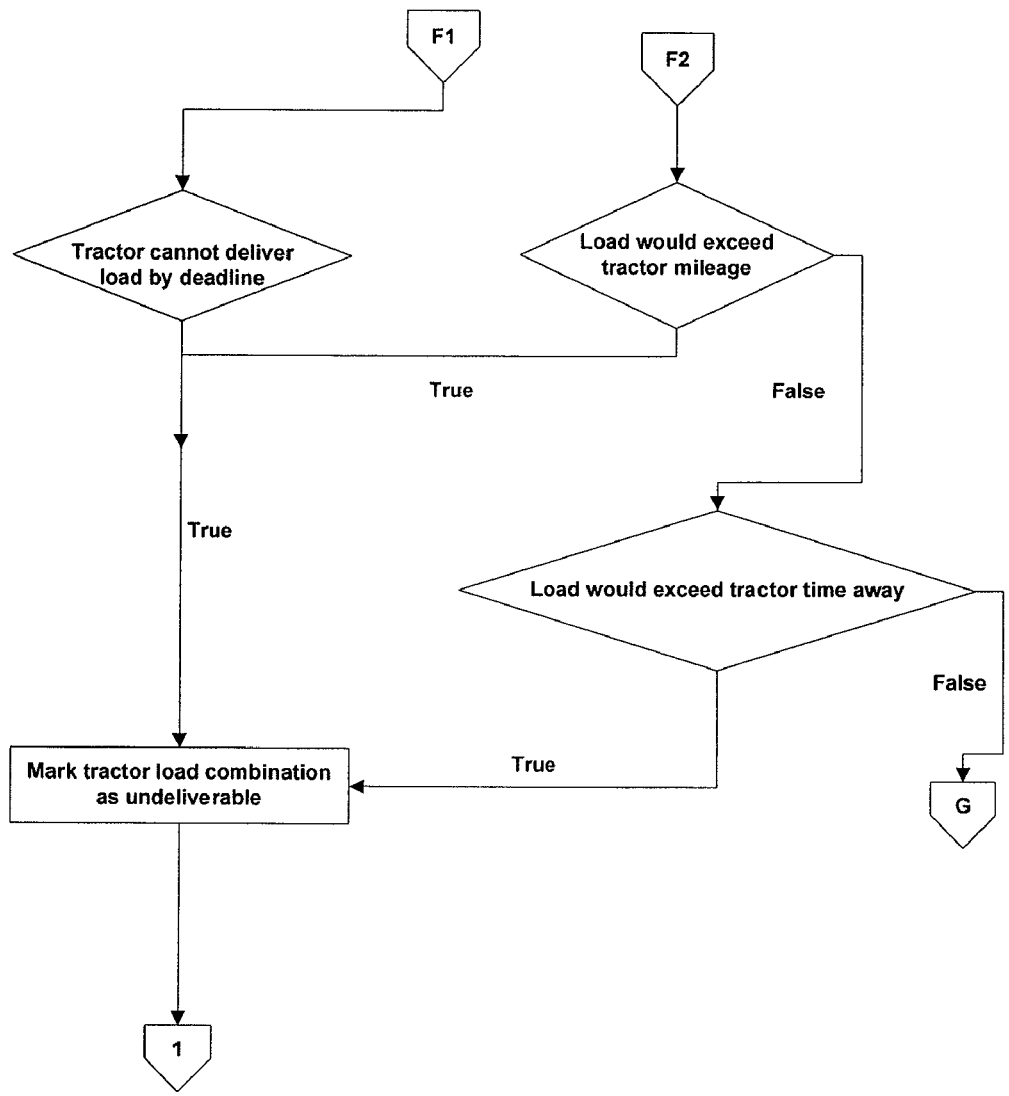
Figure 25H:
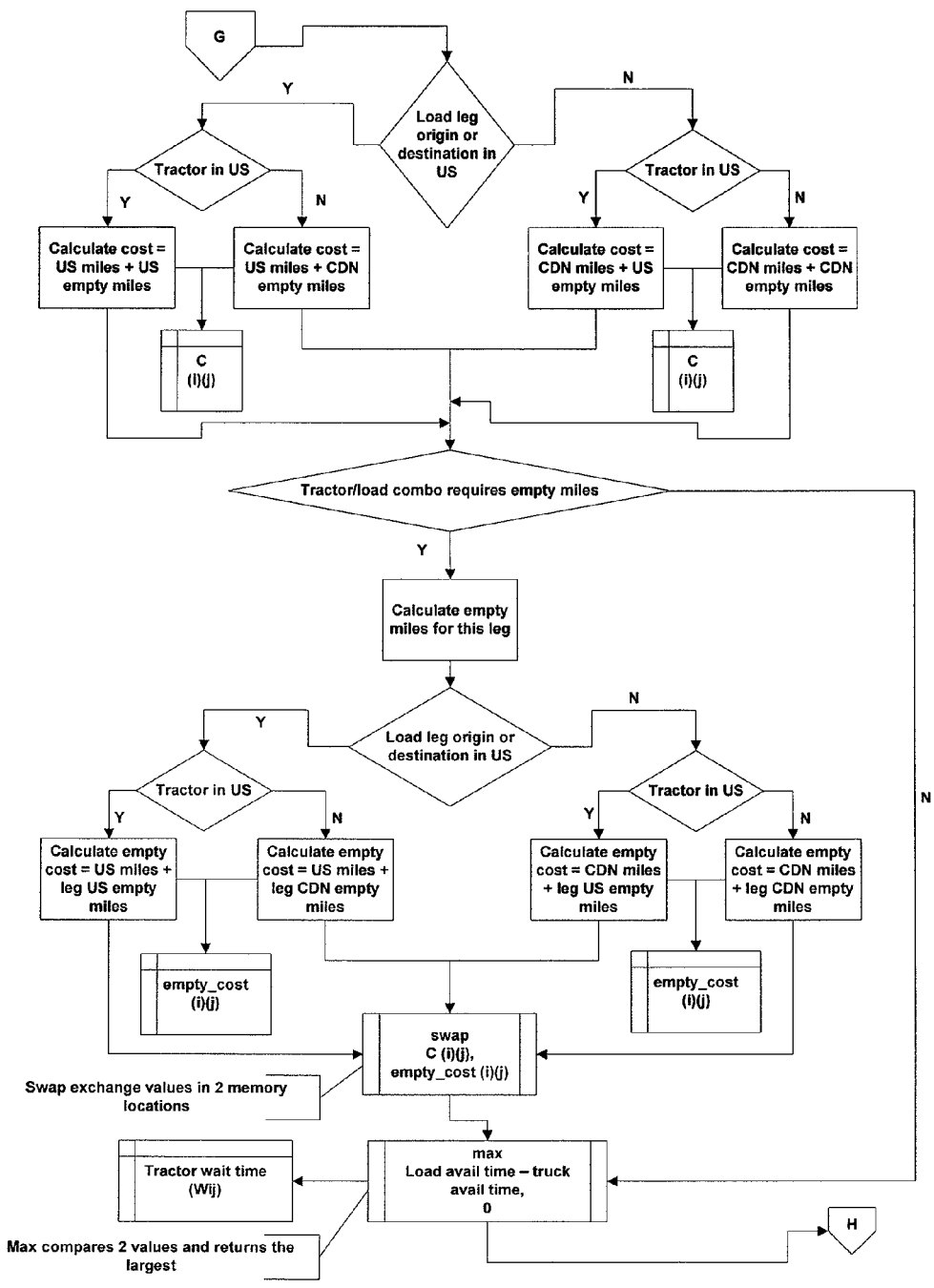
Figure 25I:
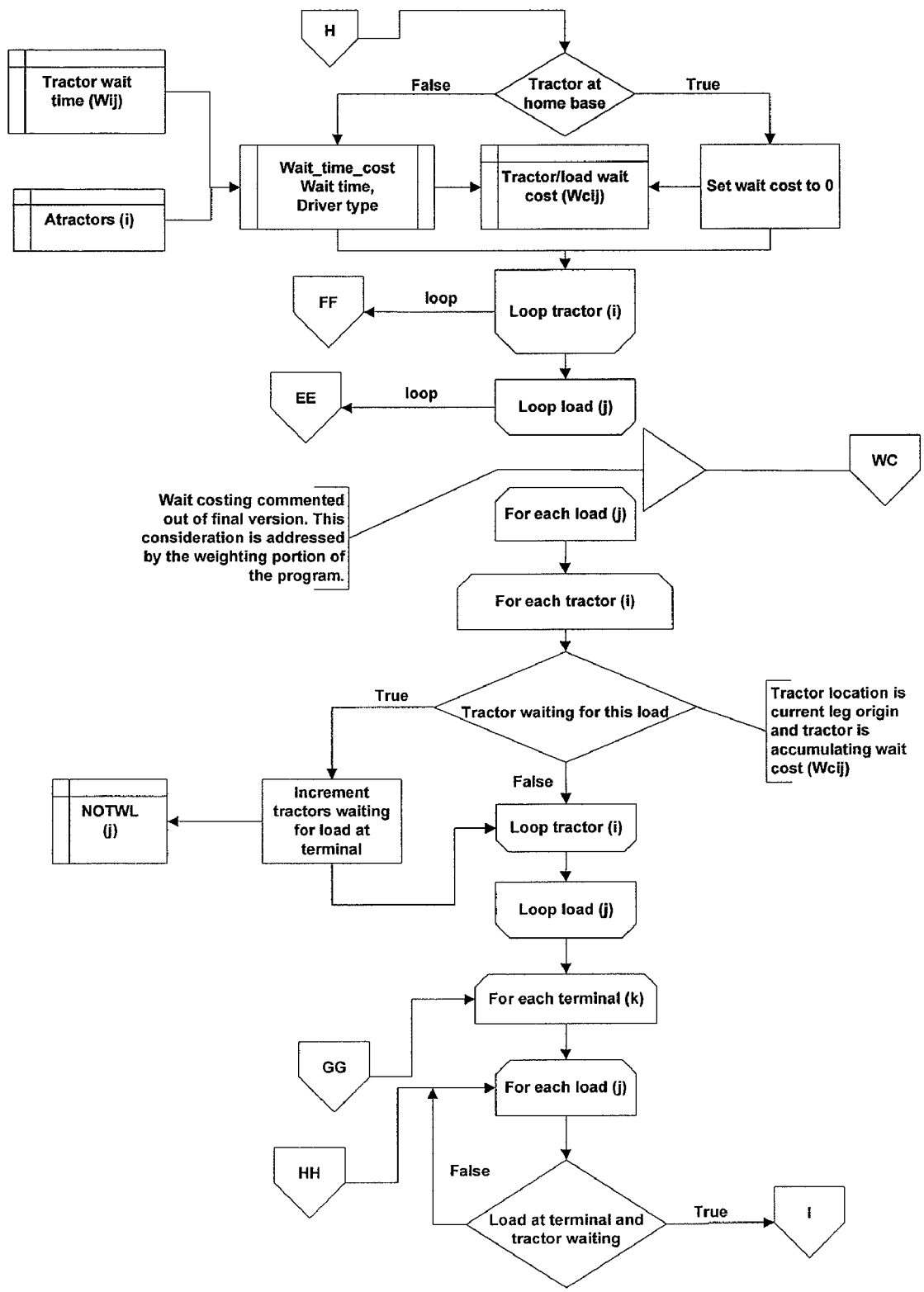
Figure 25J:
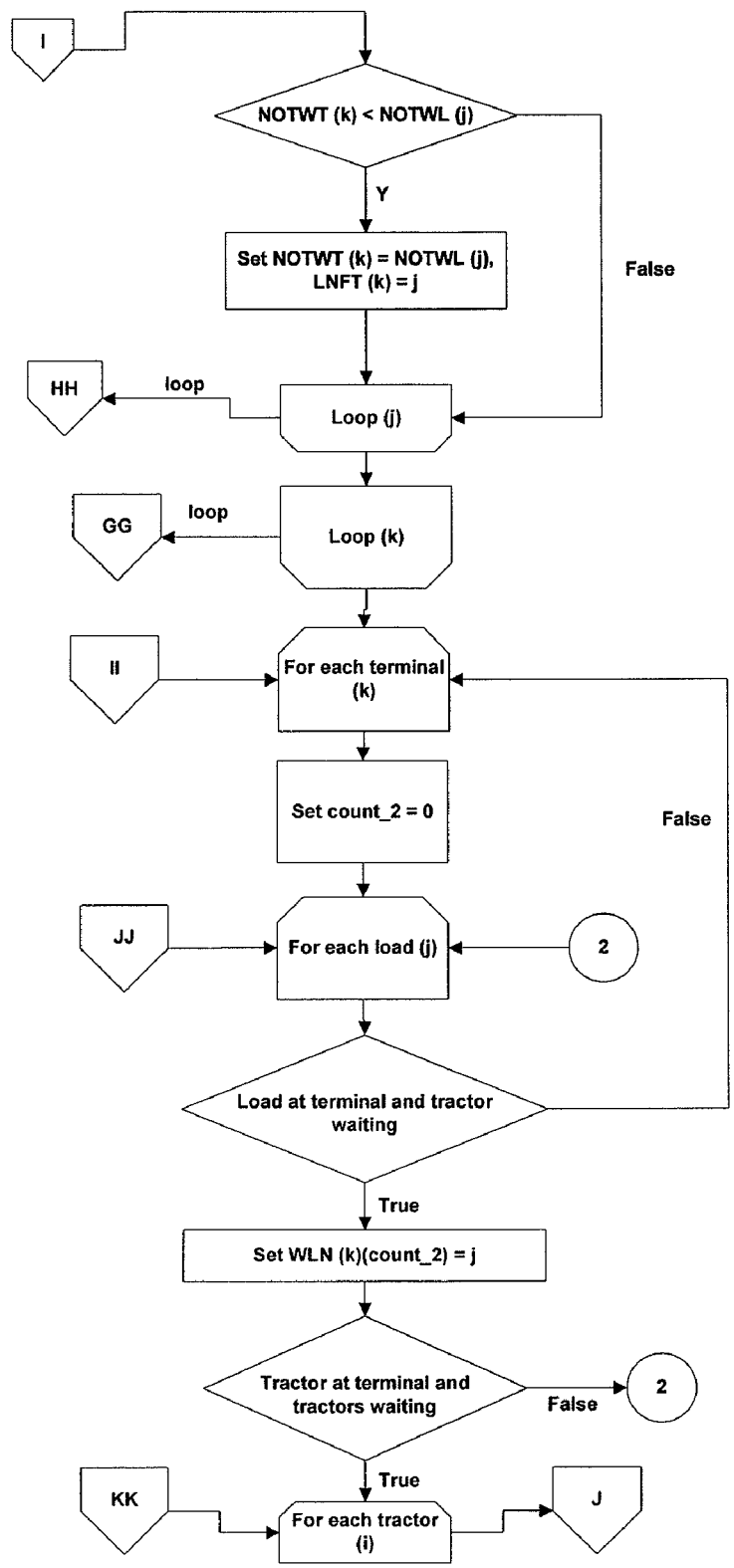
Figure 25K:
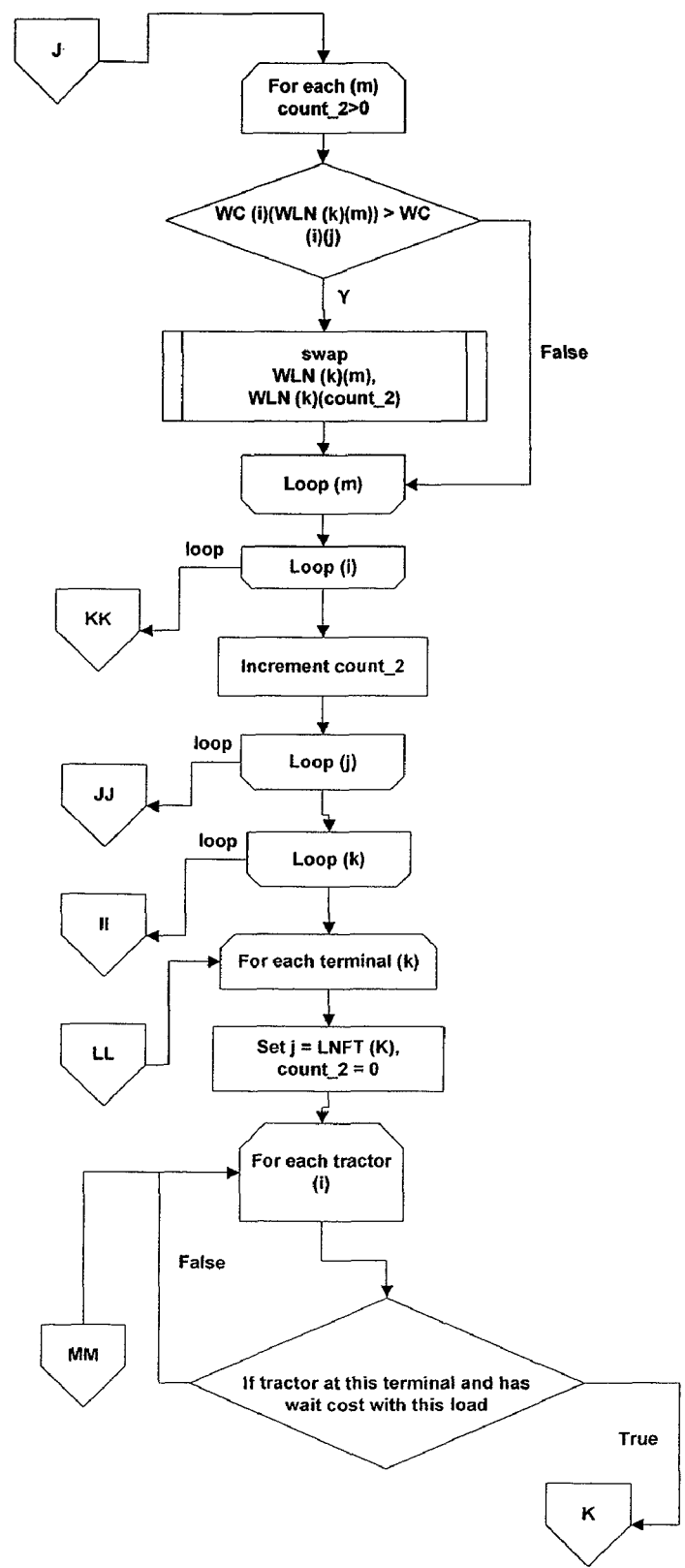
Figure 25I:
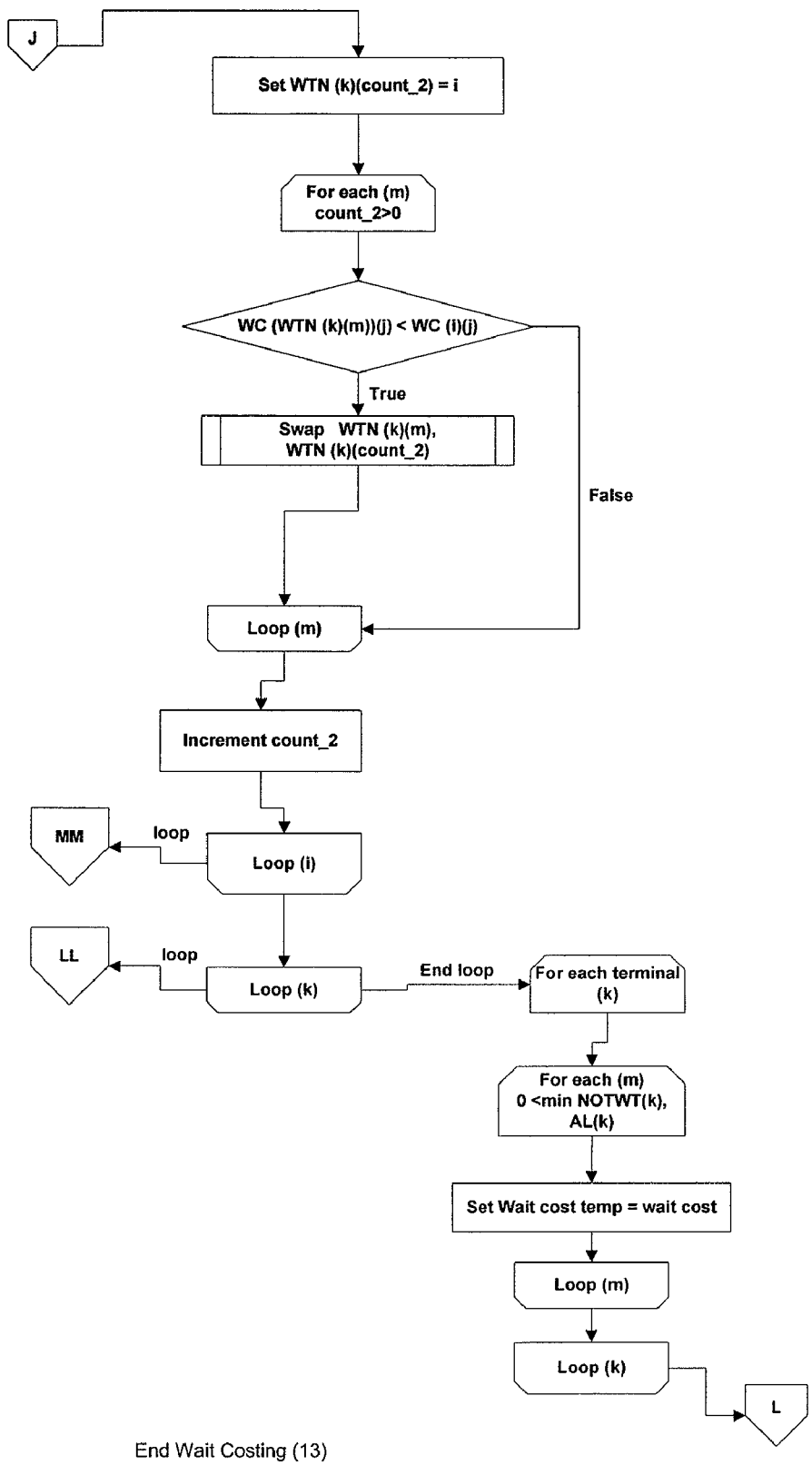
Figure 25M:
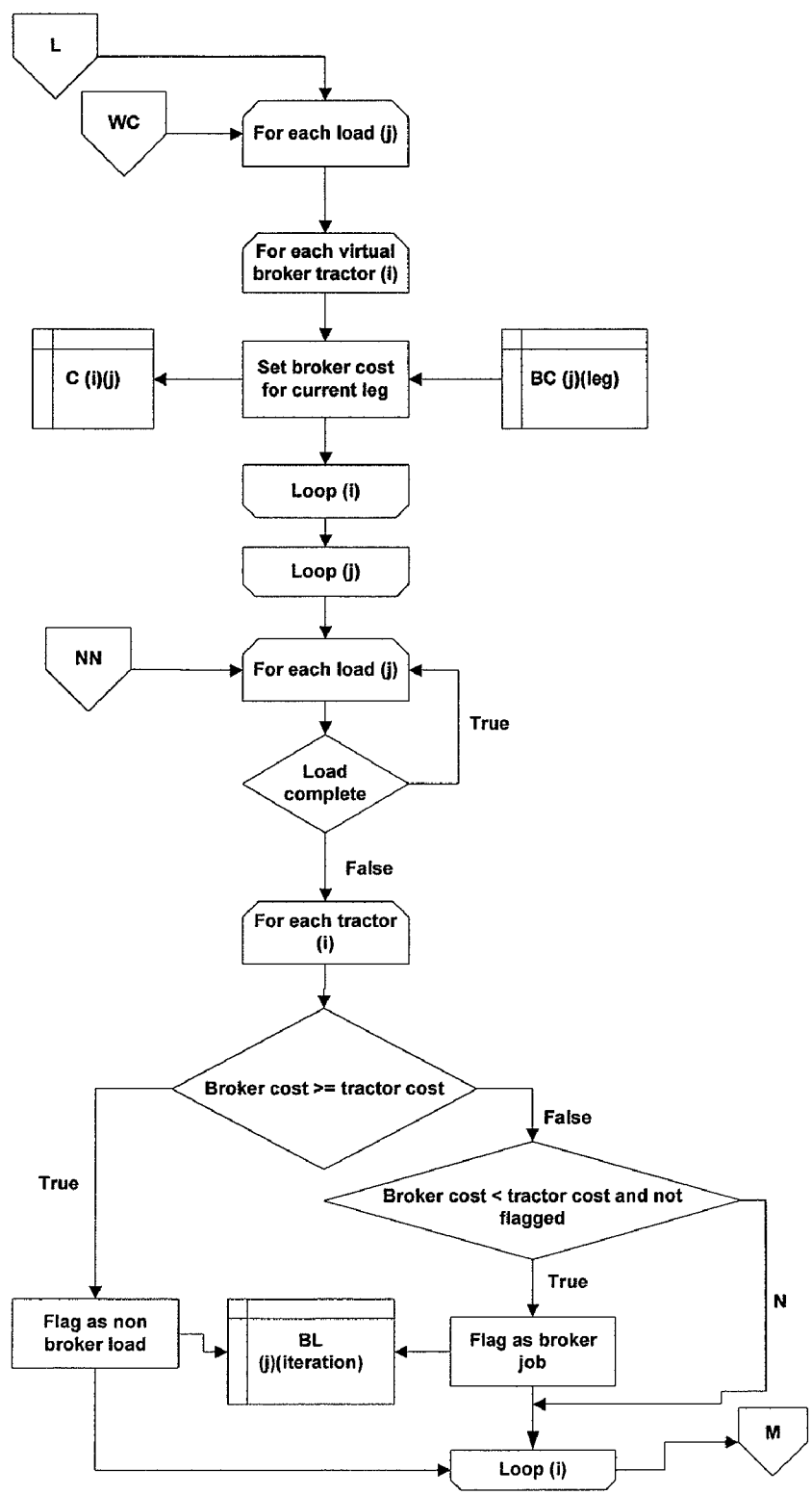
Figure 25N:
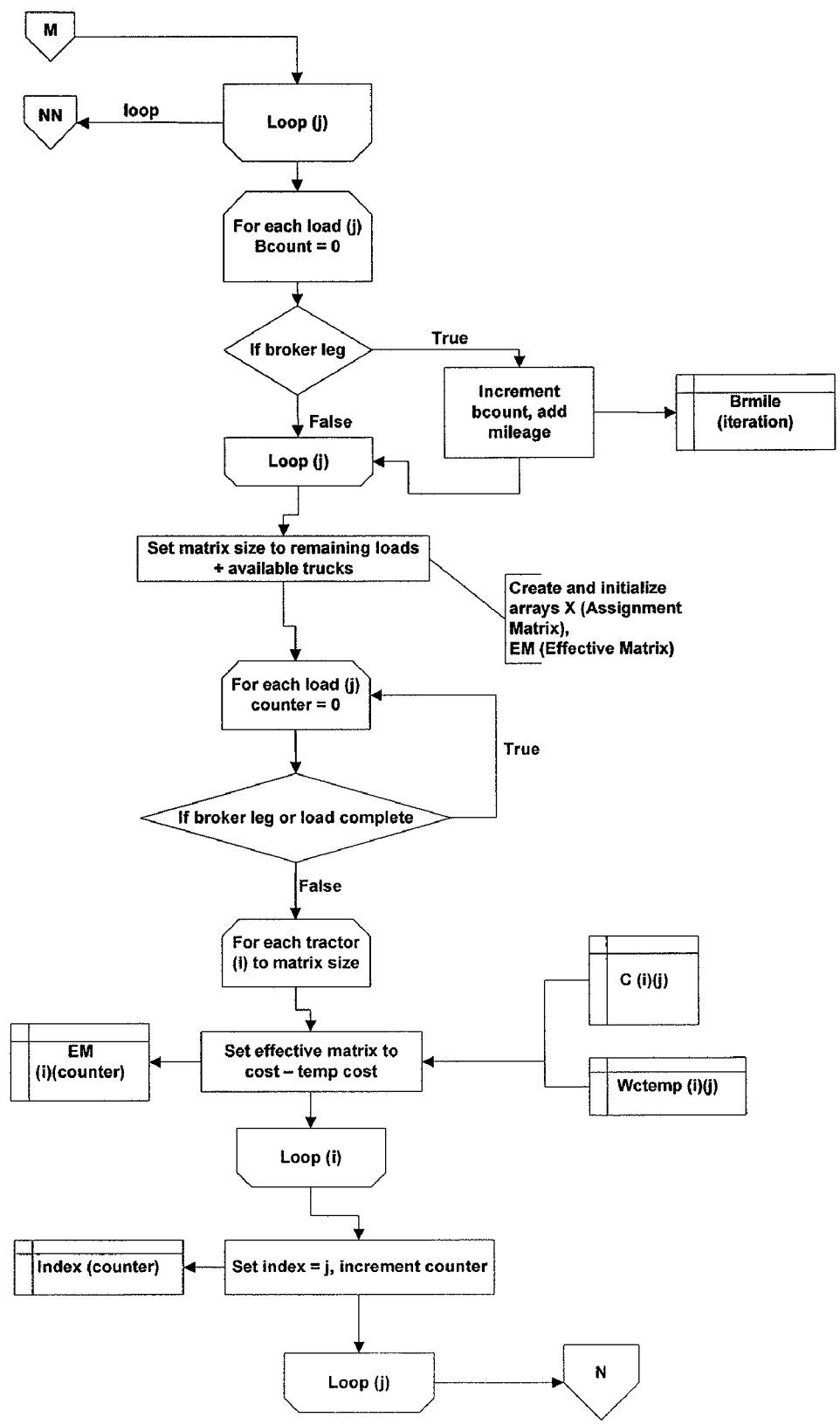
Figure 25O:
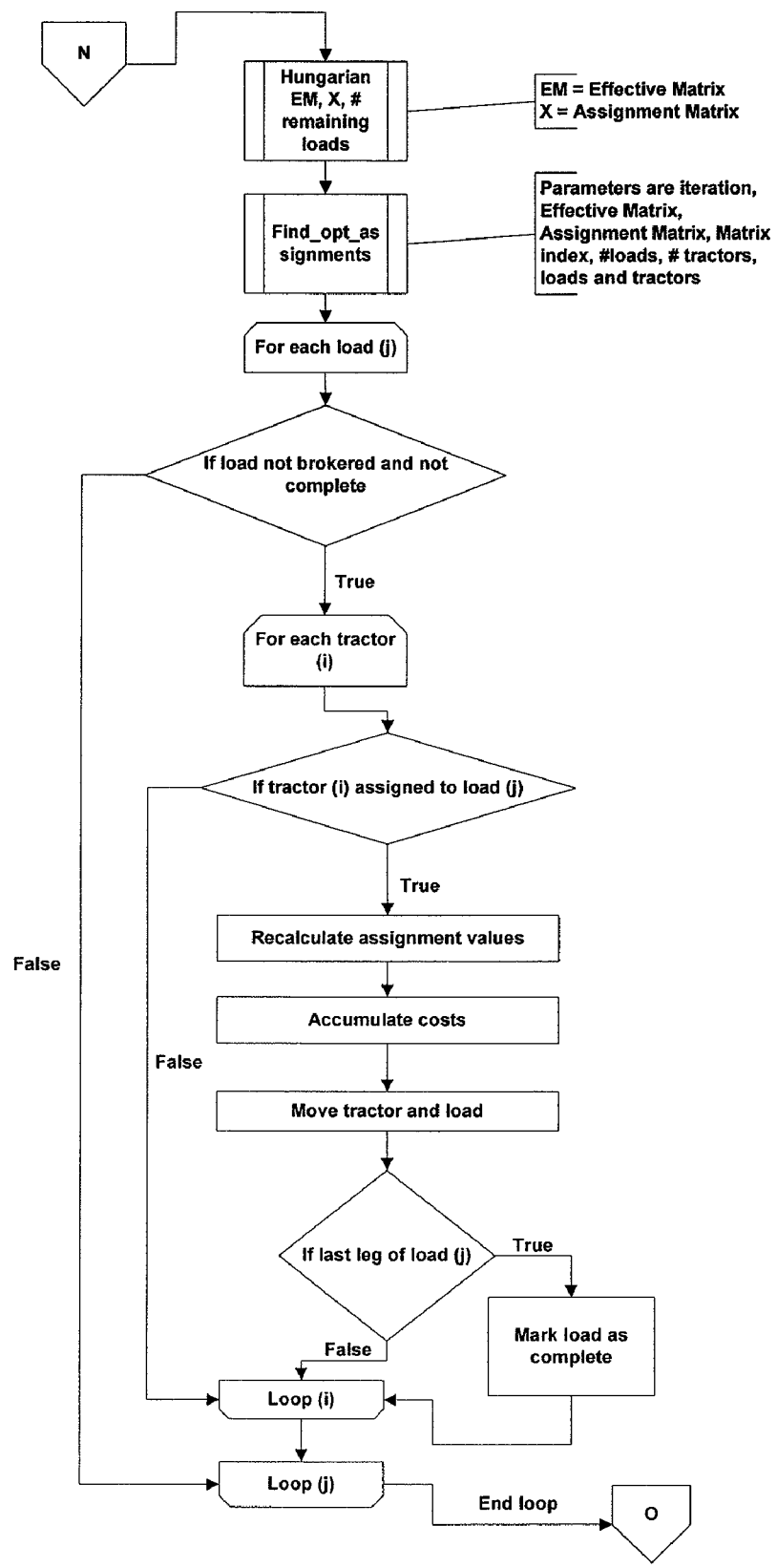
Figure 25P:
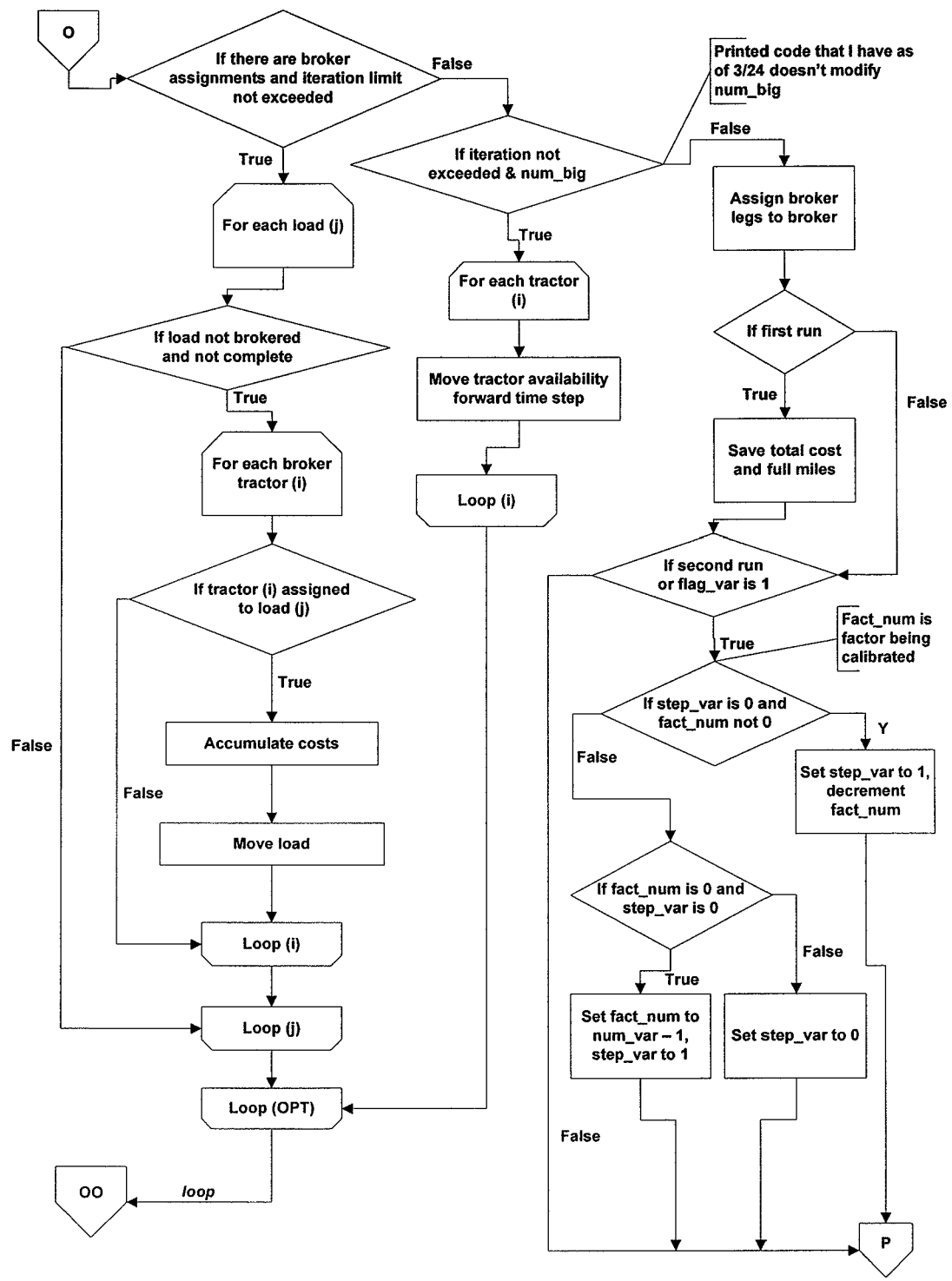
Figure 25Q:
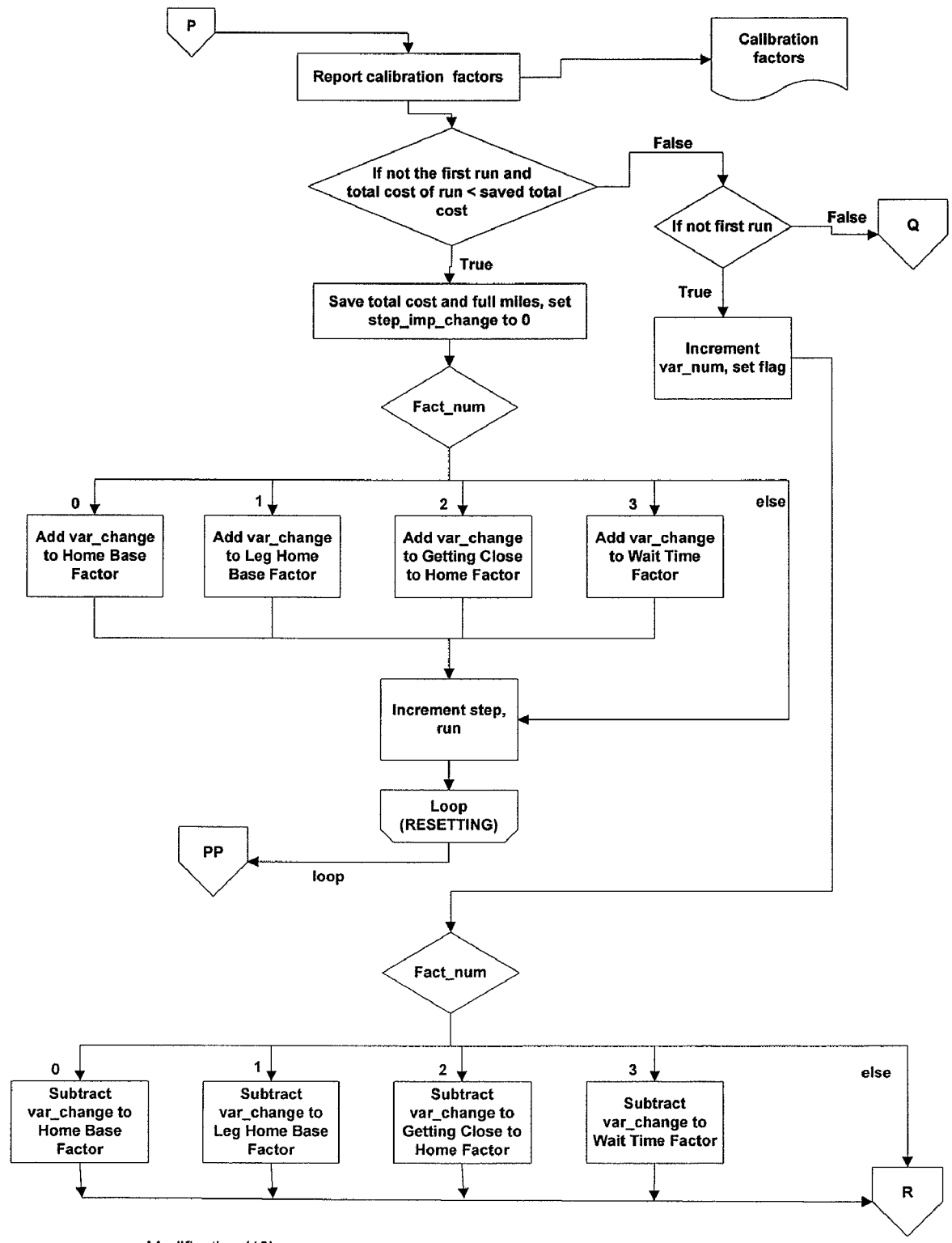
Figure 25R:
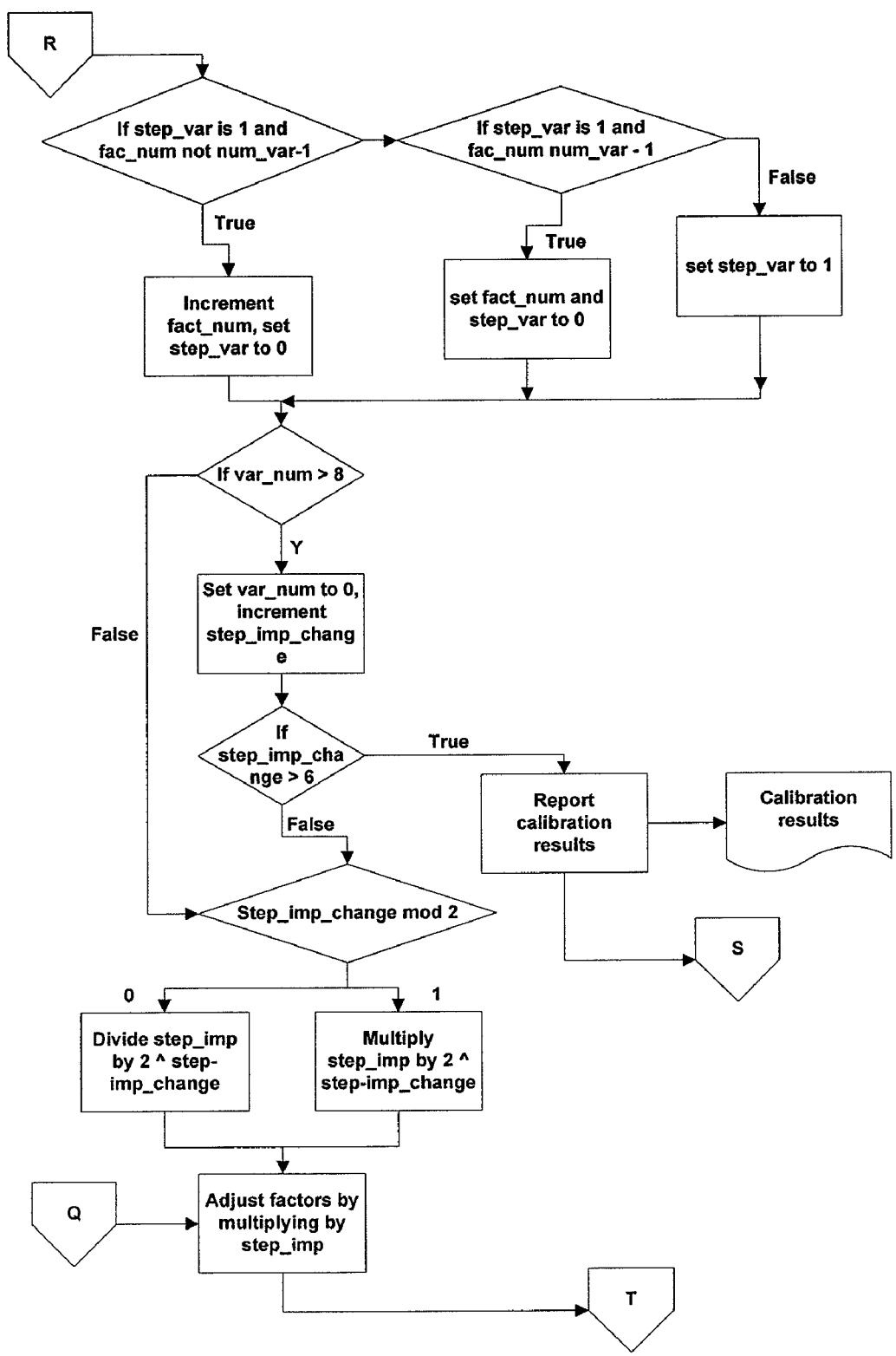
Figure 25S:
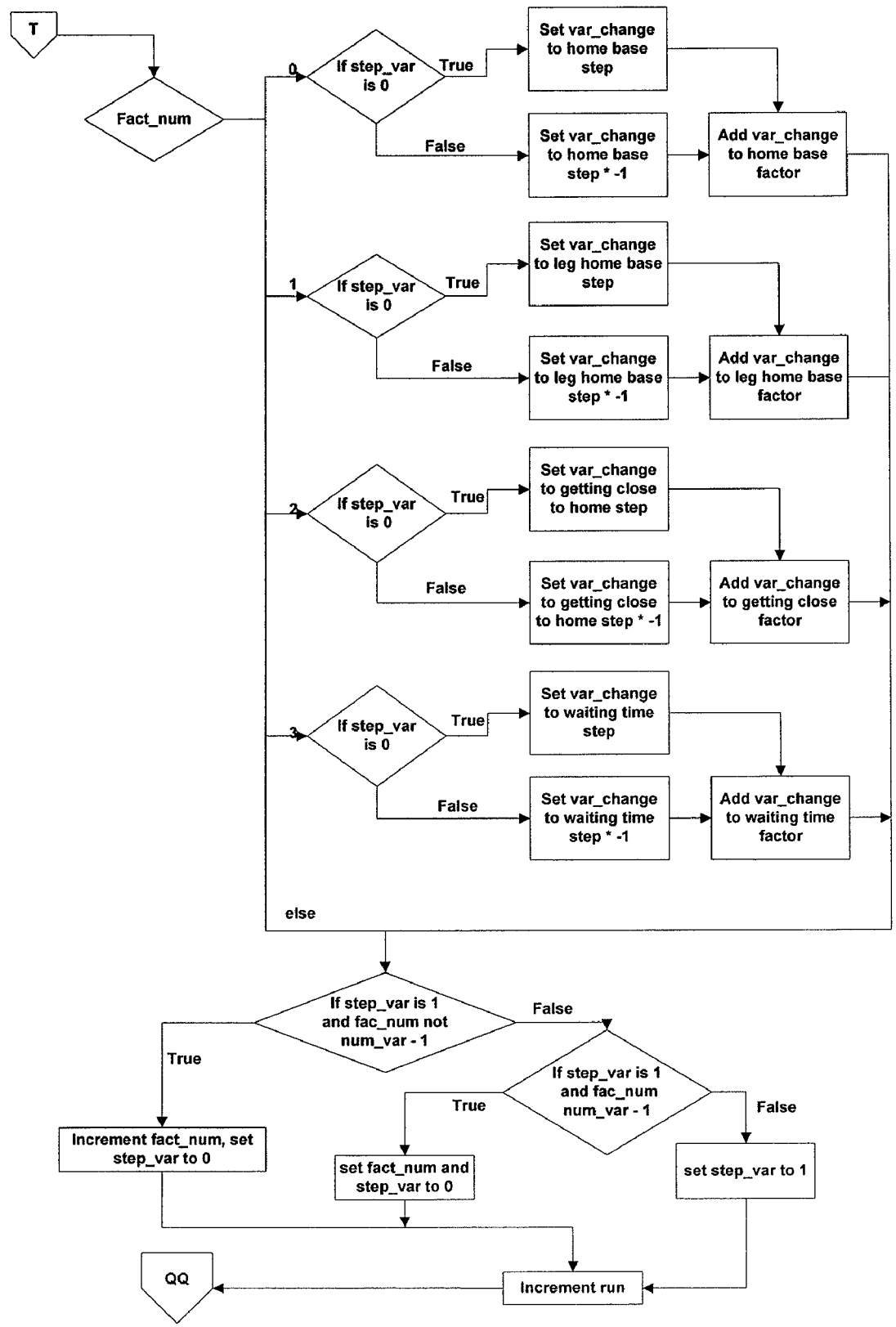
Figure 25T:
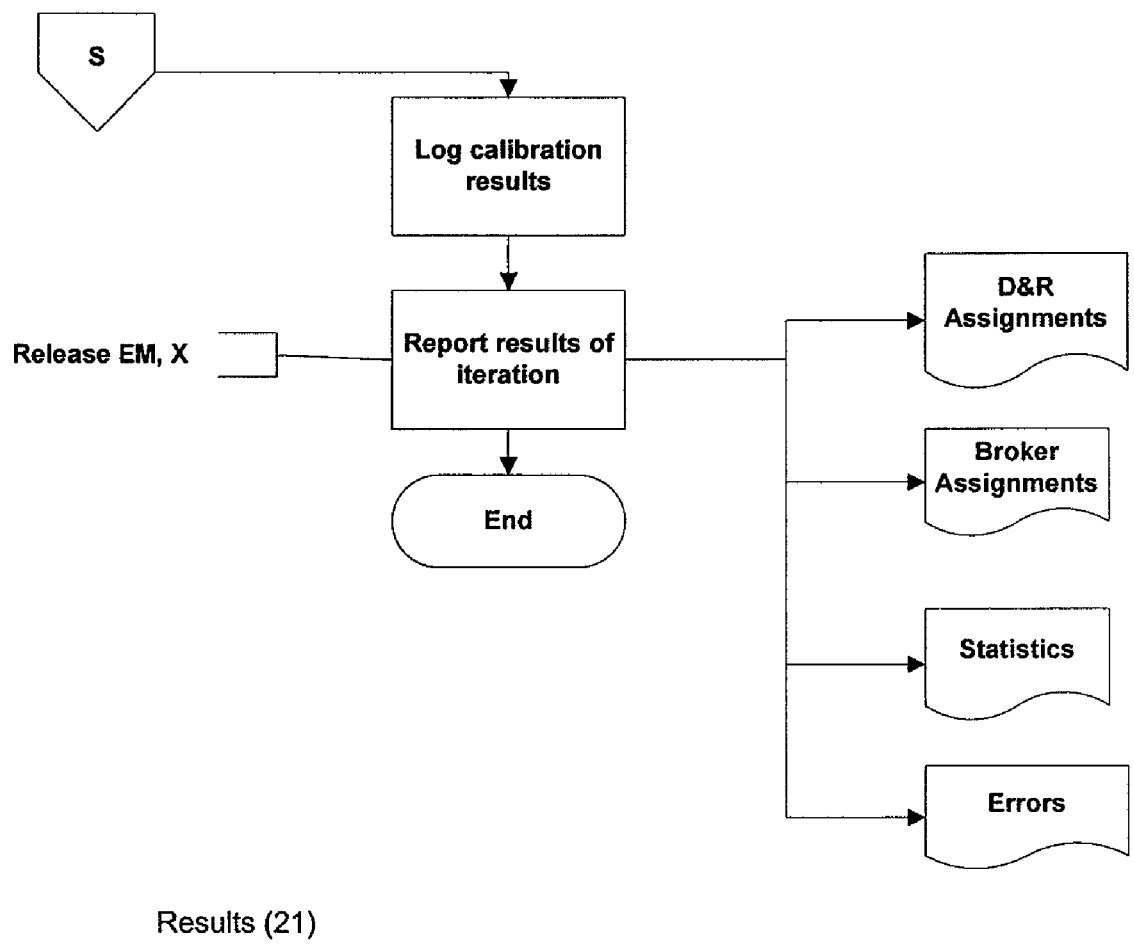

FIGS. 25q, 25r, 25s illustrate one embodiment of the modification procedure provided in accordance with the present invention.

The general steps of the modification algorithm are as follows:

(1) Run the Optimization Model with the given initial values of the coefficients.
(2) Save the operating cost for the initial run.
(3) Modify the coefficients by the current step size (a predetermined percentage change) and re-run the Optimization Model with the new coefficients.
(4) If there is an improvement (current operating cost is lower than the previous operating cost), then keep the new values of coefficients and modify the coefficients in the same direction (increase or decrease the current value of the coefficient by the current step size) until there is no improvement.
(5) If all step sizes (all values between the predetermined minimum and maximum percentage change) have been tried without any improvement, then terminate the modification process. Keep the values of the coefficients that gave the least operating cost.
(6) If all directions have been tried without any improvement, modify the step size and go to 3.
(7) If there is no improvement and all directions have not been tried, keep the previous values of coefficients and change the direction of the modification. Go to step 3.

The step size changes according to the step change, and step change is set to 0 when there is an improvement. When there is no improvement in any of the directions for a given step change, then step change is incremented by 1. Step size is determined depending on whether the step change is odd or even.

The step size starts at 5% (meaning that the coefficient will be changed by that percentage in the current direction), is decremented using the formula step size=step size/$(2^{stepchange})$ when the step change is even and incremented using the formula step size=step size*$(2^{stepchange})$ when the step change is odd. The maximum value of step change in the module is set to 6 in the Model, but this limit can be increased if more precision is required, at the cost of increased computation time. The values that step size takes in order are: 5%, 2.5%, 10%, 1.25%, 20%, 0.625%, and 40%. When there is an 100 improvement, the step size is set to 5% again. Different step sizes had to be used because the coefficients do not have a linear relationship. This implies that while a step size of 10% may not lead to an improvement, a step size of 20% might.

This modification module is used to optimize the values of HBF, LHBF, GCRF, and WTRF. It determines the weighting for these factors relative to one another while making the final decisions. The structure of this module was developed such that any number of additional coefficients can be added and their values can also be optimized.

The Optimization program had to be restructured to accommodate the modification module, because the main program is treated as a function where the objective function (determining the total operating cost) for the modification module is evaluated. The modification process is done based on the results from the function (main program). Significant changes had to be made to the main program after inclusion of the modification module, because all the information on available loads, tractors, and their related fields and variables had to be reset to the original values every time a run was made.

It was a very cumbersome and time consuming task to optimize the values of these coefficients manually by trial-and-error. At least hundreds of runs would have had to be made and the coefficients modified manually after each run. It was also very difficult to modify the coefficients in a systematic manner manually, because they are inter-related. Even if the coefficients could have been optimized manually, a potential policy change would necessitate repeating this cumbersome task from the beginning every time such a change is made.

It is clear that the process of optimizing the coefficients had to be automated. Thus the modification module was developed to address this issue. The total operating cost is highly sensitive to even very small changes in these coefficients. It can be seen that this unique module has a significant contribution to the Optimization Model by optimizing the values of the coefficients that are used in it (the Optimization Model).

Supporting Functions

The Optimization Model has several supporting modules which are implemented as functions in the program. These functions are discussed briefly in this section, and are as follows:

(1) find_time: This function is used to calculate the driving time, together with the required rest times for a single driver tractor.
(2) find_total_time: This function is used to calculate $TST_{ij}$ and $TP_{ij}$. It finds the total driving time together with the spillover effect on the driving time from the previous work time
(3) float find_work_time: This function calculates the cumulative work time since the last required rest period
(4) wait_time_cost: This function is used to determine the wait cost for a tractor
(5) hungarian_solve: This function is used to implement the Hungarian Assignment algorithm or equivalent
(6) find_opt_assignments: This function is used to implement the heuristics that were developed to determine the possible optimum combination groups.

(7) final_opt_assignments: This function is used to implement the heuristics that were developed to determine the best possible optimum solution.

Figure 29:
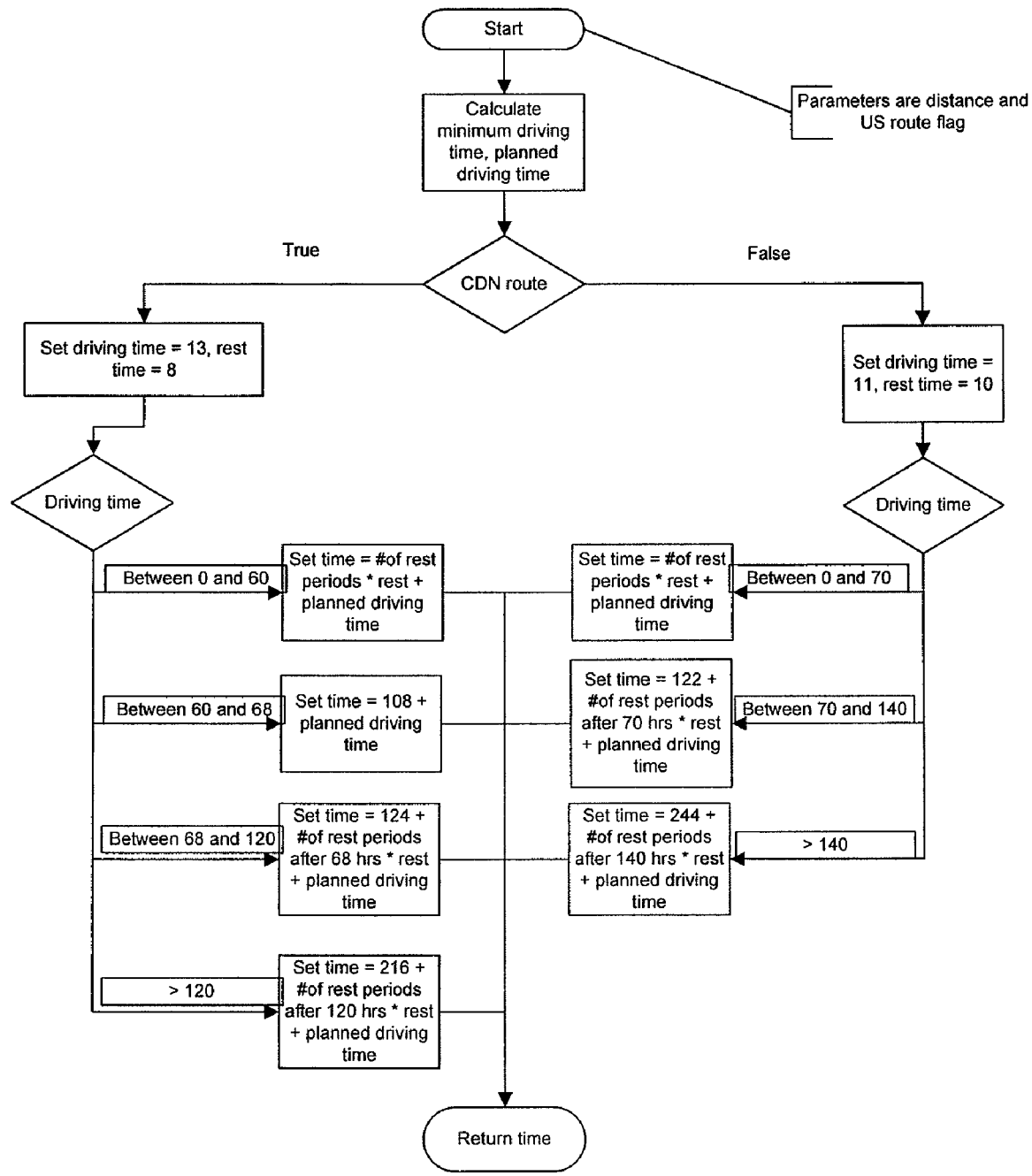
FIG. 29 illustrates a flowchart for the find_time function provided in accordance with one embodiment of the present invention.
Figure 30:
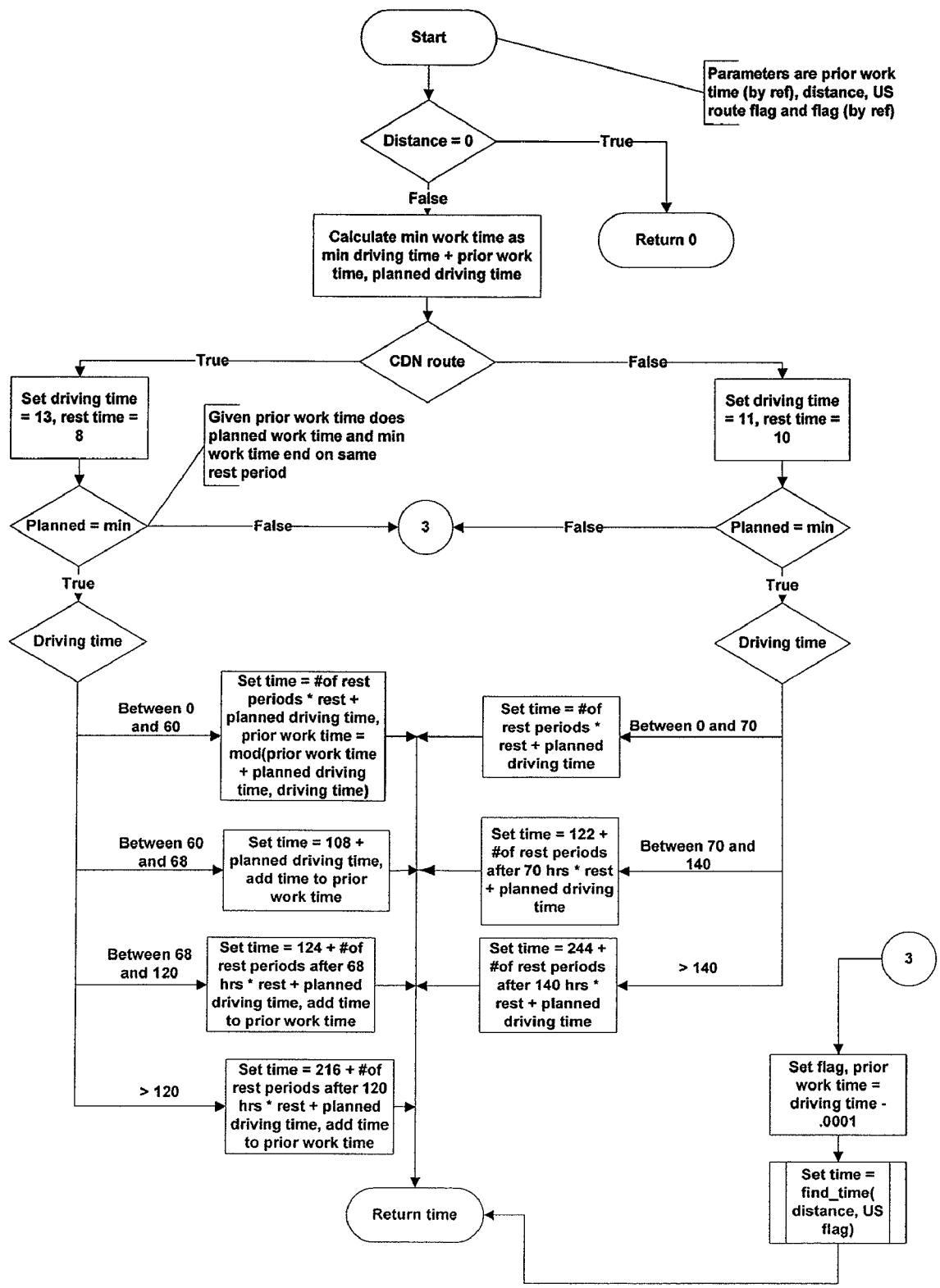
FIG. 30 illustrates a flowchart for the find_total_time function provided in accordance with one embodiment of the present invention.
Figure 31:
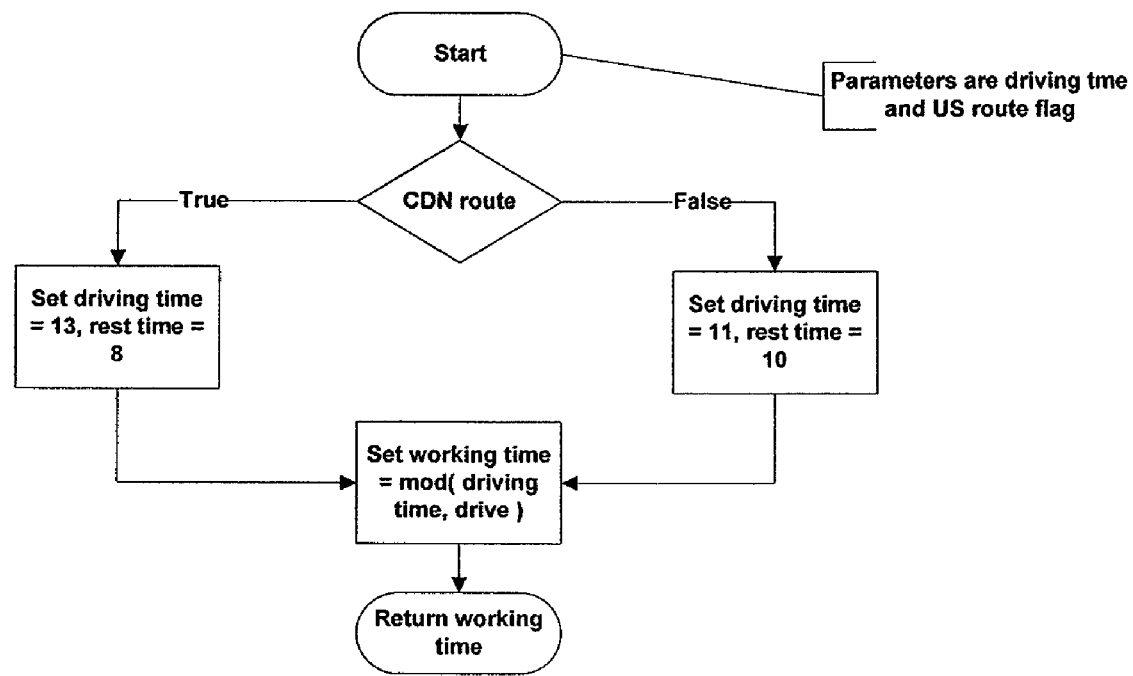
FIG. 31 illustrates a flowchart for the find_work_time function provided in accordance with one embodiment of the present invention.
Figure 32:
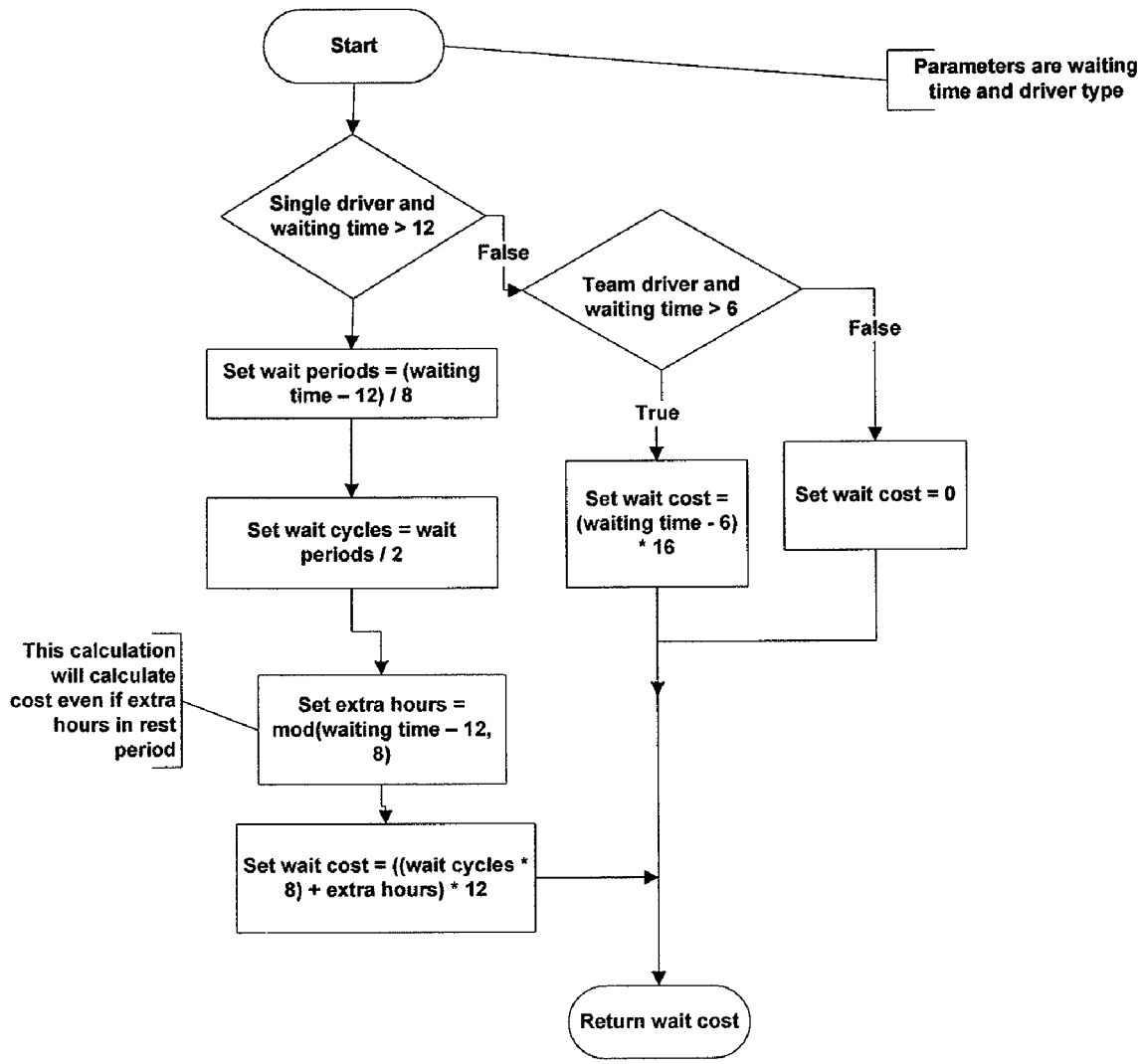
FIG. 32 illustrates a flowchart for the wait_time_cost function provided in accordance with one embodiment of the present invention.

FIG. 29 illustrates a flowchart for the find_time function provided in accordance with one embodiment of the present invention. FIG. 30 illustrates a flowchart for the find_total_time function provided in accordance with one embodiment of the present invention. FIG. 31 illustrates a flowchart for the find_work_time function provided in accordance with one embodiment of the present invention. FIG. 32 illustrates a flowchart for the wait_time_cost function provided in accordance with one embodiment of the present invention.

There are also other supporting functions that are used in the program. However the processing done in these procedures is relatively simple and thus no flowcharts are provided for the following functions:

(1) conv_time_to_float: This function is used to convert the time from the regular format to decimal format
(2) find_time_dif: This function is used to convert all available time information for the jobs and tractors to relative time.
(3) city_to_term_code: This function returns the three-letter terminal code corresponding to a city code.
(4) find_term_code: This function returns the three-letter terminal code corresponding to a terminal number.
(5) find_term_number: This function returns the terminal number that corresponds to the three-letter terminal code.
(6) char_tojul_yr: This function extracts the characters that represent the year in the Julian date from the available loads/tractors files.
(7) char_tojul_day: While reading information from the available load and tractor file, the date field is in the form "year Julian day". This function separates them into integer year and day components to store in the related structure variables for the load and tractor time fields.
(8) eff_work_time: This function is used to update the work time in cases such as when a tractor has to wait for a few hours before doing the next job.

Sensitivity Analysis

The sensitivity analysis shows the effect of the change in each of the four coefficients HBF, LHBF, GCRF, and WTRF on the total operating cost in the Optimization Model. As discussed earlier, these coefficients are used to weight the assignments to determine the best optimum solution. Since this is an iterative procedure, the outcome of one iteration has a significant impact on the iterations to follow, thus making these coefficients very sensitive to change.

Figures 15A, 15B:
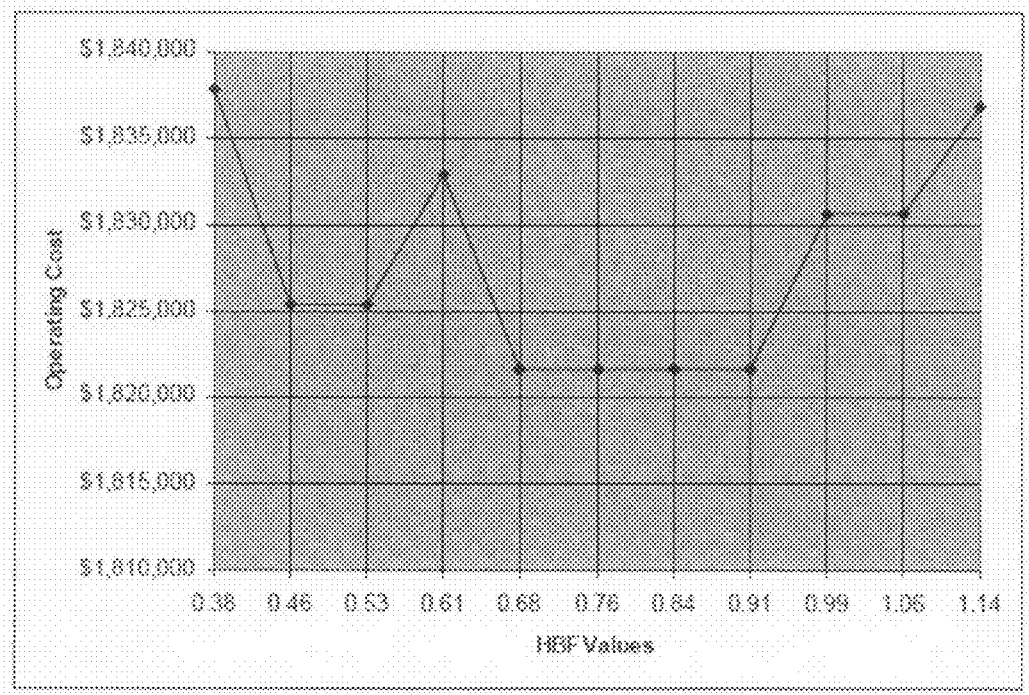
FIGS. 15a-b illustrate HBF sensitivity analysis.

FIG. 15 illustrates HBF sensitivity analysis. FIG. 15a shows the resulting change in the operating cost due to the corresponding percentage change in HBF, while all the other coefficients remain constant. The base value for HBF is 0.76, and it is changed five times in incrementing steps of 10% in both directions (positive and negative) to perform the sensitivity analysis.

FIG. 15b shows the graphical representation of this analysis. The X-axis contains the different HBF values and the Y-axis contains the corresponding change in operating cost.

Figures 16A, 16B:
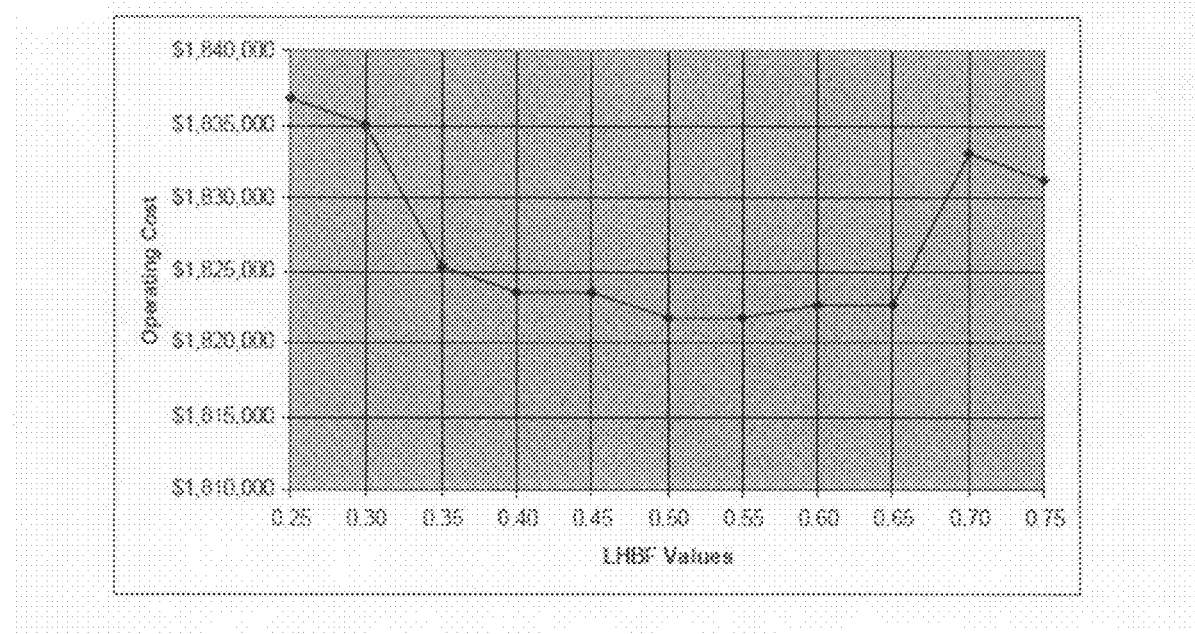
FIGS. 16a-b illustrate LHBF sensitivity analysis.

FIG. 16 illustrates LHBF sensitivity analysis. FIG. 16a shows the change in the operating cost due to the corresponding percentage change in LHBF, while all the other coefficients remain constant. The base value for LHBF is 0.5, which is changed five times in incrementing steps of 10% in both directions to perform the sensitivity analysis.

In FIG. 16b, the X-axis contains the different LHBF values and the Y-axis contains the corresponding change in operating cost. It can be seen that the LHBF coefficient is sensitive to the percentage changes made.

Figures 17A, 17B:
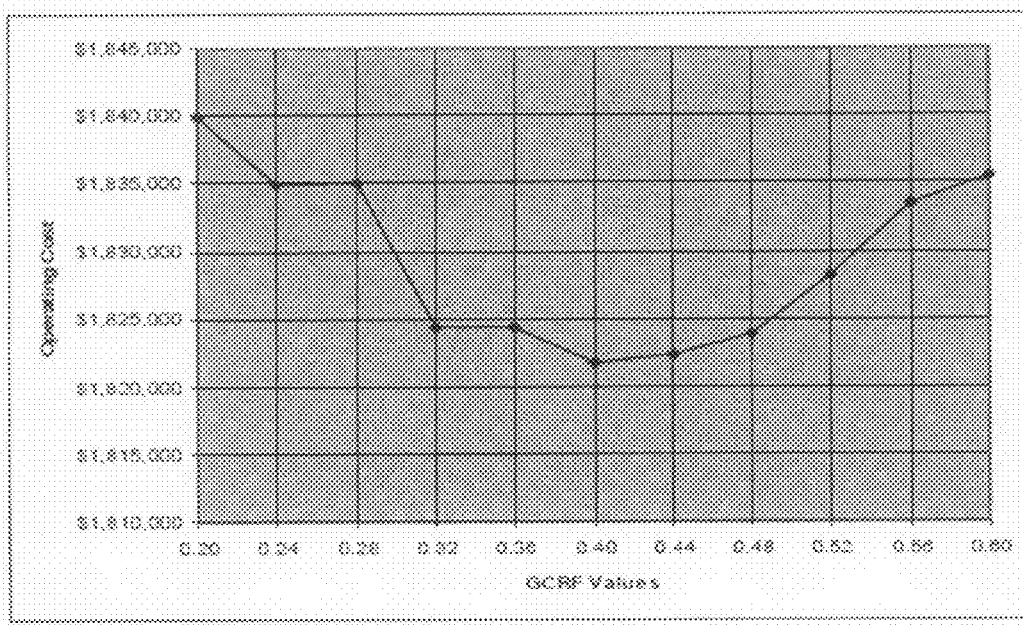
FIGS. 17a-b illustrate GCRF sensitivity analysis.

FIG. 17 illustrates GCRF sensitivity analysis. FIG. 17a presents the sensitivity analysis done for the GCRF coefficient. The base value for GCRF is 0.4, and it is changed five times in incrementing steps of 10% in both directions to determine its sensitivity to change. FIG. 17b shows the change in the operating cost for the different values of GCRF.

Figures 18A, 18B:
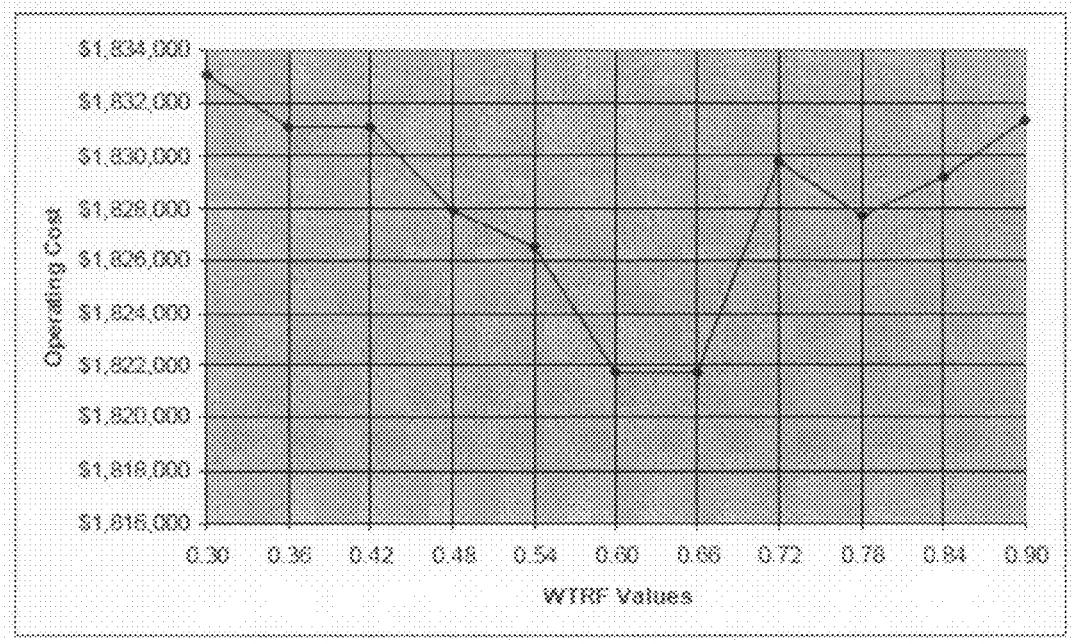
FIGS. 18a-b illustrate WTRF sensitivity analysis.

FIG. 18 illustrates WTRF sensitivity analysis. The sensitivity analysis for WTRF is shown in FIG. 18a. The base value for WTRF is 0.60, and it is changed five times in incrementing steps of 10% in both directions (while all the other coefficients remain constant) to perform the sensitivity analysis. It can be seen from FIG. 18b, that a change in WTRF has a significant impact on the operating cost.

Figures 19A, 19B:
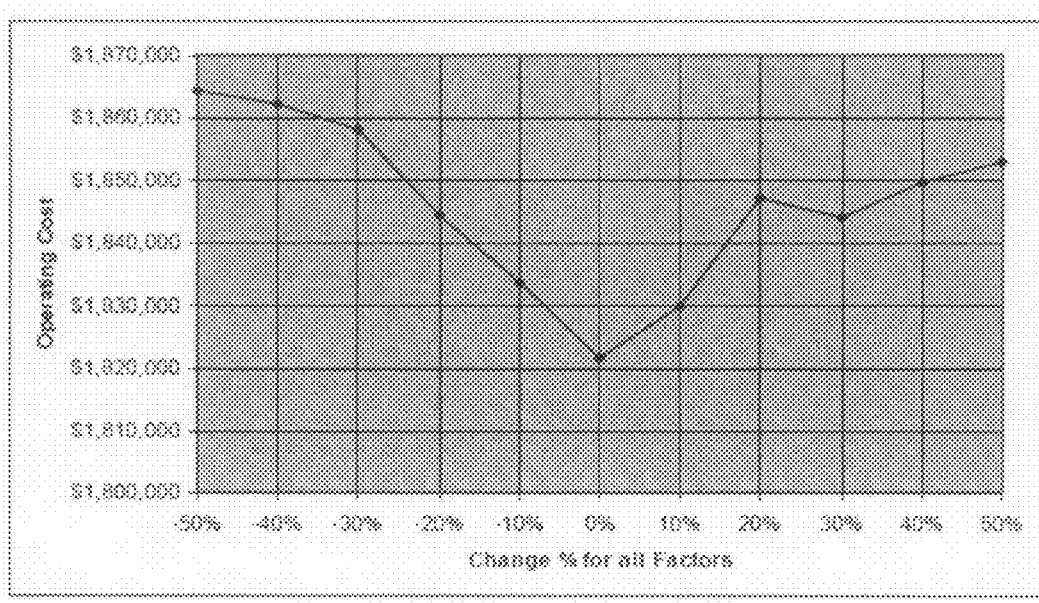
FIGS. 19a-b illustrate Sensitivity analysis by changing all factors.

FIG. 19 illustrates Sensitivity analysis by changing all factors. FIG. 19a presents the sensitivity analysis that was done by changing all the coefficients (from their base values) at the same time in incrementing steps of 10% in both directions. These coefficients are more sensitive when they are changed together and thus have a much greater impact on the total operating cost. FIG. 19b shows the graphical representation of the sensitivity analysis for all coefficients. The X-axis contains the percentage change for all the coefficients and the Y-axis contains the corresponding change in operating cost.

It can be seen from the sensitivity analyses that the operating cost is minimal for the base values of the coefficients and increases with the corresponding percentage change in the coefficients.

Non-Quantifiable Benefits

It can be seen from Table 6 that 36.2% of available tractors are at their home base terminals on average before planning, while the rest are at non-home based terminals:

|  |  | Company | Optimization | Improvement |
|---|---|---|---|---|
| Before planning | Average tractor percentage at home base | 36.2% | 36.2% | n/a |
|  | Average miles away from home base per tractor | 567 | 567 |  |
| After planning | Average tractor percentage end up at home base | 36.3% | 42.1% | 5.8% |
|  | Average miles away from home base per tractor | 563 | 453 | −19.5% |

The average distance per tractor from its home base is 567 miles. It can also be seen that the average percentage of tractors that end up at their home base after planning using the Company Model is only 36.3% (as expected), whereas it is 42.1% after planning using the Optimization Model. The average distance per tractor from its home base terminal is reduced insignificantly to 563 miles (as expected) using the Company Model, while it is reduced to 453 miles (about 20% reduction relative to before planning) using the Optimization Model. This means that there is a 5.8% improvement in the number of tractors ending up at the home base and a −19.5% improvement (19.5% reduction) in the average miles away from the home base per tractor using the Optimization Model (relative to the Company Model).

As the results show, although only 5.8% more of the tractors end up at the home base using the Optimization Model, the average miles away from home base per tractor is reduced by 19.5%. This is due to the introduction of the Getting Close Ratio concept in the Optimization Model. It can be expected that there will be further improvement once the full implementation of the Model has been completed. This is because each subsequent run will start with a better placement of tractors, thus improving the final situation.

The non-quantifiable benefits of owner-operator and driver satisfaction would also increase when the above improvements are made because more tractors (and thus drivers) end up at their home base. Additional owner-operator and driver satisfaction is achieved by incorporating the fairness factors such as preferred maximum mileage and maximum time away into the Optimization Model.

The average violation of the LOS requirements in a trucking company is approximately between 1% and 5%. The two main contributors to this violation are operational mistakes due to human errors and miscalculations by the planners while planning. Some amount of operational mistakes cannot be avoided due to the human factor, but increased customer satisfaction can be achieved because planning errors are eliminated by using the Optimization Model (as all jobs are planned according to their deadlines).

Complexity Analysis

A complexity analysis of the Optimization algorithms is presented in this section in order to show the increase in computation time when the sample size for available loads increases. The optimization is analyzed based on its three components, which are the cost calculation algorithm, the Hungarian Assignment algorithm or equivalent, and the assignment heuristics. The cost calculation algorithm is used to obtain the EM, which is used in the Hungarian Assignment algorithm or equivalent to obtain the final reduced matrix. The assignment heuristics include the heuristics used to determine the combinations of possible optimum solutions and also the heuristic used to determine the best optimum solution for final assignments.

The computation time for the optimization section of the program (excluding the input and output sections) is given in seconds in Table 7, for various sample sizes of available loads (the number of available tractors is assumed to be the same as the number of available loads):

| No. of Loads | Computation Time (in seconds) | | | |
| --- | --- | --- | --- | --- |
| | Cost Calculation | Hungarian Algorithm | Assignment Heuristics | Total |
| 99 | 0.172 | 0.875 | 0.031 | 1.078 |
| 202 | 0.657 | 16.374 | 0.094 | 17.125 |
| 277 | 1.500 | 59.109 | 0.111 | 60.766 |
| 406 | 2.591 | 390.439 | 0.531 | 393.561 |
| 505 | 5.482 | 908.969 | 0.955 | 915.531 |
| 608 | 9.796 | 1911.450 | 1.468 | 1922.920 |
| 683 | 17.687 | 3093.550 | 2.916 | 3114.450 |
| 812 | 26.778 | 5977.060 | 2.653 | 6007.830 |
| 911 | 33.717 | 9412.560 | 3.449 | 9450.200 |
| 1014 | 50.109 | 14293.700 | 5.299 | 14650.000 |
| 1113 | 63.075 | 20890.200 | 5.831 | 20960.100 |
| 1218 | 63.217 | 29965.700 | 6.293 | 30036.200 |

It should be noted that the computation time is heavily dependent on the RAM available in the computer and also the processor speed. The timings presented in this section are from runs that were made on a computer that uses an Intel Xeon 3.06 GHz processor, with 2 gigabytes of RAM.

The complexity analysis for the three components showing the change in computation time in relation to an increase in the number of available loads, as well as for the entire optimization, is also presented in this section. The data points are represented by the "*" and the curve that fits this data is represented by a solid line (power line).

Figure 20:
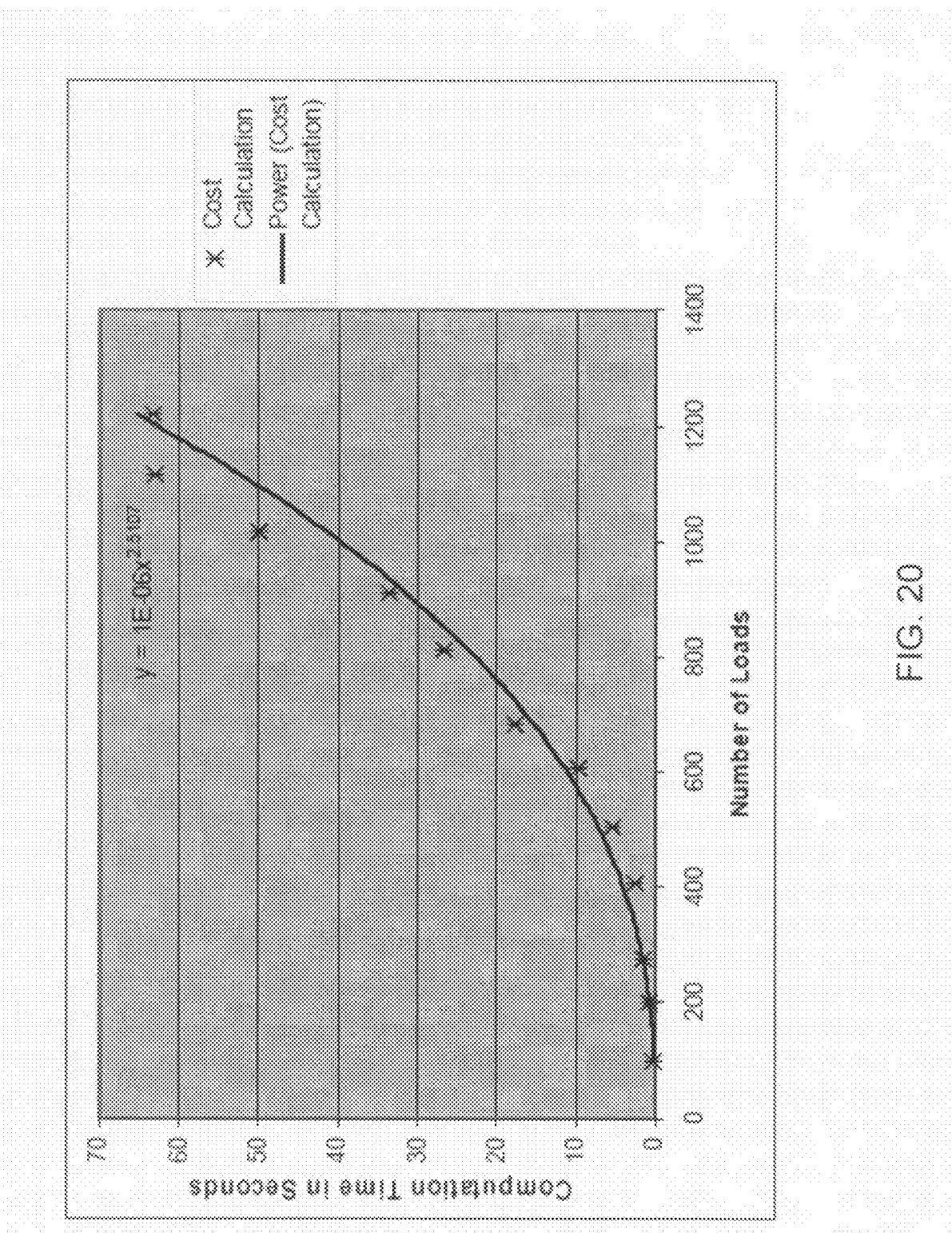
FIG. 20 shows the complexity analysis of the computation time for the cost calculation algorithm in relation to an increase in the number of available loads.

FIG. 20 shows the complexity analysis of the computation time for the cost calculation algorithm in relation to an increase in the number of available loads. It can be seen that the computation time for this section of Optimization increases by a power of 2.5107 in terms of the number of loads. The curve has not been fitted perfectly, because the cost calculation algorithm also includes heuristics which eliminate the cost calculation for infeasible cases.

Figure 21:
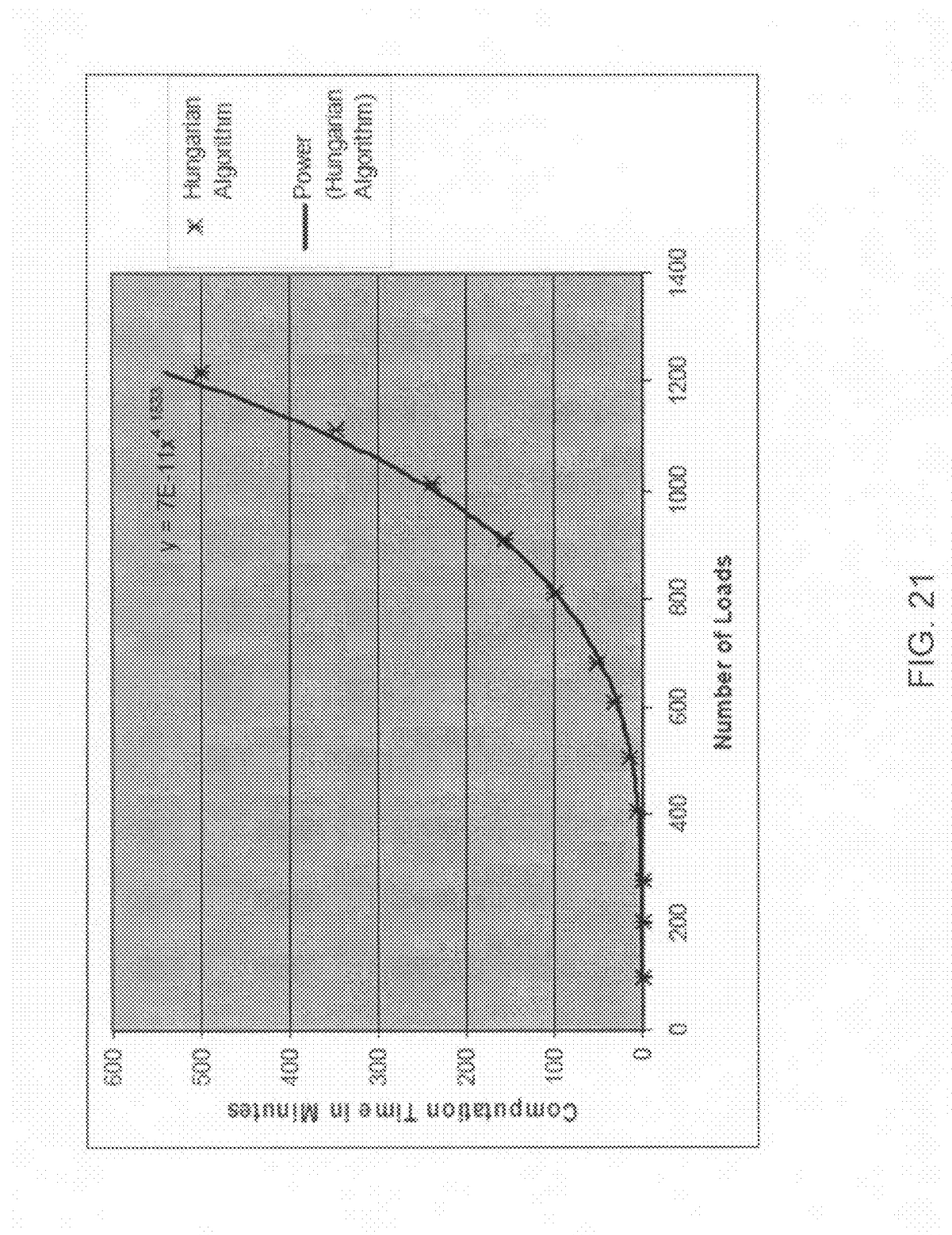
FIG. 21 shows the complexity analysis of the computation time for the revised Hungarian Assignment algorithm or equivalent in relation to an increase in the number of available loads.

FIG. 21 shows the complexity analysis of the computation time for the Hungarian Assignment algorithm or equivalent in relation to an increase in the number of available loads. It can be seen that the computation time for the Hungarian Assignment algorithm or equivalent increases by a power of 4.1833 in terms of the number of loads. It should be noted that this is the most time consuming component amongst the Optimization algorithms, where approximately 99% of the computation time is spent.

Figure 22:
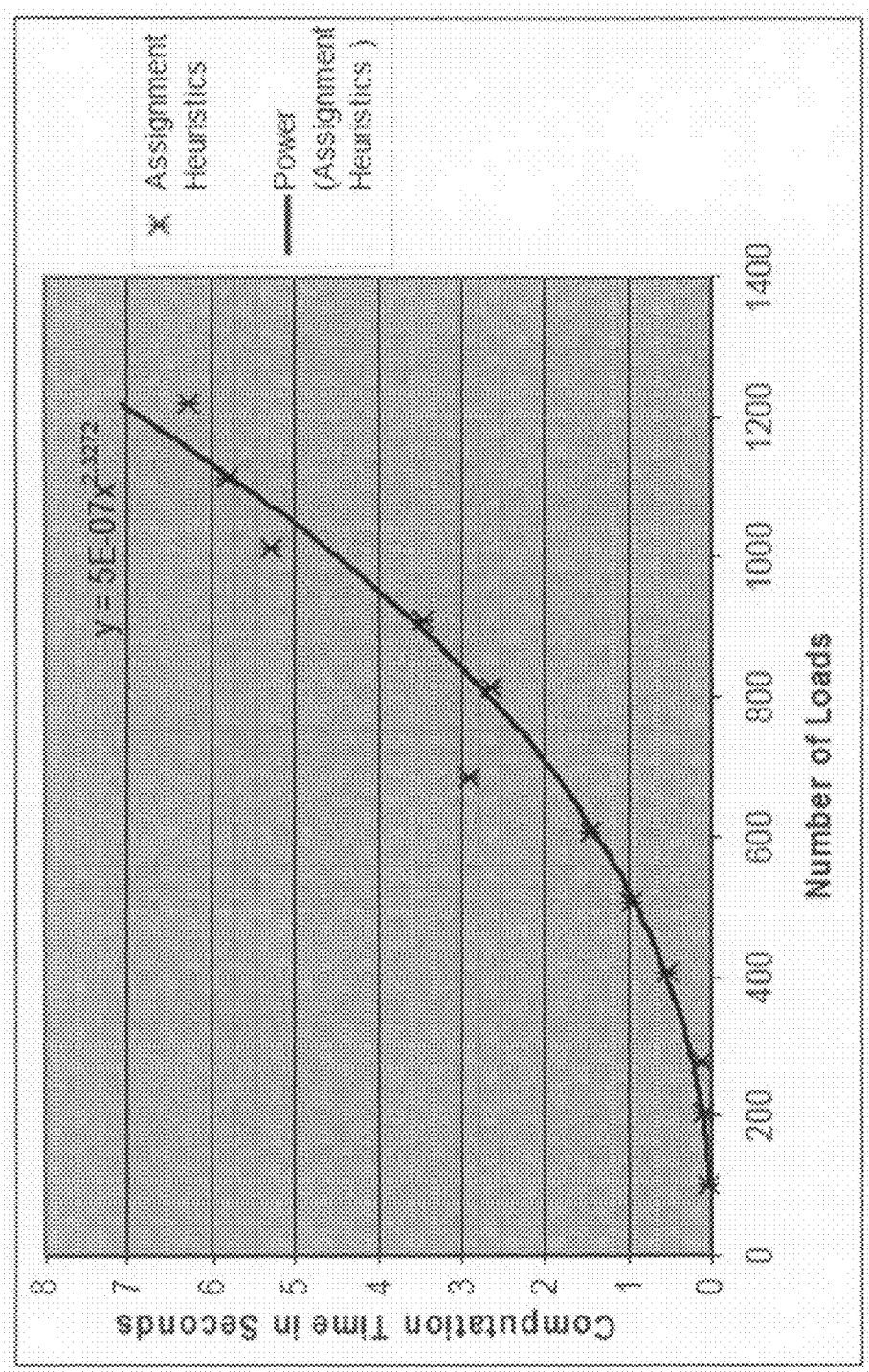
FIG. 22 shows the complexity analysis of the computation time for the assignment heuristics in relation to an increase in the number of available loads.

FIG. 22 shows the complexity analysis of the computation time for the assignment heuristics in relation to an increase in the number of available loads. The computation time for the assignment heuristics increases by a power of 2.3272 in terms of the number of loads. The computation time includes the time taken to find the possible optimum solution combinations and also to determine the best optimum solution for final assignments. The curve has not been fitted perfectly as expected due to computation time dependence on data values as well as the data size.

Figure 23:
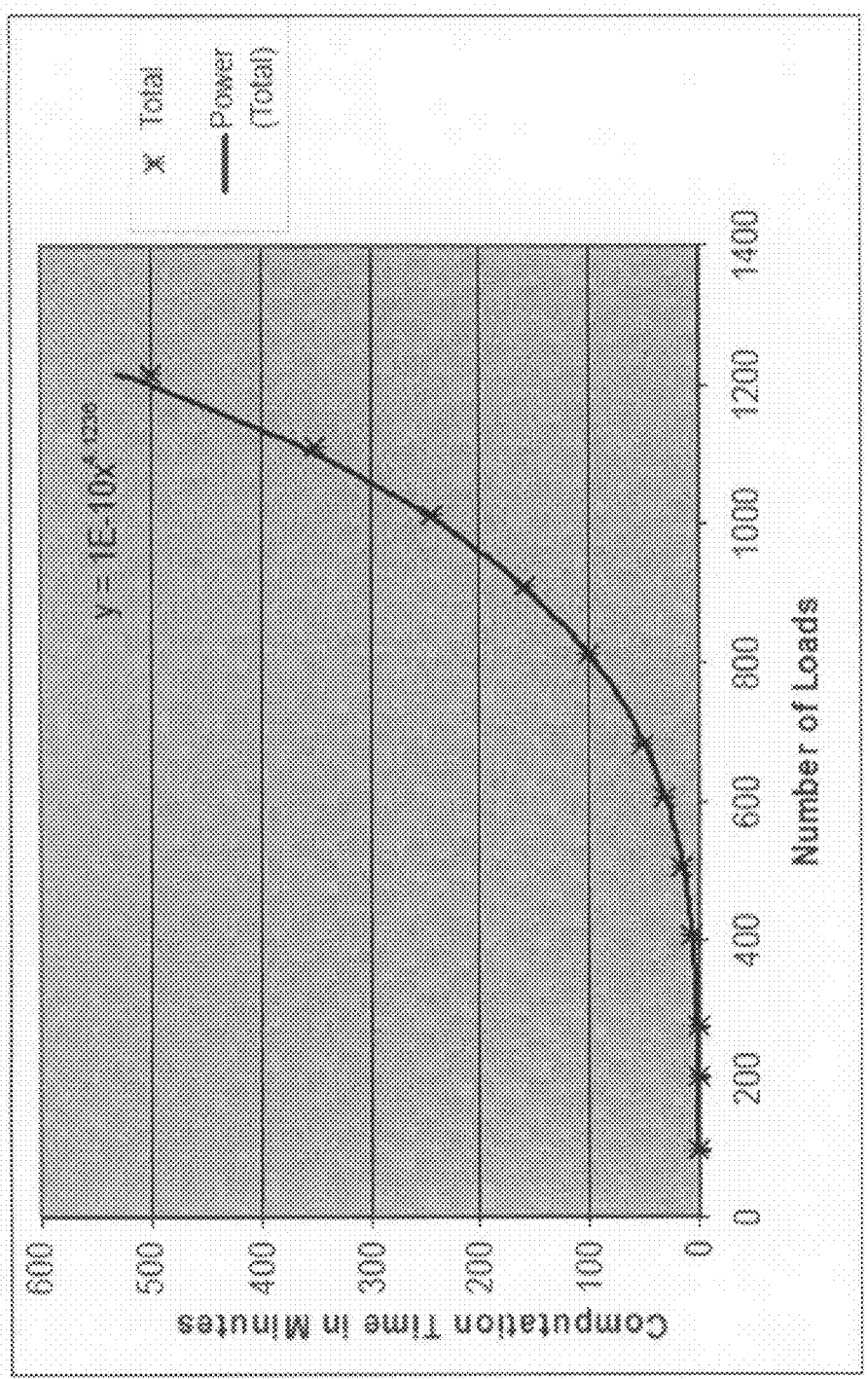
FIG. 23 shows the complexity analysis of the total computation time for the Optimization section in relation to an increase in the number of available loads.

FIG. 23 shows the complexity analysis of the total computation time for the Optimization section in relation to an increase in the number of available loads. It can be seen that the computation time for the Optimization increases by a power of 4.1236 in terms of the number of loads. This means that when the number of loads is doubled, the computation time increases approximately by a factor of 17. The number of available loads is usually about 500 for one example company, where the optimization takes approximately 15 minutes.

Example Results

The operational data obtained from an example company for the year 2005 showed that their annual linehaul operational cost was approximately $133.88M (million). Analysis revealed that the maximum possible efficiency gain for the company linehaul operating cost in 2005 is 9.2% (±0.3%). This cannot be achieved in practice due to the nature of linehaul transportation operations, as the assumption to achieve maximum possible efficiency gain was having no empty miles, broker miles, and wait cost.

Quantitative validation of the company model was done by using the t-Test and this showed that the company model and manual planning are not statistically different from each other in terms of the operating cost as well as full miles, empty miles, broker miles, and wait cost. The ratios of each of the operating cost, full miles, empty miles, broker miles, and wait cost to the loaded miles were used in the t-Test for the statistical analysis since they describe the characteristics of the linehaul operations. These characteristics are the total operating cost for one loaded mile, the full mile for one loaded mile, the empty mile for one loaded mile, the broker mile for one loaded mile, and the wait cost for one loaded mile, respectively.

Efficiency improvements were quantified by using thirty datasets of available tractors and loads from September 2005 to March 2006 by comparing the company model results to the Optimization Model results. The efficiency gains in full miles, empty miles, broker miles, wait cost, and total operating cost were quantified as savings relative to the company model values. Savings is the difference between the company model values and Optimization Model values.

The average efficiency gains for full miles, empty miles, broker miles, wait cost, and operating cost were found to be −3.62%, 52.61%, 51.71%, 52.33%, and 4.82%, respectively. If the Optimization Model had been used in 2005, the corresponding projected lowest, average, and highest savings are approximately $6.18M, $6.45M, and $6.71M, respectively.

While the maximum possible efficiency gain is shown to be 9.2% assuming ideal conditions, the average efficiency gain with the Optimization Model is 4.82%. This suggests that the Optimization Model produces a result within 5% of the maximum possible global optimum. It is estimated that the Optimization Model produces a result within 2% to 3% of the real global optimum, since ideal conditions can never be achieved realistically.

Anticipated Operational Improvements

Some operational improvements are anticipated which could improve the overall operational efficiency are addressed, in addition to linehaul planning and scheduling. The areas for potential improvements are identified as follows:

(1) Equivalent cubic measurement,
(2) Trailer stripping and loading procedure, and
(3) General operational suggestions.

Dock managers currently evaluate the line haul trailer efficiency by predicting the volume of the trailer used (trailer utilization) before the trailer is sealed. This subjective method is prone to be inaccurate due to possible miscalculations or misleading benefits (operations managers might want a higher record of trailer utilization). The other method used to calculate the trailer utilization is to sum the weights of all the individual shipments. However, because the trailer generally cubes out before it weighs out, this method is also ineffective in predicting the trailer utilization.

In the current pricing policy the Equivalent Cubic Measurement is calculated assuming that 85% of the trailer can be filled. Since all dimensions and equivalent cube of individual shipments are known, it is possible to integrate this Equivalent Cubic Measure to evaluate trailer utilization and automate this process. At least 100% utilization should be achieved using this method and maybe more if there are shipments that are priced based on their weight. The main advantage of this method is its accuracy and independence from human subjectivity and that it can also be used as a verification tool for the pricing policy. It is recommended that transportation companies adopt this type of objective method to evaluate their trailer utilization.

Fork lifters, dock managers, and operations managers have certain objectives and priorities while executing their part of the trailer stripping and loading operation. It is clear that each party wishes to optimize their part of the operation, which is not necessarily the optimum for the whole operation. In order to optimize the overall operations, it is necessary to make operational decisions that need not necessarily be best for a single part of the operation. Determining a set of working procedures would significantly benefit the overall operational efficiency. The procedures can include how to make decisions with respect to cross-docking, configuration of gates in terminals, and mixing loads (weighed out and cubed out trailers).

Cross-docking would be very beneficial for short line haul and pickup and delivery operations in particular, but for long linehaul trailers cross-docking would increase the operating cost. Therefore it is recommended that for long linehaul trailers, the individual LTL shipments should be placed on the dock close to the trailer and the trailer should be loaded beginning with the pieces that would use as much volume as possible in the trailer. Optimization of the assignment of gates to trailers would reduce the conflicting forklift traffic on the dock and would also reduce the distance traveled by forklifts, which can improve the terminal's operational efficiency significantly.

Since there are significantly more trailers that cube out before they weigh out, there is a great opportunity to mix the weighed out trailers with the cubed out trailers to further utilize the shipping capacity. Even if there is another cubed out trailer going to the same destination at the smaller terminals mixing loads could be an option most of the time at larger terminals.

Some of the general operational suggestions will be outlined in the rest of this section. When there are two trailers with similar time windows, giving priority to the trailer with the most LTL shipments (since more customers are being served) would make the overall operation steadier and robust in the long run. However, when there is a trailer with a more sensitive time window, then the priority should be given to that trailer.

The trip is generally started once the tractors and loads are both available, which may result in increased wait time. This particular case can be prevented by starting the trip at an optimum time such that when tractors arrive at their destination there will be loads available for them to pick up, especially when their time windows permit this arrangement, which would result in decreased or no wait time.

The transportation companies would benefit from having a good IS to keep track of all required information for planning and operational analysis. It would also make it easier to integrate such an IS with the Optimization system, since data transfer for input from the IS and output from the Optimization system can be achieved easily. Using a common IS throughout all the carrier's operations would ensure compatibility between the various types of operations and increase their functionality, while being more cost effective by sharing resources.

Implementation

The implementation of the Integrated Optimization System requires certain pre-implementation measures to be taken. These are discussed along with some general implementation suggestions in this section.

The parameters for contributors to the operating cost such as the cost per US mile, cost per Canadian mile, empty mile ratio, wait cost, and cost per broker mile should be modified in the Optimization Model by considering subsidized fuel price when the costing scheme for the company changes for any of the contributors.

As with any IS system, the quality of the output from the model is almost completely dependent on the input that is fed into it. The input data should have all the attributes required to reflect the actual operational situation. Although the data pre-processing and validation module makes sure that the number of errors in the input data is minimized, the core input data itself needs to be kept track of in a consistent manner. Such data includes the current time away, estimated time of availability and work time for the available tractors, the release times for loads along with their delivery times and the number of LTLs. It should also be ensured that at any given point in time, all available tractors must be present in the system and their status read as "available". Once the data is recorded in such a manner and rigorous testing has been performed with this data, the next step would be to create the required user-interface to integrate the model into the existing setup at a company.

Having fair and preferred maximum mileage and maximum time away for the tractors would result in savings that cannot be quantified, but that could improve owner operator retention considerably.

It is not intended that the integrated optimized system be used as a stand-alone tool that will make all the operational decisions without human intervention. While the main strength of the system lies in its ability to perform calculations that are too complex to be done manually, it also necessitates educating the planners and dispatchers to interpret the output of the model in the right manner. A proper understanding of this output will enable them to make more efficient decisions based on it. For instance if a job is assigned to a broker by the Optimization system, the planners can intervene to check if this job can be done by a company shunt or P & D tractor instead.

The suggested final implementation of the Optimization system is discussed in the following section. The input to the Model is obtained directly from the IS (such as for example AS/400 for a particular company) and the processing is performed. The output is fed back to the IS as a pre-plan, which the planners can view on their dispatch screens. Once the assignments of jobs to tractors are confirmed by the planners, the respective tractor drivers are informed via the satellite communication systems provided.

Testing of the integrated system with the IS at a company to be done in parallel to manual planning, due to the nature of the transportation operations. Typically, P& D operations are done only during business days whereas linehaul operations are done on the weekends and holidays as well. Use of the integrated system to make daily operational decisions should commence only when all testing and interfaces for integration have been satisfactorily completed.

REFERENCES

The following publications are included herein by reference:

[1] Arunapuram, S., Mathur, K., and Solow, D., 2003. Vehicle routing and scheduling with full truckloads. Transportation Science, 37: 170-182;
[2] Atallah, M. (Ed.), (1999). Algorithms and Theory of Computation Handbook. CRC Press, Boca Raton, pp. 7-21;
[3] Barnhart, C., 2004. Airline Schedule Optimization: From Algorithms to Models to Problem Definition Presentation, Spring School, Montreal;
[4] Barnhart, C., Cohn, A. M., Johnson, E. L., Klabjan, D., Nemhauser, G. L, and Vance, P. H. 2002. Airline crew scheduling. Handbook of Transportation Science (2nd Edition). Randolph W. Hall (editor). Kluwer Academic Publishers, Norwell, M A;
[5] Barnhart, C., Hane, C., Johnson, E., and Sigismondi, G. 1995. A column generation and partitioning approach for multi-commodity flow problems. Telecommunication Systems, 3: 239-258;
[6] Barnhart, C., Hane, C. A., and Vance, P. H. 2000. Using branch-and-price-and-cut to solve origin-destination integer multicommodity flow problems. Operations Research, 48(2): 318-326;
[7] Barnhart, C., Kniker, T., and Lohatepanont, M. 2002. Itinerary-based airline fleet assignment. Transportation Science, 36(2): 199-217;
[8] Barnhart, C., Rexing, B., Kniker, T., Jarrah, A., and Krishnamurthy, N. 2000. Airline fleet assignment with time windows. Transportation Science, 34(1): 1-20;
[9] Brandao, J., and Mercer, A. 1997. A tabu search algorithm for the multi-trip vehicle routing and scheduling problem, European Journal of Operational Research. 100: 180-191;
[10] Canada's 50 Best Managed Companies. 2005 Winners. [Online]. Available from http://www.canadas50best.com/en/Winners/WinnersBest/2005+winners.htm [Cited 2 Apr. 2006];
[11] Christiansen, M., Fagerholt, K., and Ronen, D. Ship Routing and Scheduling—Status and Perspectives. Transportation Science, 36: 1-18;
[12] Christie, J. S., and Satir, S. 2004. Transport Logistics: Potential Traffic Related Spin-off Benefits, Canadian ITE Annual Conference, Moncton, New Brunswick;
[13] Clarke, G., and Wright, J. W. 1964. Scheduling of Vehicles from a Central Depot to a Number of Delivery Points. Operations Research, 12: 568-581;
[14] Clarke, M., and Smith, B., 2004. Impact of Operations Research on the Evolution of the Airline Industry. Journal of Aircraft, 41(1);
[15] Cook, T. 2000. Creating Competitive Advantage Using Model-Driven Support Systems. Presentation in the MIT Global Airline Industry Study Distinguished Speaker Seminar Series, Cambridge, Mass.;
[16] Cook, W., Cunningham, W. H., Pulleyblank, W. R, and Schrijver, A. 1998. Combinatorial Optimization, John Wiley & Sons, pp. 241-272;
[17] Corberan, A., Meja G., and Sanchis, J. M. 2005 New Results on the Mixed General Routing Problem. Operations Research, 53: 363-376;
[18] Cordeau, J. F., and Laporte, G. 2002 Tabu search heuristics for the vehicle routing problem. GERAD Technical report G-2002-15, University of Montreal, Canada;
[19] Crainic, T. G, and Laporte, G. 1997. Planning models for freight transportation. European Journal of Operational Research, 97(409): 38;
[20] Desaulniers, G., Lavigne, J., and Soumis, F. 1998. Multi-depot vehicle scheduling problems with time windows and waiting costs. European Journal of Operation Research, 111: 479-494;
[21] Desrosiers, J., Dumas, Y., Solomon, M. M., and Soumis, F. 1995. Time Constrained Routing and Scheduling. Ball, M., Magnanti, T., Monma, C., and Nemhauser, G. (editors);
[22] Handbook in Operations Research and Management Science: Network Routing. Holland, Amsterdam, The Netherlands, pp. 35-139;
[23] Dyalog Limited. 2006. Dyalog APL—Hungarian Method Cost Assignment. [Online]. Available from http://www.dyalog.com/dfnsdws/n_assign.htm. [Cited 5 Apr. 2006];
[24] Eiselt, H. A., Gendreau, M., and Laporte, G. 1995. Arc routing problems, part 11: the rural postman problem. Operations Research, 43: 399-414;
[25] Fernández, A. J., and Hill, P. M. July 2000. A comparative study of eight constraint programming languages over the boolean and finite domains. Constraints, 5(3): 275-301;
[26] Fisher, M. L. 1995. Vehicle routing. Ball, M., Magnanti, T., Monma, C., and Nemhauser, G. eds. Handbook in Operations Research and Management Science: Network Routing. Holland, Amsterdam, The Netherlands, pp. 1-33;

[27] Flatberg, T., Haavardtun, H., and Kloster, O., Løkketangen, A. 2000. Combining exact and heuristic methods for solving a vessel routing problem with inventory constraints and time windows. Ricerca Operativa. 29(91): 55-68;

[28] Gendreau, M., G. Laporte, J. Potvin. 1997. Vehicle routing: Modern heuristics. E. Aarts, J. Lenstra, eds. Local Search in Combinatorial Optimization, Ch. 9. John Wiley & Sons Ltd., New York, pp. 311-336;

[29] Godfrey, G., and Powell, W. B. 2002, An adaptive, dynamic programming algorithm for stochastic resource allocation problems 11: Multi-period travel times. Transportation Science, 36(1): 40-54;

[30] Golob, T. F., and Regan, A. C. 2002. The Perceived Usefulness of Different Sources of Traffic Information to Trucking Operations. Transportation Research Part E. 38: 97-116;

[31] Hall, R. 2004. Vehicle routing: On the road to recovery. ORMS Today;

[32] Hooghiemstra, J. S., Kroon, L. G., Odijk, M. A., Salomon, M., Zwaneveld, P. J., and Christiansen, M. 1999. Decomposition of a combined inventory and time constrained ship routing problem. Transportation Science. 33 (1): 3-16;

[33] Horner, P. 2000. The Sabre storey: The making of OR magic at AMR. ORMS Today;

[34] ILOG Transport PowerOPs. 2006. ILOG PowerOps. [Online]. Available at: http://www.ilog.com/products/transportpowerops/features.cfm [Cited 4 Apr. 2006];

[35] ILOG. 2003. "ILOG CPLEX 9.0 Getting Started", User Manual;

[36] ILOG. 2003. "ILOG Dispatcher 4.0 User's Manual", User Manual;

[37] ILOG. 2003. "ILOG Scheduler 6.0 Getting Started", User Manual;

[38] ILOG. 2003. "ILOG Solver 6.0 User's Manual", User Manual;

[39] Lawler, E. L., Lenstra, J. K., Rinnooy Kan, A. H. G., and Shmoys, D. B. 1992. The Travelling Salesman Problem, Wiley;

[40] Liu, J., C. Li, and Chan, C. 2003. Mixed truck delivery systems with both hub-and-spoke and direct shipment. Transportation Research Part E, 39: 325-339;

[41] Merriam-Webster Online Dictionary. March, 2006. [Online] Available at http://www.m-w.com/dictionary/optimization. [Cited 2 Apr. 2006];

[42] Powell, W. B., Shapiro, J. A., and Simaõ, H. P. 2002, An adaptive dynamic programming algorithm for the heterogeneous resource allocation problem. Transportation Science, 36(2): 231-249;

[43] Powell, W., and Topaloglu, H. 2005. Fleet management. S. Wallance, W. Ziemba (editors), Applications of Stochastic Programming. MPS-SIAM Series on Optimization, Philadelphia;

[44] Powell, W. B. 1996. A stochastic formulation of the dynamic assignment problem, with an application to truckload motor carriers. Transportation Science, 30(3): 195-219;

[45] Powell, W. B. 2003. Dynamic Models of Transportation Operations, In Supply Chain Management, Handbooks in Operations Research and Management Science, S. Graves and T. A. G. Tok (editors), North-Holland, Amsterdam;

[46] Powell, W. B., and Carvalho, T. A. 1998. Dynamic control of logistics queuing networks for large-scale fleet management. Transportation Science, 32(2): 90-109;

[47] Powell, W. B., Bouzaïene-Ayari, B., and Simaõ, H. P. 2004. Dynamic Models for Freight Transportation, Handbooks in Operations Research and Management Science, C. Barnhart and G. Laporte (Eds.), North-Holland, Amsterdam, to appear;

[48] Powell, W. B., Marar, A., Gelfand, J., and Bowers, S. 2002. Implementing operational planning models: A case application from the motor carrier industry. Operations Research, 50(4): 570-581;

[49] Powell, W. B., Towns, M. T., and Marar, A. 2000. On the value of globally optimal solutions for dynamic routing and scheduling problems. Transportation Science, 34(1): 50-66;

[50] Ryan, D., Butchers, R., Day, P., Goldie, A., Miller, S., Meyer, J., Scott, A., and Wallace, C. 2001. Optimizing Crew Scheduling at Air New Zealand. Interfaces, 31(1): 30-56;

[51] Satir, S. 2003. Applied Vehicle Routing and Scheduling Optimization for Pickup and Delivery Operations at a Trucking Terminal. Master's Thesis, University of New Brunswick;

[52] Smilowitz, K. R., Atamturk, A., and Daganzo, C. F. 2003. Deferred item and vehicle routing within integrated networks. Transportation Research Part E, 39: 305-323;

[53] Subramanian, R., Scheff, R. P., Quillinan, J. D., Wiper, D. S., and Marsten, R. E. 1994. Coldstart: Fleet Assignment at Delta Airlines, Interfaces, 24(1): 104-120;

[54] Tan, K. C., Lee, L. H., Zhu, Q. L., and Ou, K. 2000. Heuristic Methods for Vehicle Routing Problem with Time Windows. Artificial Intelligence in Engineering, 15: 281-295;

[55] Taniguchi, E., Thompson, R. G., Yamada, T., and Van Duin, R. 2001. City Logistics: Network Modelling and Intelligent Transport Systems, Pergamon;

[56] Toth, P., 2004. Models and Algorithms for Rail Transportation Problems. Presentation, Spring School, Montreal;

[57] TransCAD. 2004. 4.7 User's Guide Supplement, Caliper Corporation;

[58] Transcad. 2006. Available at http://www.caliper.com/TransCAD/ApplicationModules.htm#Routing [cited 4 Apr. 2006];

[59] Transportation in Canada 2004.2004. Annual Report Transport Canada. [Online]. Available at http://www.tc.gc.ca/pol/en/report/anre2004/toc_e.htm [Cited 2 Apr. 2006];

[60] Wright, M. B., and Marett, R. C. 1996. A Preliminary Investigation into the Performance of Heuristic Search Methods Applied to Compound Combinatorial Problems. Meta-Heuristics: Theory & Applications, Osman, I. H., and Kelly, J. P. (editors), Kluwer Academic Publishers, Massachusetts, pp. 299-318; and

[61] Yang, J., Jaillet, P., and Mahmassani, H. 2004. Real-time multivehicle truckload pickup and delivery problems. Transportation Science, 38: 135-148.

The above-described embodiments of the present invention are intended to be examples only. Those of skill in the art may effect alterations, modifications and variations to the particular embodiments without departing from the scope of the invention, which is set forth in the claims.

What is claimed is:

1. A method suitable for optimizing a linehaul operation comprising jobs and tractors, the method comprising the steps of:
   (a) providing at least one assignment algorithm designed to solve an assignment problem;
   (b) providing at least one heuristic, wherein the at least one heuristic includes a heuristic to find all possible optimum solution combinations by grouping jobs and tractors;
   (c) combining the at least one heuristic with the at least one assignment algorithm to solve the scheduling problem, the combining step comprising the following acts:
      (i) identifying at least one equivalent assignment solution to an instantaneous assignment problem using the at least one assignment algorithm; and
      (ii) using the at least one heuristic to select one assignment solution from the at least one equivalent assignment solution such that the selected one assignment solution reduces the cost of at least one other instantaneous assignment solution.

2. The method as recited in claim 1, wherein the combining step further comprises the act of finding all possible solutions to the instantaneous assignment problem using the at least one assignment algorithm.

3. The method as recited in claim 1, wherein the combining step further comprises the act of finding a subset of all possible solutions to the instantaneous assignment problem using the at least one assignment algorithm.

4. The method as recited in claim 1, further comprising an iterating step wherein the selection of a first assignment solution obtained by using the at least one heuristic at a first iteration improves the quality of a second assignment solution achieved at a second iteration in relative comparison to the quality of a third assignment solution obtained as a result of the application of the assignment algorithm without the use of the at least one heuristic.

5. The method as recited in claim 4, further comprising the act of making a leg assignment at an iteration whereby a unit is routed over at least two legs.

6. The method as recited in claim 5, wherein the unit is a trailer.

7. The method as recited in claim 5, wherein the unit is a container.

8. The method as recited in claim 5, wherein the unit is a car load.

9. The method as recited in claim 5, wherein the act of making a leg assignment is made for an owner-operator tractor.

10. The method as recited in claim 5, wherein the act of making a leg assignment is made for a broker tractor.

11. The method as recited in claim 1, wherein the at least one heuristic includes a routing heuristic.

12. The method as recited in claim 4, further comprising the act of making a reassignment at each iteration whereby a unit is moved from one time period to another time period.

13. The method as recited in claim 12, wherein the unit is a trailer.

14. The method as recited in claim 12, wherein the unit is a container.

15. The method as recited in claim 12, wherein the unit is a car load.

16. The method as recited in claim 12, wherein the act of making a reassignment is made by an owner-operator tractor.

17. The method as recited in claim 12, wherein the act of making a reassignment is made by a broker tractor.

18. The method as recited in claim 1, wherein the at least one heuristic includes a scheduling heuristic.

19. The method as recited in claim 1, wherein the at least one assignment algorithm includes the Hungarian Assignment algorithm.

20. The method as recited in claim 1, wherein the at least one assignment algorithm includes the revised Hungarian Assignment algorithm.

21. The method as recited in claim 1, wherein the at least one assignment algorithm includes an assignment algorithm which is not the Hungarian Assignment algorithm.

22. The method as recited in claim 1, wherein the at least one heuristic includes a heuristic to determine the preferred optimum solution in such a way that company tractors and owner-operators tractors end up at the preferred locations thereby lowering the operating cost for the next iteration and for the next day.

* * * * *